(12) United States Patent
McGoff et al.

(10) Patent No.: US 11,852,264 B2
(45) Date of Patent: Dec. 26, 2023

(54) INSULATION PRODUCTS AND METHODS AND MACHINES FOR MAKING INSULATION PRODUCTS

(71) Applicant: TemperPack Technologies Inc., Richmond, VA (US)

(72) Inventors: James McGoff, Richmond, VA (US); Alex Dimen, Richmond, VA (US); Daniel Shores, Richmond, VA (US); Caleb Meindertsma, Richmond, VA (US); Justin Turner-Gonzalez, Richmond, VA (US); Charles-Alexandre Archambault Vincent, Richmond, VA (US)

(73) Assignee: TEMPERPACK TECHNOLOGIES, INC., Richmond, VA (US)

( * ) Notice: Subject to any disclaimer, the term of this patent is extended or adjusted under 35 U.S.C. 154(b) by 0 days.

(21) Appl. No.: 17/816,116

(22) Filed: Jul. 29, 2022

(65) Prior Publication Data
US 2023/0167939 A1 Jun. 1, 2023
US 2023/0349505 A9 Nov. 2, 2023

Related U.S. Application Data

(60) Provisional application No. 63/349,616, filed on Jun. 7, 2022, provisional application No. 63/284,779, filed
(Continued)

(51) Int. Cl.
*F16L 59/00* (2006.01)
*B32B 7/00* (2019.01)
(Continued)

(52) U.S. Cl.
CPC .............. *F16L 59/075* (2013.01); *B32B 1/02* (2013.01); *B32B 7/05* (2019.01); *B32B 7/12* (2013.01);
(Continued)

(58) Field of Classification Search
CPC ......... F16L 59/00; F16L 59/02; F16L 59/029; F16L 59/07; F16L 59/075; B32B 7/00;
(Continued)

(56) References Cited

U.S. PATENT DOCUMENTS

| 2,417,435 A | 3/1947 | Georg |
| 2,938,567 A | 5/1960 | Ronald |

(Continued)

FOREIGN PATENT DOCUMENTS

| DE | 10255039 A | 6/2004 |
| EP | 1736584 A2 | 12/2006 |

(Continued)

OTHER PUBLICATIONS

International Search Report and Written Opinion in related PCT Application No. PCT/US22/38844 dated Jan. 3, 2023.

*Primary Examiner* — Jacob T Minskey
*Assistant Examiner* — Matthew Hoover
(74) *Attorney, Agent, or Firm* — TROUTMAN PEPPER HAMILTON SANDERS LLP; Christopher J. Forstner; Scott A. Bergeson

(57) ABSTRACT

The presently disclosed subject matter generally relates to recyclable insulation material for shipping containers, groceries bags, etc., machines for making the recyclable insulation material, and methods for the making the recyclable insulation material. In one aspect, a method of forming an insulation product may include forming a continuous sheet of paper into a plurality of flexible loops defining a plurality of air channels extending in a direction that is substantially perpendicular with a machine direction of the continuous sheet of paper. The method may also include immediately attaching a first layer of paper and a second layer of paper to the plurality of flexible loops as they are formed so that the continuous sheet of paper retains the plurality of flexible (Continued)

loops between the first layer and the second layer and that the plurality of flexible loops remain unattached with respect to one another.

20 Claims, 56 Drawing Sheets

Related U.S. Application Data on Dec. 1, 2021, provisional application No. 63/227,727, filed on Jul. 30, 2021.

(51) Int. Cl.
*B32B 29/00* (2006.01)
*B32B 37/00* (2006.01)
*F16L 59/075* (2006.01)
*B32B 29/08* (2006.01)
*B32B 37/20* (2006.01)
*B32B 37/12* (2006.01)
*B32B 7/05* (2019.01)
*B32B 7/12* (2006.01)
*F16L 59/02* (2006.01)
*B32B 1/02* (2006.01)
*B32B 38/00* (2006.01)

(52) U.S. Cl.
CPC ............ *B32B 29/005* (2013.01); *B32B 29/08* (2013.01); *B32B 37/0046* (2013.01); *B32B 37/1207* (2013.01); *B32B 37/20* (2013.01); *B32B 38/0004* (2013.01); *F16L 59/029* (2013.01); *B32B 2037/1215* (2013.01); *B32B 2250/26* (2013.01); *B32B 2255/12* (2013.01); *B32B 2255/26* (2013.01); *B32B 2307/304* (2013.01); *B32B 2307/558* (2013.01); *B32B 2307/56* (2013.01); *B32B 2307/718* (2013.01); *B32B 2307/732* (2013.01); *B32B 2309/14* (2013.01); *B32B 2317/127* (2013.01); *B32B 2439/06* (2013.01); *B32B 2439/62* (2013.01); *B32B 2553/02* (2013.01)

(58) Field of Classification Search
CPC .... B32B 7/06; B32B 7/10; B32B 7/12; B32B 29/00; B32B 29/005; B32B 29/08; B32B 37/00; B32B 37/10; B32B 37/12; B32B 37/1207; B32B 37/20
See application file for complete search history.

(56) References Cited

U.S. PATENT DOCUMENTS

| | | | |
|---|---|---|---|
| 4,886,563 A | 12/1989 | Bennett et al. | |
| 4,886,696 A | 12/1989 | Bainbridge | |
| 5,558,923 A | 9/1996 | Vesamaa | |
| 5,702,052 A | 12/1997 | Bonner | |
| 6,632,165 B1 | 10/2003 | Letourneau et al. | |
| 7,335,151 B2 | 2/2008 | Toth | |
| 7,452,316 B2 | 11/2008 | Cals et al. | |
| 7,722,519 B2 | 5/2010 | Timmers et al. | |
| 7,740,573 B2 | 6/2010 | Manley | |
| 7,789,819 B2 | 9/2010 | Slovencik | |
| 7,955,245 B2 | 6/2011 | Cheich et al. | |
| 8,052,037 B2 | 11/2011 | Bussey et al. | |
| 8,491,453 B2 | 7/2013 | Slovencik et al. | |
| 8,580,061 B2 | 11/2013 | Cik | |
| 8,726,438 B2 | 5/2014 | Cik | |
| 8,900,111 B2 | 12/2014 | Wetsch et al. | |
| 9,103,470 B2 | 8/2015 | Cik | |
| 9,205,621 B2 | 12/2015 | Cheich | |
| 9,259,096 B2 | 2/2016 | Cik | |
| 9,669,596 B2 | 6/2017 | Cheich et al. | |
| 10,035,320 B2 | 7/2018 | Wetsch et al. | |
| 10,099,836 B2 | 10/2018 | Cheich | |
| 10,357,936 B1 | 7/2019 | Vincent et al. | |
| 10,940,658 B2 | 3/2021 | Lemmens | |
| 10,940,966 B2 | 3/2021 | Pereira | |
| 2005/0214512 A1* | 9/2005 | Fascio | B65D 81/03 156/208 |
| 2011/0045957 A1* | 2/2011 | Mehta | B65D 5/4295 493/344 |
| 2012/0006471 A1 | 1/2012 | Cik | |
| 2014/0106953 A1 | 4/2014 | Deis et al. | |
| 2017/0100906 A1 | 4/2017 | Beaver et al. | |
| 2017/0259522 A1 | 9/2017 | Cheich et al. | |
| 2017/0260422 A1* | 9/2017 | Pejoan Jiménez | C09J 11/06 |
| 2019/0016518 A1 | 1/2019 | Cheich | |
| 2019/0061300 A1 | 2/2019 | Wetsch et al. | |
| 2020/0139660 A1 | 5/2020 | Corbin et al. | |
| 2020/0180255 A1 | 6/2020 | Cheich et al. | |
| 2020/0180256 A1 | 6/2020 | Cheich et al. | |
| 2020/0189256 A1 | 6/2020 | Field et al. | |
| 2020/0295328 A1 | 9/2020 | Kang | |

FOREIGN PATENT DOCUMENTS

| | | |
|---|---|---|
| EP | 1996395 B1 | 10/2009 |
| EP | 1848579 B1 | 8/2010 |
| EP | 2470354 A1 | 7/2012 |
| EP | 2203304 B1 | 5/2015 |
| EP | 2969840 A2 | 1/2016 |
| EP | 2792478 B1 | 3/2019 |
| EP | 2013128 B1 | 7/2019 |
| EP | 2910368 B1 | 12/2019 |
| EP | 2937212 B1 | 5/2020 |
| EP | 3658367 A1 | 6/2020 |
| EP | 3285996 B1 | 7/2020 |
| EP | 3526028 B1 | 12/2020 |
| EP | 2590800 B1 | 1/2021 |
| EP | 3784593 A1 | 3/2021 |

* cited by examiner

INSULATION PRODUCTS AND METHODS AND MACHINES FOR MAKING INSULATION PRODUCTS

CROSS-REFERENCE TO RELATED APPLICATIONS

This application claims priority under 35 U.S.C. § 119 to the following U.S. Provisional Patent Applications: U.S. Provisional Patent Application No. 63/227,727, filed Jul. 30, 2021, entitled, "RECYCLABLE INSULATION MATERIAL AND METHODS AND MACHINES FOR MAKING"; U.S. Provisional Patent Application No. 63/284,779, filed Dec. 1, 2021, entitled, "INSULATION MATERIAL AND METHODS AND MACHINES FOR MAKING INSULATION MATERIALS," and U.S. Provisional Patent Application No. 63/349,616, filed Jun. 7, 2022, entitled, "INSULATION MATERIAL AND METHODS AND MACHINES FOR MAKING INSULATION MATERIALS" the entire contents of all of which are fully incorporated herein by reference.

FIELD

The presently disclosed subject matter generally relates to insulation products for packaging and shipping, machines for making insulation products, and methods for making insulation products.

BACKGROUND

Insulation materials have long been used in a variety of applications and are being increasingly used in insulated shipping containers to provide desired or required thermal environments when shipping goods. For example, an insulated shipping container transporting perishable goods (e.g., refrigerated meals) may increase the longevity of the goods and, in turn, expand the shipping area of the customer base. While some insulated shipping containers are designed for long term use, others are designed for a more limited lifespan in favor of lower materials and manufacturing costs. The ever-increasing volume of non-reusable shipping containers results in higher levels of waste, most of which is non-recyclable or non-compostable at least in part because the insulation materials are often non-recyclable or non-compostable. Environmentally conscious retailers and consumers are faced with limited environmentally friendly and responsible options, for disposing insulation materials following use.

Accordingly, there is a need for an insulation production for shipping and/or packaging that is recyclable or compostable, provides insulation and cushioning properties, and is lightweight and effective. There is also a need for machines for making such insulation products, and methods for making the recyclable or compostable insulation and cushioning material, including machines and methods that allow customers to make such insulation products on demand. Embodiments of the present disclosure are directed to these and other considerations.

SUMMARY

Briefly described, embodiments of the presently disclosed subject matter relate to insulation products, one or more machines for making insulation products, and one or more methods for making an insulation product configured to insulate and/or cushion items for transport, whether such transport needs involve shipping long distances, local delivery, or self-transport in a vehicle. In one aspect, an insulation product may include a first layer and a first continuous paper sheet formed into a first plurality of flexible loops disposed on and attached to the first layer and defining a first plurality of air channels that extend in a direction that is substantially perpendicular with a machine direction of the insulation product. A take up factor of the first continuous paper sheet to the first layer is greater than 1:1.

In other aspects, an insulation product may include a first layer, a second layer, and a paper core formed into a plurality of flexible loops. The plurality of flexible loops include a first flexible loop, a second flexible loop, and a third flexible loop with the first and third flexible loops contacting each other proximate the first layer and the second flexible loop disposed between the first and third flexible loops proximate the second layer. The paper core is disposed between and attached to the first layer and the second layer.

In other aspects, an insulation product may include a first layer and a first continuous paper sheet formed into a first plurality of flexible loops disposed on and attached to the first layer and defining a first plurality of air channels that extend in a direction that is substantially perpendicular with a machine direction of the insulation product. The insulation product may have an indentation force deflection of 1.5 to 180 pounds per square inch at 50% thickness reduction. The insulation product may have an R-value of 1.3 to 1.7.

In other aspects, a machine for making insulation may include two or more rotatory members configured to pull a precut insulation product at a first rate. The precut insulation product may include a first paper layer, a second paper layer, and a continuous paper core sheet, a first restraint and a second restraint spaced apart a predetermined distance to create a first space therebetween, and two or more second rotary members configured to feed a continuous paper sheet at a second rate into the first space such that the continuous paper sheet forms a plurality of flexible loops defining a plurality of air channels that extend in a direction that is substantially perpendicular with a machine direction. The first rate may be slower than the second rate.

In other aspects, a machine for making insulation may include a first conveyor belt and a second conveyor belt configured to pull a precut insulation product at a first rate. The precut insulation product may include a first paper layer, a second paper layer, and a continuous paper core sheet. The first and second conveyor belts may be spaced apart a predetermined distance to create a first space therebetween. The machine may also include two or more rotary members configured to feed a continuous paper sheet at a second rate into the first space such that the continuous paper sheet forms a plurality of flexible loops that extend in a direction that is substantially perpendicular with a machine direction. The first rate is slower than the second rate.

In other aspects, a machine for making insulation may include two or more first rotary members configured to pull a precut insulation product at a first rate. The precut insulation product may include a first paper layer, a second paper layer, and a continuous paper core sheet. The machine may also include a first restraint and a second restraint spaced apart a predetermined distance to create a first space therebetween and each comprising two or more heaters. The machine may also include two or more second rotary members configured to feed a continuous paper sheet at a second rate into the first space such that the continuous paper sheet forms a plurality of flexible loops disposed defining a plurality of air channels extending in a direction that is substantially perpendicular with a machine direction. The first rate may be slower than the second rate.

In other aspects, a method of forming an insulation product may include forming a continuous sheet of paper into a plurality of flexible loops defining a plurality of air channels extending in a direction that is substantially perpendicular with a machine direction running an entire width of the continuous sheet of paper. The method may also include immediately attaching a first layer of paper and a second layer of paper to the plurality of flexible loops as they are formed so that the continuous sheet of paper retains the plurality of flexible loops between the first layer and the second layer and that the plurality of flexible loops remain unattached with respect to one another.

In other aspects, a method of forming an insulation product may include forming a continuous sheet of paper into a plurality of flexible loops defining a plurality of air channels extending in a direction that is substantially perpendicular with a machine direction running an entire width of the continuous sheet of paper. The method may also include attaching a first layer of paper and a second layer of paper to the plurality of flexible loops as they are formed so that the continuous sheet of paper retains the plurality of flexible loops between the first layer and the second layer.

In other aspects, a method of forming an insulation product may include forming a continuous sheet of paper into a plurality of flexible loops defining a plurality of air channels extending in a direction that is substantially perpendicular with a machine direction of the continuous sheet of paper. The method may also include attaching a first layer of paper to the plurality of flexible loops as they are formed so that the continuous sheet of paper retains the plurality of flexible loops on the first layer and that the plurality of flexible loops remain unattached with respect to one another.

The foregoing exemplifies certain aspects of the presently disclosed subject matter and is not intended to be reflective of the full scope of the presently disclosed subject matter. Additional features and advantages of the presently disclosed subject matter are set forth in the following exemplary description, may be apparent from the description, or may be learned by practicing the presently disclosed subject matter.

BRIEF DESCRIPTION OF THE DRAWINGS

FIG. 1C-1 is a side view of the insulation product of FIG. 1A-1.

FIG. 1C-2 is a side view of an insulation product, according to an exemplary embodiment.

FIG. 1C-3 is a side view of an insulation product, according to an exemplary embodiment.

FIG. 1C-4 is a side view of an insulation product, according to an exemplary embodiment.

FIGS. 1D-1, 1D-2, and 1D-3 are side view of an insulation product without a first layer covering the core, according to exemplary embodiments.

FIG. 1F-1 is a side view of an insulation product including two stacked cores, according to an exemplary embodiment.

FIG. 1F-2 is a side view of an insulation product including two stacked cores without a barrier layer in between, according to an exemplary embodiment.

FIG. 1F-3 is a side view of an insulation product including two U-shaped stacked cores, according to an exemplary embodiment.

DETAILED DESCRIPTION

Figures 1, 1A:
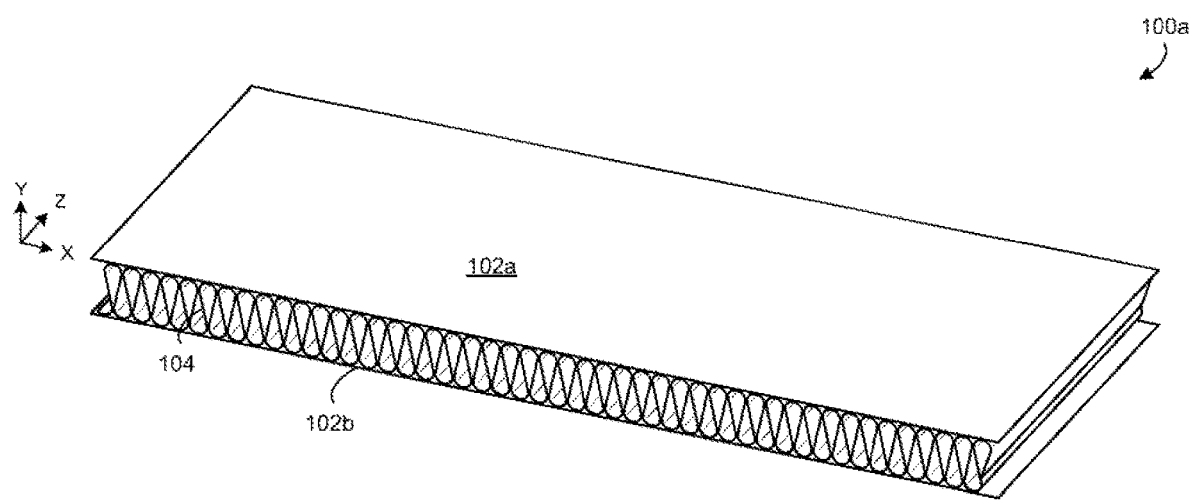
FIGS. 1A-1 and 1A-2 are perspective views of an insulation product according to exemplary embodiments.

To facilitate an understanding of the principals and features of the disclosed technology, illustrative embodiments are explained below. The components described hereinafter as making up various elements of the disclosed technology are intended to be illustrative and not restrictive.

Embodiments of the disclosed technology include insulation products capable of being recycled curbside or compostable, flexible for providing insulation and cushioning to items in a shipping container (such as grocery items), lightweight, and constructed in a manner that allows for on-demand manufacture (such as on location at retailer shipping locations). Such insulation products not only offer advantageous insulation and cushioning properties, but also may avoid certain shipping costs and constraints associated with shipping pre-manufactured insulation products with larger volumes (due to the manufactured state) and needs to ensure that such products maintain insulation properties while in transit to retailer shipping locations. Additionally, the disclosed machines and methods for manufacturing insulation products provide users with flexibility in the sizing, dimensions and insulation property qualities needed for individual retailer needs (such as individual product shipping requirements), such that insulation products can be customized at a retailer shipping location, leading to less waste, higher cost efficiency and time savings. Referring now to the figures, in which like reference numerals represent like parts, various embodiments of the disclosure will be disclosed in detail.

Figures 1, 1A, 2:
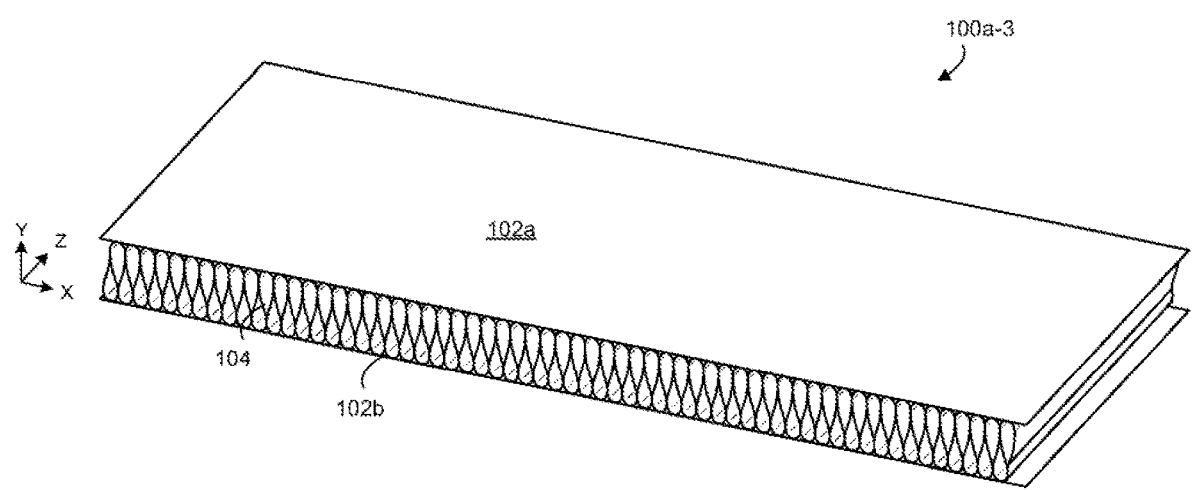
Figure 1B:
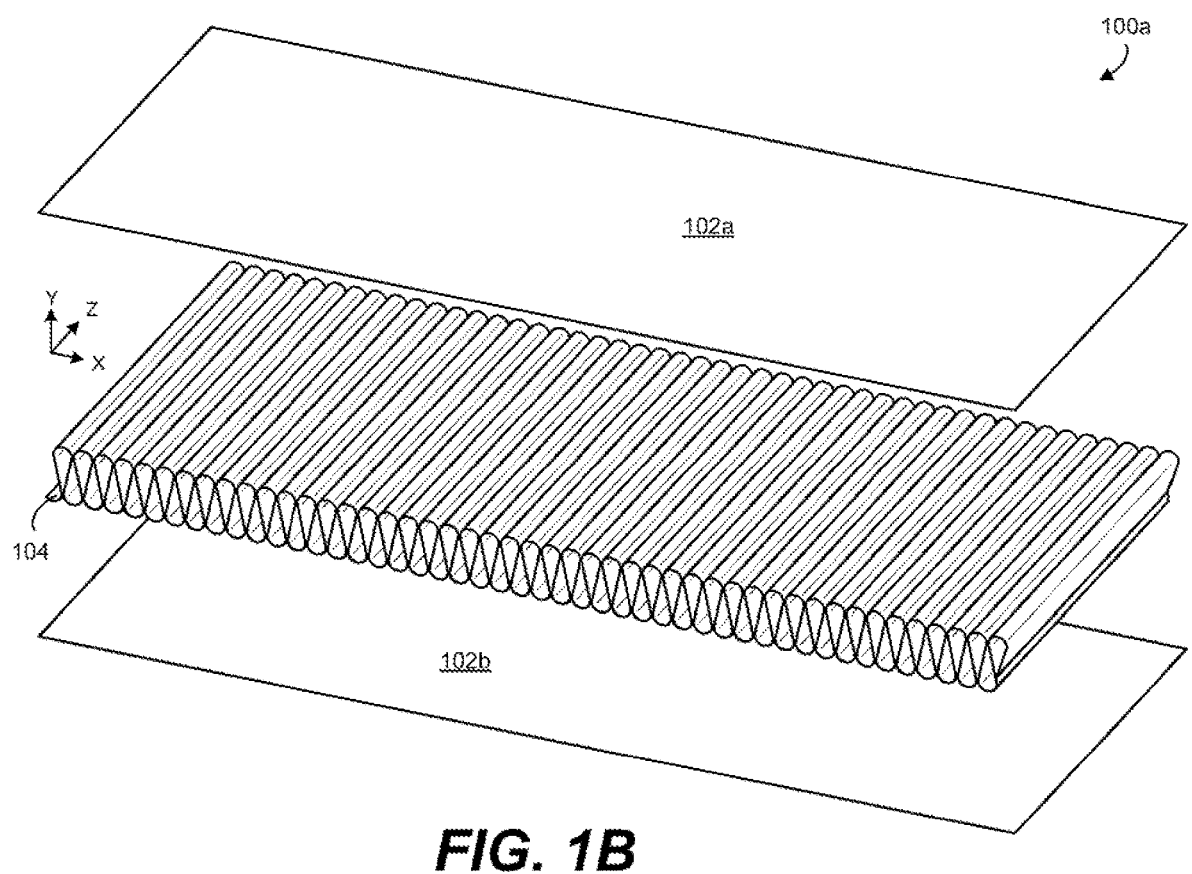
FIG. 1B is an exploded perspective view of the insulation product of FIG. 1A-1.

FIGS. 1A-1, 1B, and 1C-1 are perspective, exploded perspective, and side views, respectively, of an insulation product 100a according to an exemplary embodiment. FIG. 1A-2 is a perspective view of an insulation product 100a-3. As shown in FIGS. 1A-1, 1A-2, 1B, and 1C-1, 1C-3, and 1C-4, insulation products 100a, 100a-3, 100a-4 may include a first layer 102a and a second layer 102b (also referred to as outer layers) with a core 104 that may be a continuous sheet of paper formed into a wave pattern (or a waved core 104) over its entire length and that has a plurality of flexible loops 106a, 106b, 106c. Also illustrated in these figures (see e.g., FIGS. 1A-1 and 1A-2) and others throughout this application are X, Y, Z axes or directions. The X-direction is referred to as the machine direction and travels a length of the insulation product in the direction that various insulation products disclosed herein are formed. The Y-direction is perpendicular to the X-direction and the Z-direction and is sometimes referred to as the thickness direction. The Z-direction, or width direction, is perpendicular to the X-direction and the Y-direction and is sometimes referred to as the transverse direction. As can be seen from FIG. 1A-1, core 104 substantially traverses in the machine direction (X-direction) while also forming flexible loops in the Y-direction in between the two planes formed by first layer 102a and second layer 102b. Such flexible loops may, in some embodiments, contact adjacent loops as the wavelike pattern of core 104 is formed. In some embodiments, the flexible loops of core 104 are formed over the length of core 104 in the X-direction.

As shown more clearly in FIGS. 1C-1, 1C-3, and 3A, the flexible loops, such as 106a and 106b, generally include three regions, a forward-facing side in the X-direction, an contact region that comes into contact with either outer layer (e.g., layer 102a or layer 102b), and a rear facing side in the X-direction. The forward facing and rear facing sides of the flexible loops may come into contact with adjacent sides of adjacent loops formed in core 104, such as shown with respect to loop 106a and loop 106b in FIGS. 1C-1 and 1C-3, and loop 306a and loop 306b in FIG. 3. For example, loop 106b contacts the side of adjacent lower loop 106c proximate the second layer 102b with loop 106a disposed between loop 106b and loop 106c. Similarly, loop 106a may contact the side of an adjacent loop 106a proximate the first layer 102b with loop 106b therebetween. In some embodiments, upper loop contact point 105a between two upper loops 106a or lower loop contact point 105b between two lower loops 106b may not be near the first or second layer 102a, 102b. Instead, the upper and lower loop contact points 105a, 105b may be near a centerline in the machine (X direction) direction. In other embodiments, some or all of the loops 106a and loops 106b may not contact adjacent loops. In some embodiments, the pitch (e.g., the distance between two loops 106a) may be zero inches or near zero inches at some horizontal points. In some embodiments, the pitch may be 0.01 inches to 8 inches (e.g., 0.3 inches to 0.8 inches). This pitch may be preset or controlled throughout core 104 based at least on the feed rate of the material that is formed into core 104 and the space set for forming the flexible loops 106a, 106b. In some embodiments, the first and the last loops in the plurality of loops are only contacting the side of one adjacent flexible loop, whereas other loops contact the sides of two adjacent loops. In some embodiments, the plurality of flexible loops 106a, 106b, 106c may not contact each other. In other embodiments, the loops may not be bonded or attached to one another at upper and lower loop contact points 105a, 105b because such bonding or attachment may cause unwanted rigidity in insulation products, which would detract from the cushioning properties it provides from the flexible loops 106a, 106b, 106c being flexible and able to move in the Y- and/or X-directions.

Figures 1, 1C:
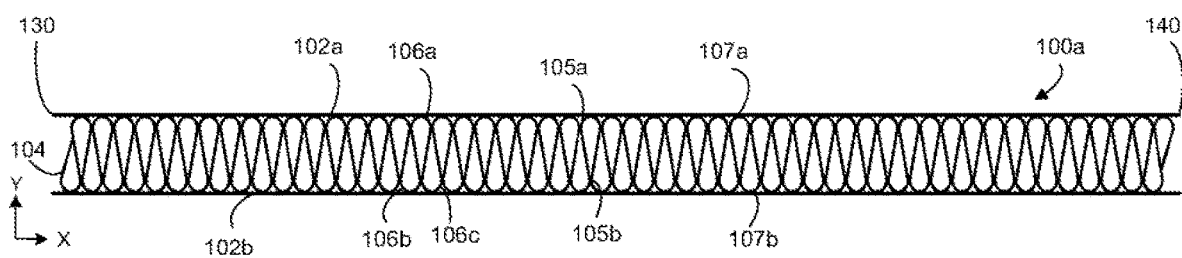
Figures 1, 1C, 2:
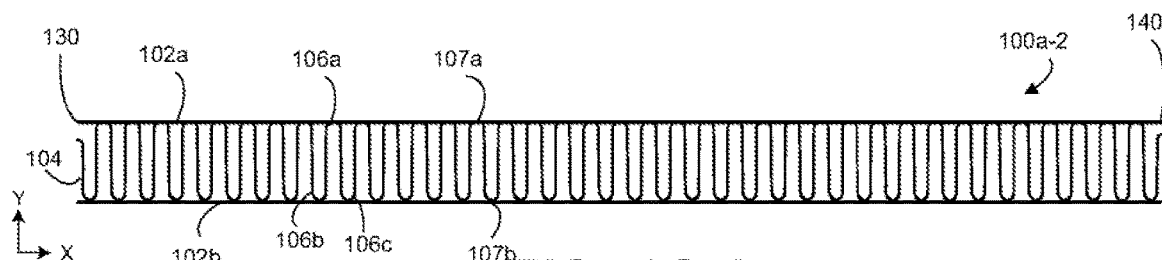
Figures 1, 1C, 2, 3:
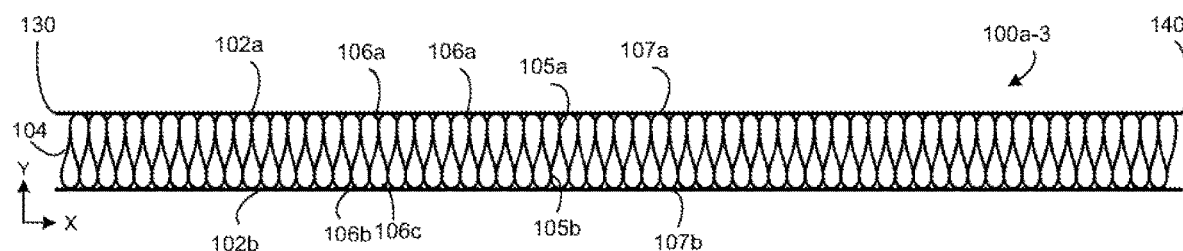
Figures 1, 1C, 2, 3, 4:
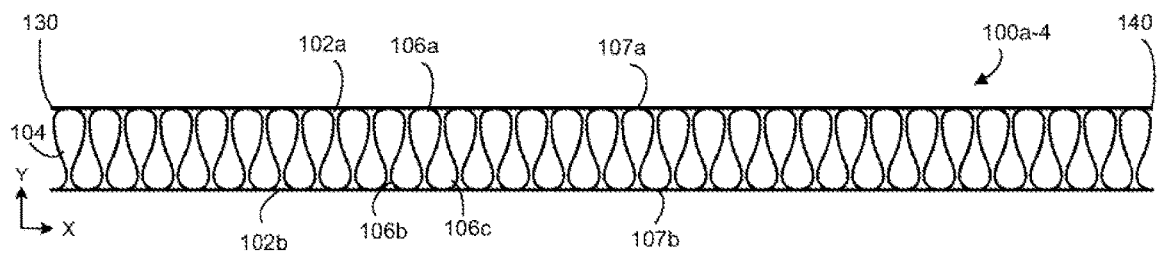
Figure 3A:
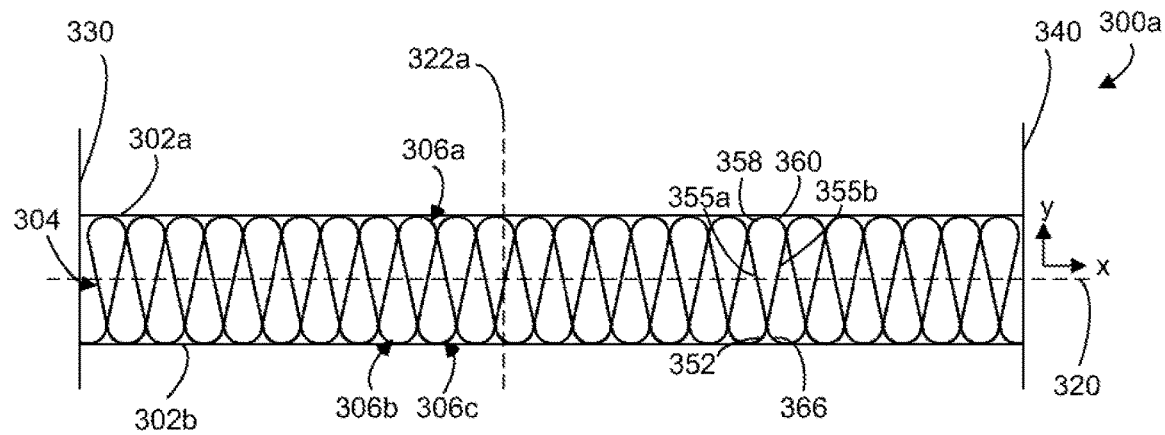
FIG. 3A is a schematic diagram of the insulation product of FIG. 1A-1 according to an exemplary embodiment.

Referring to FIG. 1C-1 and as described in more detail with respect to FIG. 3A, core 104 may be formed in a wavelike pattern of from the continuous paper sheet with upper loops 106a and lower loops 106b, 106c disposed adjacent to and contacting, and potentially attached to, the first layer 102a or the second layer 102b. In some embodiments, core 104 may generally extend in a machine direction from a first end 130 of insulation product 100a to a second end 140 of insulation product 100a and include core 104 with upper loops 106a and lower loops 106b, 106c that extend or have portions that extend in a machine direction as well as a direction opposite the machine direction (i.e., from the second end 140 to the first end 130). Additionally, portions of upper loops 106a and lower loops 106c may extend approximately perpendicular to the machine, such as generally in the Y-direction.

In one embodiment, when examining insulation product 100a, 100a-3, 100a-4, a line drawn perpendicular to the plane of first layer 102a and the plane of second layer 102b may travel through five layers or more of material (e.g., through first layer 102a, three times through core 104, and through second layer 102b).

In one embodiment, core 104 may include a continuous sheet of any fibrous material that can be formed into a web such as paper or tissue-based materials, including but not limited to recycled content and kraft paper. In some embodiments, non-recyclable webbing may be used. In some embodiments, core 104 may be made with a compostable polymeric film to create a product that includes an internal moisture barrier, which may add utility in certain temperature-controlled shipping applications. However, for relatively thin products, lower basis weight material may be used to form core 104, whereas higher basis weights materials may be used to for core 104 for relatively thicker products. For example, core 104 may have basis weight between about 1 to about 150 pounds per 3000 square feet (lb./3000 ft$^2$) such as about 15 to about 100 lb./3000 ft$^2$ (e.g., about 18 lb./3000 ft$^2$, about 22.5 lb./3000 ft$^2$, about 30 lb./3000 ft$^2$, about 40 lb./3000 ft$^2$, about 60 lb./3000 ft$^2$, or about 75 lb./3000 ft$^2$). Core 104 may be the same width as first layer 102a and second layer 102b, or in some embodiments, may have a width (in the Z-direction) less than either layer, which may allow for the creation of fin or side seals to seal core 104 between first layer 102a and second layer 102b. In some embodiments, core 104 may have a width that is greater than first layer 102a and/or second layer 102b. First layer 102a, second layer 102b, or core 104 may include kraft paper, machine glazed (MG) paper, smooth finished (SF) paper, machined finished (MF) paper, glassines, one or more polymeric films, paper-based product, and/or super-calendered kraft (SCK) paper. Although not shown, insulation products may further include additional outer layers, similar to first layer 102a and second layer 102b), for additional insulation or cushioning properties depending on the particular shipping need. Such additional layers could include easily removable polymeric layers that provide moisture resistance, such as a plastic layer that could be removed from the insulation product for recycling or composting purposes. Core 104 (e.g., insulation products 100a, 100a-2, 100a-3, and 100a-4) may have a thickness, length, width, density, and insulative value that can be selected for customized applications by an operator of one or more machines designed to manufacture such products as described herein.

As will be described in more detail, the wave pattern of core 104 may vary in different versions of insulation products herein. For example, core 104, 304 may include straight portions 355a and 355b between upper loops 106a, 306a and lower loops 106b, 106c, 306b as shown in FIGS. 1A-1, 1C-1, and 3A. In other examples, core 104, 304, may include a wavelike pattern that is U-shaped, or substantially U-shaped, (when viewed in the X-Y planar orientation) as shown in FIG. 1C-2. In other examples, core 104, 304 may include a wavelike pattern with a reverse curve or S-curve type shape (when viewed in the X-Y planar orientation) that is not substantially straight in the Y-direction between the upper and lower loops 106a, 306a and 106b, 306b as in FIGS. 1A-2, 1C-3, 1C-4, 3B, and 3C.

When core 104 is formed in a wavelike pattern between first layer 102a and second layer 102b, insulation product (e.g., insulation product 100a) stores potential energy that is able to cushion an item (e.g., a grocery item) that is placed in contact with the insulation product given that core 104 is flexibly held in this wavelike pattern by being attached to (via adhesive, glue, tape, or similar means) to first layer 102a and second layer 102b. In contrast, a crumpled paper, like tissue or shredded paper compared below in Table 1, does not have a wavelike pattern, and has a comparatively lower rebound and thus cannot provide as much cushioning support as insulation product 100a.

TABLE 1

Comparison of Rebound Properties

| Name | Surface Density OPSY (oz. per square yard) | Thickness (in.) | PSI @ 25% Deflection | PSI @ 50% Deflection | PSI @ 25% Rebound | Sag Factor | Recovery Ratio % | Guide Factor |
|---|---|---|---|---|---|---|---|---|
| Example 1 | 40 | 1.21 | 0.47 | 0.697 | 0.228 | 1.470 | 0.481 | 0.012 |
| Example 2 | 25 | 1.10 | 0.14 | 0.250 | 0.072 | 1.790 | 0.517 | 0.006 |

TABLE 1-continued

Comparison of Rebound Properties

| Name | Surface Density OPSY (oz. per square yard) | Thickness (in.) | PSI @ 25% Deflection | PSI @ 50% Deflection | PSI @ 25% Rebound | Sag Factor | Recovery Ratio % | Guide Factor |
|---|---|---|---|---|---|---|---|---|
| Counter Example 1: Cellulose Fiber | 54.7 | 1.11 | 0.68 | 3.017 | 0.115 | 4.456 | 0.170 | 0.012 |
| Counter Example 2: Denim Fiber | 34.88 | 1.48 | 0.24 | 0.678 | 0.114 | 2.870 | 0.484 | 0.007 |
| Counter Example 3: Polyethylene Fiber | 28.95 | 1.61 | 0.17 | 0.434 | 0.096 | 2.568 | 0.569 | 0.006 |
| Counter Example 4: Shredded Paper | 27.33 | 2.5 | 0.07 | 0.614 | 0.008 | 8.251 | 0.104 | 0.003 |
| Counter Example 5: Tissue Paper | 9.37 | 0.73 | 0.03 | 0.143 | 0.012 | 4.120 | 0.353 | 0.004 |

As shown above in Table 1, Examples 1 and 2 are exemplary insulation products according to the disclosed embodiments that have a first layer, a second layer, and a core placed in between and attached to the first and second layers. Example 1 has almost double the surface density (OPSY) at 40 OPSY as Example 2 at 25 OPSY, but they both have relatively similar thicknesses at 1.21 and 1.1, respectively. Examples 1 and 2 required applied forces of 0.47 PSI and 0.14 PSI, respectively, to deflect 25% in the Y-direction, and required applied forces of 0.697 PSI and 0.250 PSI, respectively, to deflect 50% in the Y-direction. Examples 1 and 2 also exhibited rebound forces of 0.228 PSI and 0.072 PSI, respectively, in response to a 25% deflection in the Y-direction. Examples 1 and 2 also have SAG factors (e.g., PSI @ 50% Deflection divided by PSI @ 25% Deflection) of 1.470 and 1.790, respectively. Examples 1 and 2 exhibited recovery ratios (e.g., PSI @ 25% Deflection divided by PSI @ 25% rebound) of 0.481 and 0.587, respectively. Finally, Examples 1 and 2 exhibited guide factors (i.e., PSI @ 25% Deflection divided by OPSY) of 0.012 and 0.006, respectively.

Counter Examples 1-5 involve different insulation materials with similar thicknesses and surface densities (OPSY). As can be gleaned from Table 1, insulation products of the disclosed embodiments (e.g., insulation product 100a) with surface densities similar to Example 1 have a relatively low sag factor, high rebound, high recovery ratio, and high guide factor. Similarly, insulation products of the disclosed embodiments with significantly lower surface densities similar to Example 2 still have low sag factors and high recovery ratios. Thus, as stated above, the various counter examples 1-5 have poor cushioning properties compared to the inventive insulation products disclosed herein.

In some embodiments, due to the uniform distribution of the wavelike pattern formed in core 104 of insulation product 100a, insulation product 100a exhibits properties of resistance to compression forces applied to insulation product 100a in the transverse direction, which is in the Z-direction as shown in FIGS. 1A-1, 1A-2, and 1B. These compression resistance properties provide structure to insulation product so that it maintains its shape in the transverse direction to ensure it covers or overlaps with the item(s) to be insulated. Table 2 below illustrates the transverse compression properties of example insulation products according to embodiments described herein as compared to insulation products not formed according to the inventions.

TABLE 2

Comparison of Transverse Compression Properties

| Name | Length (inch) | Surface Density OPSY (oz./sq. yd.) | Transverse Compression (lbs./sq. inch) |
|---|---|---|---|
| Example 1 | 12 | 25.00 | 5.17 |
| Example 2 | 12 | 19.00 | 4.53 |
| Example 3 | 12 | 10.00 | 3.67 |
| Counter Example 1: Cellulose Fiber | 7 | 54.7 | 0.96 |
| Counter Example 2: Tissue Paper | 9 | 9.40 | 0.68 |
| Counter Example 3: Polyethylene Fiber | 7 | 29.00 | 0.43 |
| Counter Example 4: Denim Fiber | 7 | 34.90 | 0.39 |

Examples 1-3 are exemplary insulation products according to the disclosed embodiments that have a first layer, a second layer, and a core placed in between and attached to the first and second layers but have different surface densities (OPSY) as noted in Table 2. As shown, these examples require a force greater than 1 lbs. per square inch, including greater than 2 lbs. per square inch, greater than 3 lbs. per square inch, greater than 4 lbs. per square inch, and greater than 5 lbs. per square inch, to compress the exemplary insulation products in a transverse direction. In contrast, the Counter Examples 1-4 requires less force (<0.96 lbs./per inch) to compress the comparative products in the transverse direction. Thus, insulation product 100a may provide rigidity and stability for protecting items or keeping shipping items in place during certain shipping applications (e.g., using insulation product 1400 placed (see FIG. 14) on its side and placing an item for shipping on top).

In some embodiments, insulation product 100a may have R values, a way to measure how much resistance the insulation has to heat flow, that can range from about 0.9 per inch to about 3.5 per inch (e.g., about 1.5 inch to about 2.5 per inch). In some embodiments the R values are less than about 0.9 per inch and greater than about 3.5 per inch. In various embodiments, insulation product 100a may have a thickness between about 0.01" to 3.0" in the Y-direction. In other embodiments, insulation product 100a may have a thickness between about 0.25" to 1.25" in the Y-direction.

For purposes of the insulation products disclosed here, "take up factor" or "fill rate" may be used to quantify the amount of material used to form core 104, or alternatively, to determine the density of core 104. Take up factor, or fill rate, is the ratio of the length of the material used to form core 104 (e.g., the length of core material if it were spread flat—not in its wavelike form—and measured) to the length of the first layer 102a and/or the second layer 102b that core 104 is formed on or between, also referred to as the laminate length). The take up factor may also correspond to the ratio of the speed at which core 104 is fed in the manufacturing process (e.g., core 104 feed rate) as compared to the ratio of speed at which first layer 102a and/or second layer 102b are fed in the manufacturing process (e.g., first layer 102a feed rate). Insulation product 100a may have a "fill rate" in the range of greater than 1:1 up to 60:1, such about 1.2:1, about 1.4:1, about 1.6:1, about 1.8:1, about 2.0:1, about 2.2:1, 2.4:1, about 2.6:1, about 2.8:1, about 3.0:1, about 3.2:1, about 3.4:1, about 3.6:1, about 3.8:1, about 4.0:1, about 4.2:1, about 4.4:1, about 4.6:1, about 4.8:1, about 5.0:1, about 5.2:1, about 5.4:1, about 5.6:1, about 5.8:1, about 6.0:1, about 6.2:1, about 6.4:1, about 6.6:1, about 6.8:1, about 7.0:1, about 7.2:1, about 7.4:1, about 7.6:1, about 7.8:1, about 8.0:1, about 8.2:1, about 8.4:1, about 8.6:1, about 8.8:1, about 9.0:1, about 9.2:1, about 9.4:1, about 9.6:1, about 9.8:1, about 10.0:1, about 12:1, about 14:1, about 16:1, about 18:1, about 20:1, about 22:1, about 24:1, about 26:1, about 28:1, about 30:1, about 32:1, about 34:1, about 36:1, about 38:1, about 40:1, about 42:1, about 44:1, about 46:1, about 48:1, about 50:1, about 52:1, about 54:1, about 56:1, about 58:1, or about 60:1, or any range between these fill rates. The antecedent (first number in the ratio) representing the core length value and the consequent (second number in the ratio) representing the first- or second-layer length value. In some embodiments, insulation product 100a may have a "fill rate" in the range of about 1.1:1 to about 7.5:1 for cores having basis weights in the range of 18 lbs. per 3000 ft.$^2$ to 75 lbs. per 3000 ft.$^2$, and for cores with product thickness ranging between 0.25 inches to 1.25 inches in the Y-direction.

Embodiments of insulation products with the invention can be constructed with varying thicknesses, core basis weights, and other features by manipulating the core fill rate. Insulation products 100a, 100a-3, 100a-4 may have a core fill rate of 1.1:1 to 7.5:1. For example, insulation products 100a, 100a-3, 100a-4 may have a core fill rate of 1.5:1 to of 6.5 for 22.5 lbs. per 3000 ft.$^2$ core basis weight paper for an insulation product 100a, 100a-3, 100a-4 having a thicknesses 0.25 to 1.25 inches.

Insulation product 100a, 100a-3, 100a-4 created with a fill rate of 1.1:1 to 7.5:1 may have an indentation force deflection of about 0.75 to about 205 pounds per square inch (e.g., about 12 to about 85 pounds per square inch for 22.5 lbs./3000 ft.$^2$ core basis weight paper for insulation product 100a, 100a-3, 100a-4 having a thicknesses about 0.25 to about 1.25 inches) at a 25% reduction in thickness of insulation product 100a, 100a-3, 100a-4. The indentation force deflection for the 25% reduction in thickness for these insulation products may be about 1 PSI to about 20 PSI, about 20 PSI to about 40 PSI, about 40 PSI to about 60 PSI, about 60 to about 80 PSI, about 80 to about 100 PSI, about 100 to about 120 PSI, about 120 PSI to about 140 PSI, about 140 PSI to about 160 PSI, about 180 to about 200 PSI. Such insulation products may also have an indentation deflection force of about 1 to about 180 pounds per square inch (e.g., 7 to 65 pounds per square inch with 22.5 lbs./3000 ft.$^2$ core basis weight paper for insulation product 100a, 100a-3, 100a-4 having a thickness about 0.25 to about 1.25 inches) at a 50% reduction in thickness of insulation products 100a, 100a-3, 100a-4. The indentation force deflection for the 50% reduction in thickness for these insulation products may be about 1 PSI to about 20 PSI, about 20 PSI to about 40 PSI, about 40 PSI to about 60 PSI, about 60 to about 80 PSI, about 80 PSI to about 100 PSI, about 100 to about 120 PSI, about 120 PSI to about 140 PSI, about 140 PSI to about 160 PSI, about 160 PSI to about 180 PSI. Such insulation products may have an indentation yield deflection force of 0.5 to 30 pounds per square inch at a 25% reduction in thickness of insulation products 100a, 100a-3, 100a-4. The indentation yield deflection at 25% reduction in thickness may be about 10 PSI to about 25 PSI, about 0.5 PSI to about 3, about 3 PSI to about 6 PSI, about 6 PSI to about 9 PSI, about 9 PSI to about 12 PSI, about 12 PSI to about 15 PSI, about 15 PSI to about 18 PSI, about 18 PSI to about 21 PSI, about 21 PSI to about 24 PSI, about 24 PSI to about 27 PSI, about 27 PSI to about 30 PSI.

Such insulation products may also have an R-value of about 0.9 to about 2.2 (e.g., between about 1.3 and about 1.7 with 22.5 lbs./3000 ft.$^2$ core basis weight paper for an insulation product 100a, 100a-3, 100a-4 having a thickness about 0.25 to about 1.25 inches). The R-value may be about 0.9, about 1.1, about 1.3, about 1.5, about 1.7, about 1.9, about 2.2 or ranges between these values.

For compression testing, ASTM D3574 was used. In particular, the forced required to compress insulation products 100a, 100a-3, 100a-4 25% was measured from its original thickness (e.g., in the Y-direction of FIG. 1A-1 or 1A-2) to arrive at an indentation deflection force (IFD) in pounds per square inch (PSI). Insulation products 100a-3, 100a-4 were further compressed another 25%, or a total of 50% of its original thickness (e.g., in the Y-axis of FIG. 1A-1 or 1A-2), the supplied force was measured to make the 50% compression to arrive at an IFD in PSI. Finally, the inventors, reduced the compression of insulation product 100a, 100a-3, 100a-4 back to 25% of the original thickness (e.g., in along the Y-axis of FIG. 1A-1 or 1A-2) and measured the force to maintain 25% compression to arrive at an indentation yield deflection (IYD) force in PSI. For the R-value testing, inventors used a heat flow meter for testing R-values of insulation products 100a, 100a-3, 100a as varying fill rates, product thicknesses, and basis weights for cores 104. The R-value is the thermal insulation value of the material at the specified thickness.

First layer 102a and second layer 102b may be attached to core 104 using an adhesive or other attachment means. For example, the first layer 102a may include paper coated with a heat or pressure activated adhesive (e.g., polymeric film) disposed on portions (e.g., upper loops 106a) of core 104 that are adjacent to the first layer 102a that create a bond between first layer 102a and core 104 at first layer contact points 107a (see FIG. 1C-1 to 1C-4) when heat and/or pressure is applied to the first layer 102a that is in contact with the portions of core 104 that are adjacent to it. In some embodiments, first layer 102a and second layer 102b may include a polymeric film to a water barrier. Similarly, second layer 102b may also include paper coated with a heat or pressure activated adhesive disposed on portions (e.g., lower loops 106b, 106c) of core 104 that are adjacent to second layer 102b for bonding to second layer 102b at second layer contact points 107b (see FIG. 1C-1 to 1C-4). In other embodiments, strips or beads of hot melt or other adhesives may be applied to first layer 102a (and/or second layer 102b) just prior to attaching or laminating first layer 102a and second layer 102b with core 104. In other embodiments, no first and second layers 102a, 102b are used and instead tape (e.g., two or more strips of tape), hot glue or other attachment means (potentially combined with a strip of paper) may be applied to the upper loops and the lower loops to secure the core in a wavelike pattern.

FIG. 1C-2 is a side view of an insulation product similar to product 100a of FIG. 1C-1, except that core 104 of product 100a-2 may be U-shaped loops 106a, 106b instead of having the S-shaped curved loops 106a, 106b of product 100a of FIG. 1C-1. Although, FIG. 1C-2 shows the loops 106a, 106b spaced apart, these loops may be contacting adjacent loops 106a, 106b. As shown, the one or more U-shaped loops 106a, 106b may include at least one portion that is 5 to 90 degrees (e.g., 90 degrees) with respect to the first layer 102a and/or the second layer 102b. In other words, the U-shaped loops do not necessarily have to include a vertical portion or 90-degree portion with respect to the first layer 102a and/or the second layer 102b.

FIG. 1C-3 is a side view of an insulation product 100a-3 that is similar to insulation product 100a of FIG. 1C-1, except that core 104 of product 100a-3 may include one or more S-curves or reverse curves such that the core 304 includes a curve facing a machine direction) followed with a curve in the opposite direction. The S-curve may not have a substantially straight portion between the opposite facing curves. This will be described more fully with respect to FIG. 3B.

FIG. 1C-4 is a side view of an insulation product 100a-4 is similar to insulation product 100a-3 of FIG. 1C-3 except that two or more upper loops 106a and/or two or more lower loops 106b may be spaced apart such that they do not contact each other.

Figures 1, 1D:
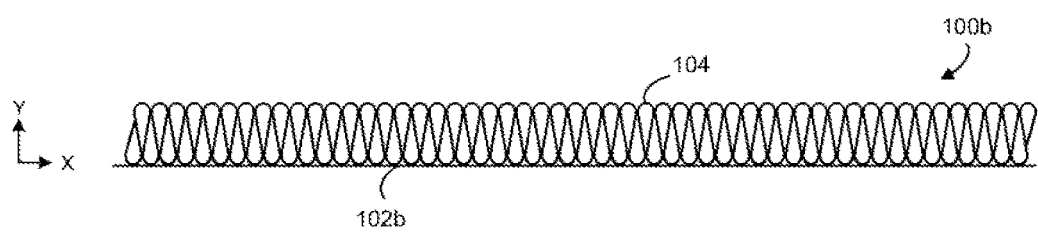
Figures 1, 1D, 2:
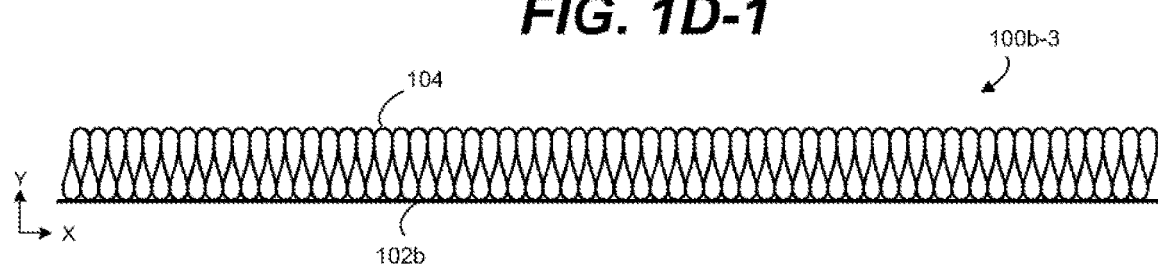
Figures 1, 1D, 2, 3:
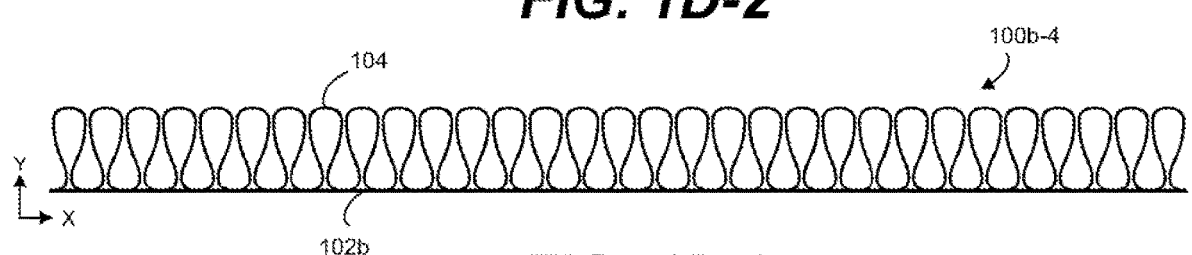

FIG. 1D-1 is a side view of an insulation product 100b according to an exemplary embodiment. As shown in FIG. 1D-1, insulation product 100b is the same as insulation product 100a, except that insulation product 100b may not include a first layer 102a. Instead, core 104 of insulation product 100b may be only attached to the second layer 102b. Similarly, FIGS. 1D-2 and 1D-3 illustrate side views of insulation products 100b-3 and 100b-4 that are similar to insulation products 100a-3 and 100a-4, respectively, except that they do not include a first layer 102a.

Figure 1E:
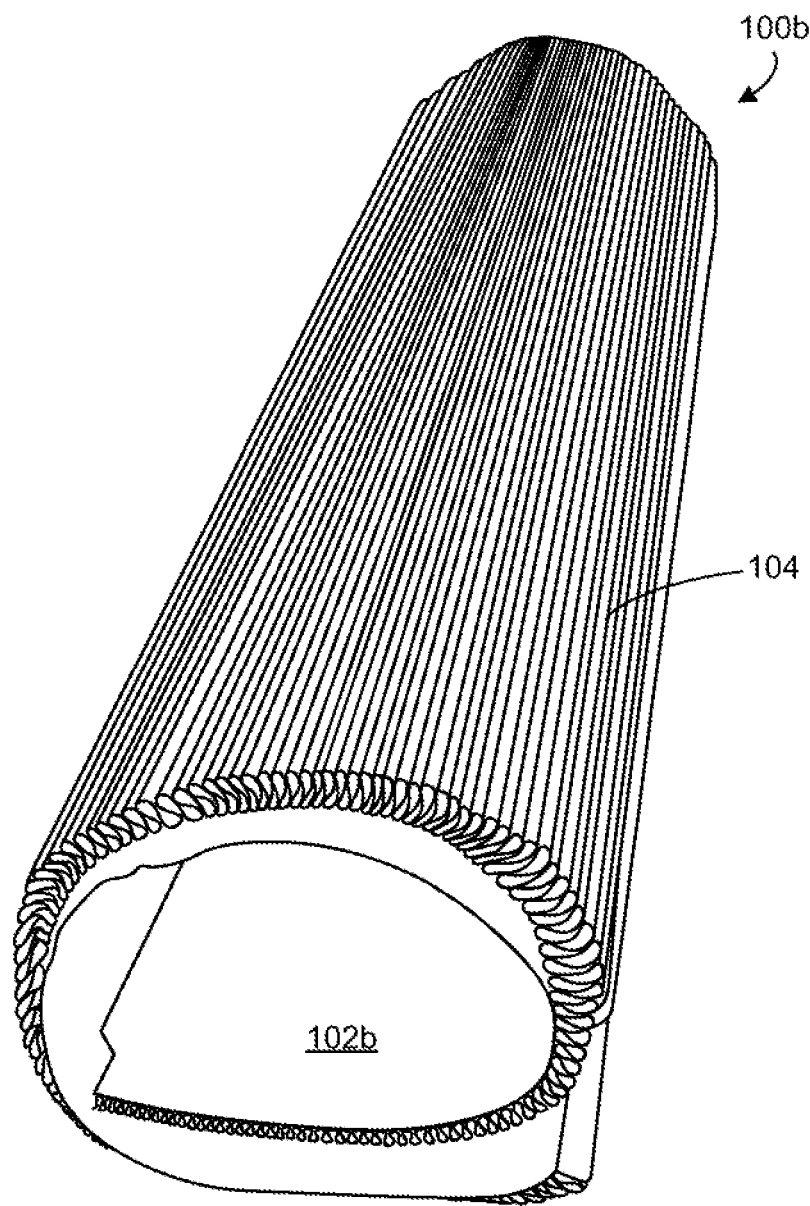
FIG. 1E is a perspective view of the rolled insulation product of FIG. 1D-1.

FIG. 1E is a perspective view of the rolled insulation product of FIG. 1D-1. As shown, insulation product 100b is rolled or folded with only the second layer 102b holding core 104 in its wavelike form. Insulation product 100b may be easily wrapped around items.

Figures 1, 1F:
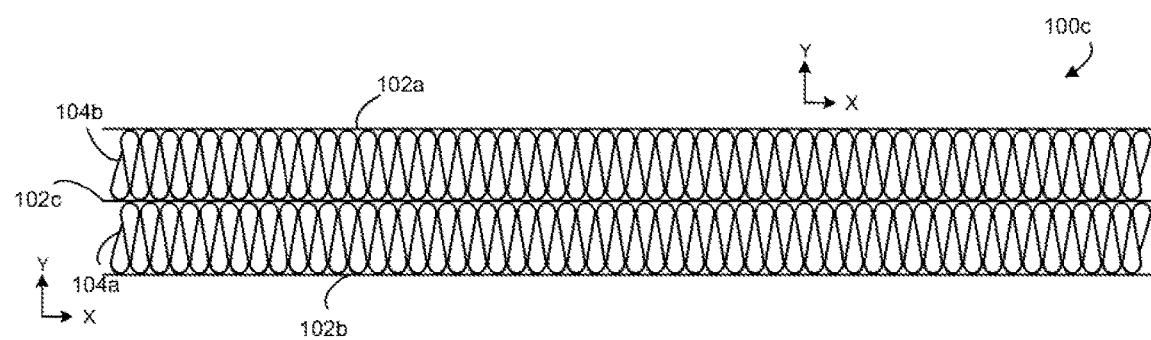
Figures 1, 1F, 2:
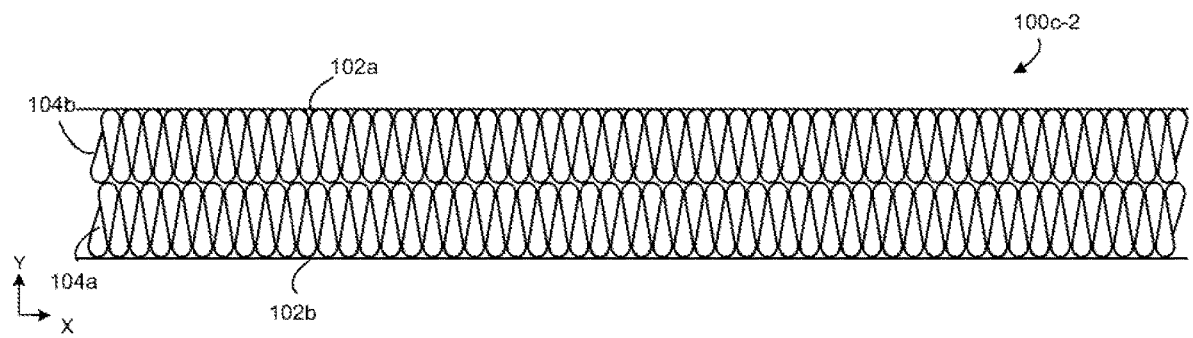
Figures 1, 1F, 2, 3:
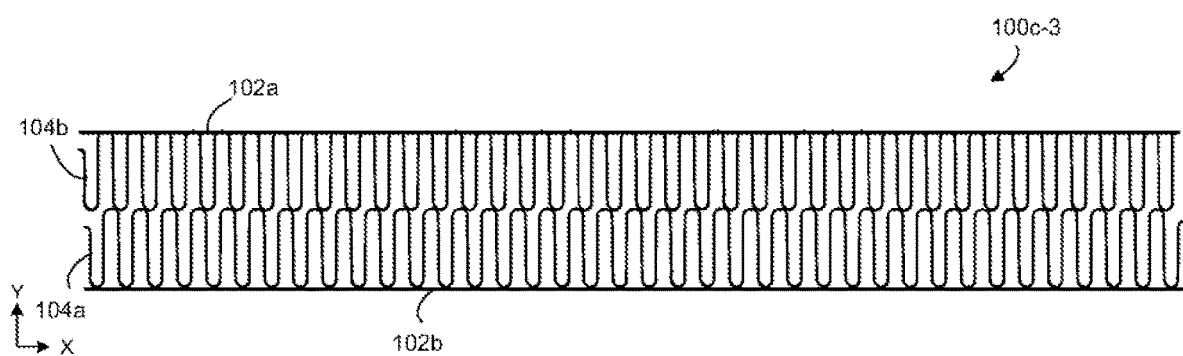

FIG. 1F-1 is a side view of an insulation product 100c including two or more stacked cores according to an exemplary embodiment. As shown in FIG. 1F-1, insulation product 100b may include two cores (a first core 104a and a second core 104b) along a first layer 102a attached to the top of the second core 104b, a second layer 102b attached to the bottom of the first core 104a, and a third layer 102c attached to the top of the first core 104a and bottom of the second core 104b. In other embodiments, a similar insulation product may exclude the first layer 102a attached to the top of the second core 104b. In other embodiments, a similar insulation product may include a fourth layer 102d between the third layer 102c and the second core 104b so that the third layer 102c is attached to the top of the first core 104a and the bottom of the fourth layer, which is attached to the bottom of the second core 104b. In various embodiments, the first layer 102a, second layer 102b, third layer 102c, and fourth layer (not shown) may include the same or different materials from other layers. More specifically, the first layer 102a, second layer 102b, third layer 102c, and fourth layer (not shown), may comprise kraft paper, machine glazed (MG) paper, smooth finished (SF) paper, machined finished (MF) paper, glassines, paper-based product, and/or super-calendered kraft (SCK) paper. Two or more cores (different material, similar material, or the same material and density) may be used and combined to create intended areas of compression and compression resistance to meet both thermal, cushioning needs, and volume needs for a particular item or items. For example, an insulation product with five (5) stacks (outer/laminate layer, core, outer/laminate layer) was found to have an R value of about 3.8. As will be described later with respect to FIGS. 19A-19E, insulation product 100c may be formed into a pouch or envelop where an item for shipping may be placed inside between the two core layers 104a, 104b or between the third layer 102c and fourth layer.

FIG. 1F-2 is a side view of an insulation product 100c-2 including two stacked cores 104a, 104b, without a barrier layer in between, according to an exemplary embodiment. As shown, core layers 104a, 104b may directly contacting one another, be spaced apart, or some combination thereof. As will be described later with respect to FIGS. 19A-19E, insulation product 100c-2 may be formed into a pouch or envelop where an item for shipping may be placed inside between the two core layers 104a, 104b.

FIG. 1F-3 is a side view of an insulation product including two U-shaped stacked cores, according to an exemplary embodiment. As shown, core layers 104a, 104b may directly contacting one another, be spaced apart, or some combination thereof. As will be described later with respect to FIGS. 19A-19E, insulation product 100c-3 may be formed into a pouch or envelop where an item for shipping may be placed inside between the two core layers 104a, 104b.

In some embodiments, insulation product 100c, 100c-2, 103c-3 or other embodiments disclosed herein may including two different stacked cores 104a, 104b. In some embodiments, core 104a may have a thickness that is larger than core 104b or vice versa. In some embodiments, core 104a may include a different material than core 104b. For example, core 104a may include cushioning tissue paper whereas core 104b may include more rigid compression resistant kraft paper. Regardless of the material make up and the exact height, two or more different cores may be used and combined to create intended areas of compression and compression resistance to meet both thermal, cushioning needs, and volume needs for a particular item or items.

Figure 1G:
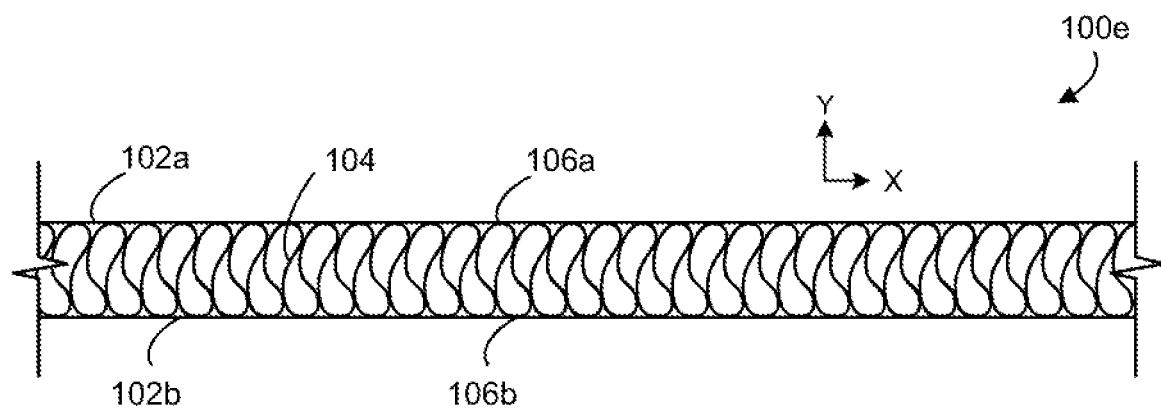
FIG. 1G is a side view of an insulation product, according to an exemplary embodiment.

FIG. 1G is a side view of an insulation product 100e according to an exemplary embodiment. Like insulation product 100a, insulation product 100e may include a first layer 102a, a second layer 102b, and a core 104c including upper loops 106a and lower loops 106b. However, in insulation product 100e, the upper loops 106a and lower loops 106b have larger minimum surface contact areas that respectively contact and attach to the first layer 102a and the second layer 102b than insulation product 100a. In other words, the upper loops 106a and the lower loops 106b may be slightly compressed or flattened by the respective first layer 102a and the second layer 102b to provide a larger surface contact area against the respective first and second layers 102a, 102b. Additionally, insulation product 100d has a reduced loop count (i.e., loop per inch) than insulation product 100a. The loop count and surface contact areas may be controlled based on a controllable feed rate for core 104c and setting a predetermined height or thickness for the product (both described below).

Figure 1H:
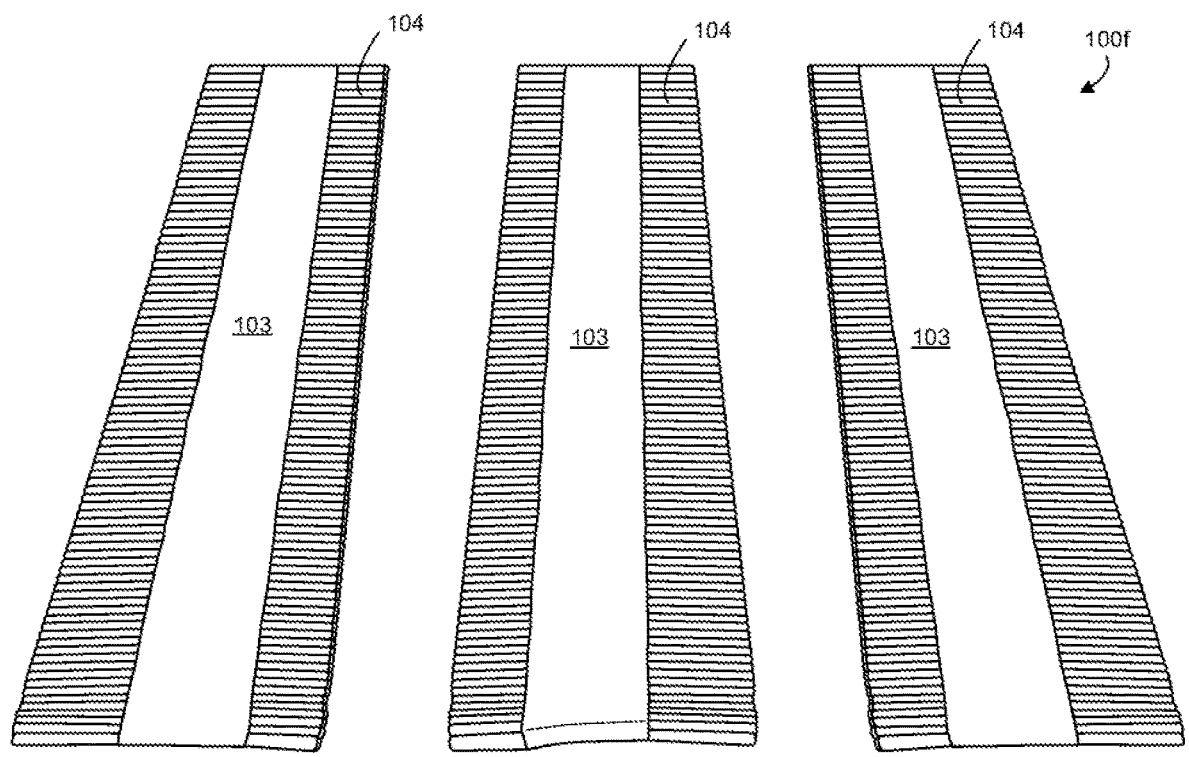
FIG. 1H is a perspective view of cut portions of an insulation product, according to an exemplary embodiment.

FIG. 1H is a perspective view of cut portions of an insulation product 100f, according to an exemplary embodiment. As shown, insulation product 100f may be cut into three strips with each including a core 104 and one or more holding strips 103 that hold core 104 in wave form. As shown, the one or more holding strips 103 may only cover a portion of core 104 leaving exposed portions of core 104 on its upper and lower surfaces. In some embodiments, first and/or second layers (not shown) may be used in place of the one or more holding strips and still create insulation product 100f. In some embodiments, insulation product 100f would be made from one of the machines described below and then fed into a separate lamination process to turn into FIG. 1I.

Figure 1I:
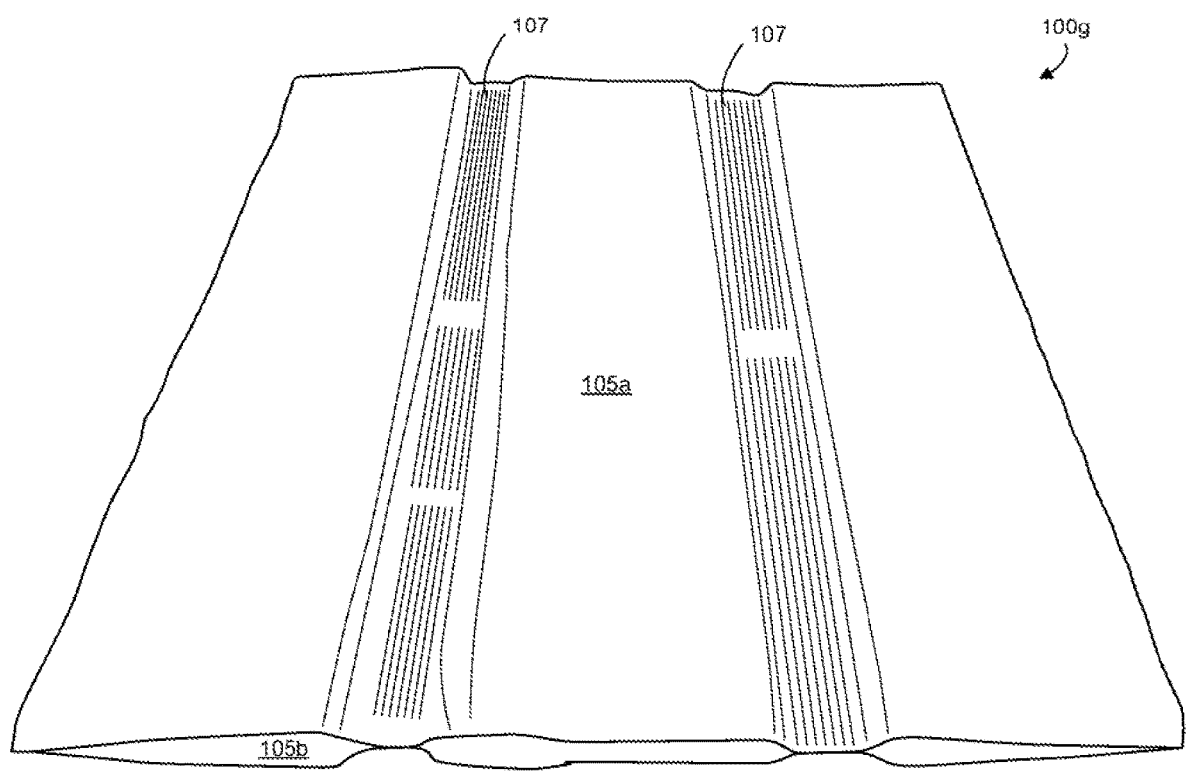
FIG. 1I is a perspective view of the cut portions of the insulation product of FIG. 1H with an upper and lower layer connecting and covering the cut portions, according to an exemplary embodiment.

FIG. 1I is a perspective view of the cut portions of insulation product 100f of FIG. 1H with an upper and lower layer connecting and covering the cut portions, according to an exemplary embodiment. As shown, an insulation product 100g may include a first cover layer 105a, a second cover layer 105b, and one or more joining seals 107 joining the first cover layer 105a and the second cover layer 105b together and between the cores 104 (shown in FIG. 1H) so that they can fold along the joining seals 107. The joining seals may be mechanical seals (as shown), adhesive-based seals, cohesive-based seals, heat seals, or ultrasonic seals.

Figure 1J:
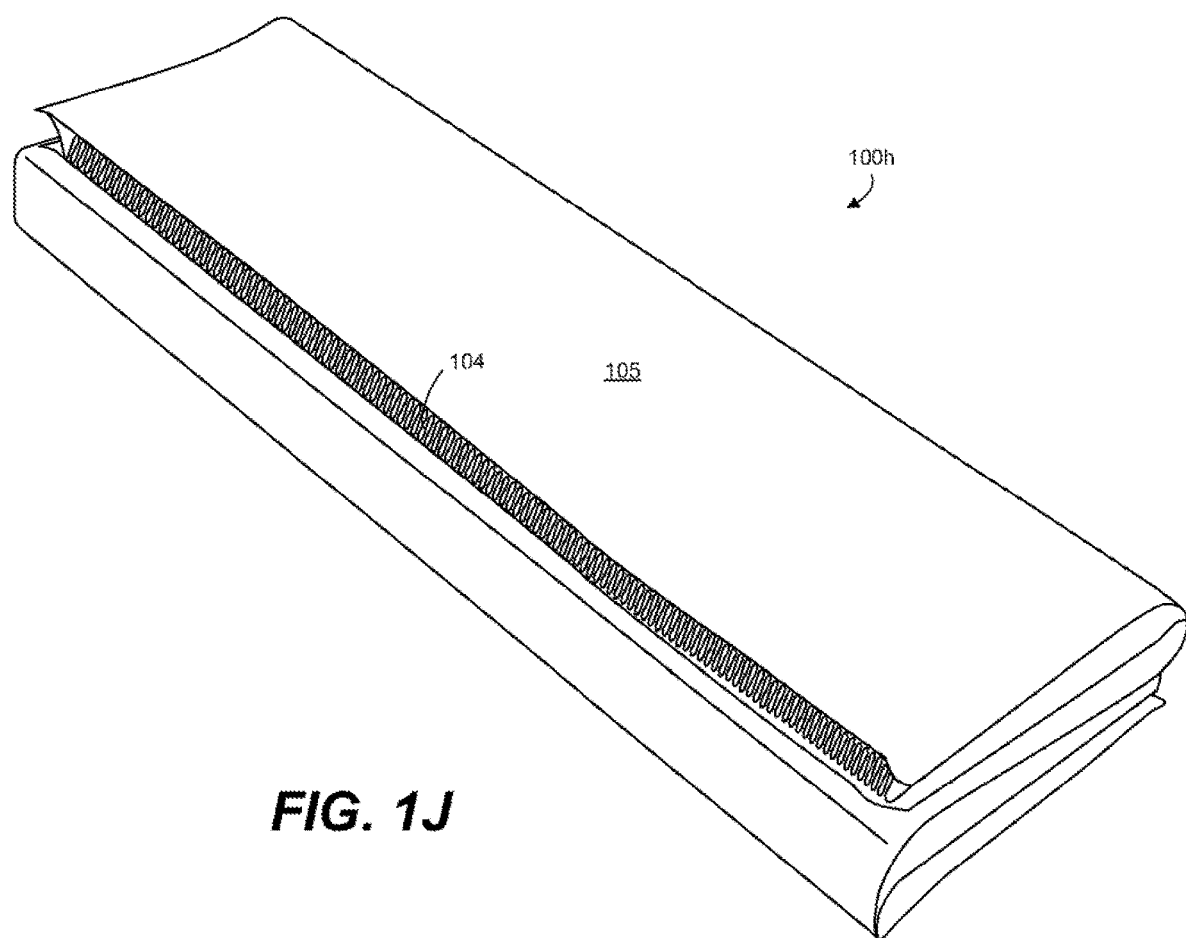
FIG. 1J is a perspective view of a folded version of the insulation product of FIG. 1I, according to an exemplary embodiment.

FIG. 1J is a perspective view of a folded version of insulation product 100g of FIG. 1I, according to an exemplary embodiment. Insulation product 100h may be folded along the spaces between the cores 104 to create a multi-layered cushioning or insulating product. Additionally, insulation product 100h (although not shown) may wrap around an item using the spaces between the cores 104 as flexible fold points.

Figure 1K:
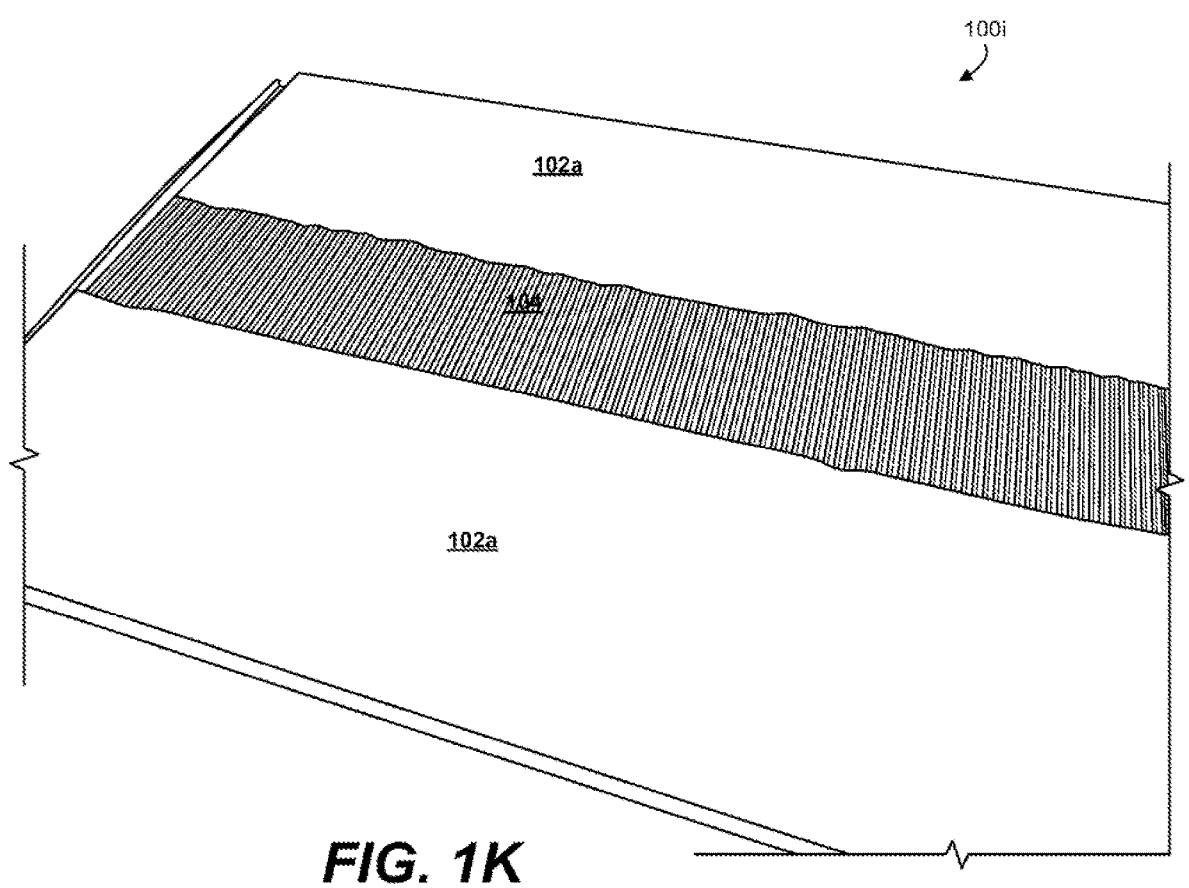
FIG. 1K is a perspective view of an insulation product with a core exposed through a first layer and/or a second layer, according to an exemplary embodiment.

FIG. 1K is a perspective view of an insulation product 100i with a core exposed through an upper layer and/or a lower layer, according to an exemplary embodiment. Put another way, the upper surface core of insulation product 100i is selectively laminated or covered with a first layer 102a rather than laminating or covering the entire upper surface of the core with first layer 102a, which could save on material cost in some applications. Although not shown, the lower surface of the core may be similarly laminated.

Figure 1L:
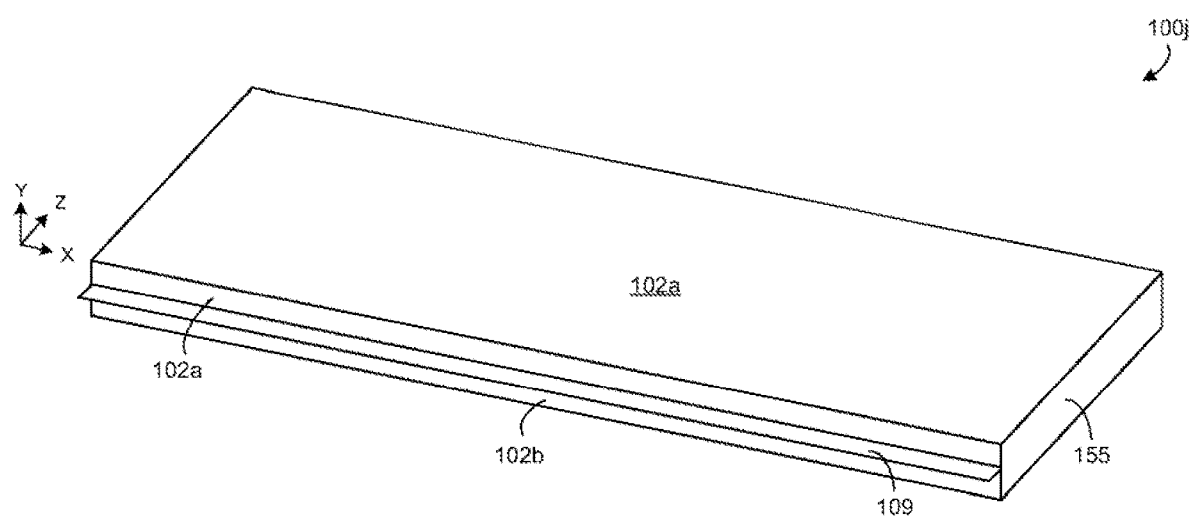
FIG. 1L is a perspective view of an insulation product with an upper and lower layer extending beyond and sealing the side of core, according to an exemplary embodiment.

FIG. 1L are perspective views of an insulation products 100j with an upper and lower layers 102a, 102b extending beyond the edge of core 104 in the transverse direction and sealing the sides of layers 102a. 102b together to encapsulate core 104, according to an exemplary embodiment. Such a fin seal (or side seal) 109 may be created on the edge of an insulation product using heated plates, rollers, or a combination of both (e.g., a continuous band sealer or a modified one that seals close to the core edge), or ultrasonic welding. In some embodiments, the outer layers (e.g., first and second layers 102a, 102b) are wider than core 104. Carefully designed guides or rollers will bring the protruding edges of the outer layers together, staging them for subsequent bonding. The outer layers are moved through a heat and/or pressure section that create a fin seal 109 along the edge as shown. Exemplary embodiments of insulation products with fin seals 109 may exhibit increased moisture resistance, increased compression resistance, increased insulation performance (e.g., 5 to 30% increase during testing such as about 28%) compared to an insulation product without fin seals. Exemplary embodiments with fin seals 109 had about 96%, 95%, and 94% thickness remaining after being subjected to 10 pounds per square foot (PSF), 15 PSF, and 25 PSF, respectively whereas analogous insulation products without fin seals had about 80%, 45%, and 38% remaining thickness after being subjected to 10 PSF, 15 PSF, and 25 PSF, respectively. In some embodiments, exemplary insulation products with fin seals may have about 85% thickness remaining or more after being subjected to 25 PSF. Additionally, in some embodiments, insulation product 100j may include an end cap 155 or an end seal (e.g., additional fin seals) (not shown) that are similar the fin seals but placed then end of the product (in the X-direction) such as where end cap 155 is located.

In some embodiments, insulations products may include two or more cores 104 (not shown). In some embodiments, two different cores 104 may be fed together to form a wave structure with specific benefits. For example, a first core 104 may be a non-woven sheet whereas a second core may be a paper sheet. The paper sheet may provide structural integrity (e.g., helps maintain the wave structure) whereas the non-woven sheet may add to the thermal performance of the associated insulation product by reduced thermal conduction. Such an insulation product may also include first layer 102a and second layer that attach to the two different cores 104 to hold the wave form of each core 104. For example, the first or top core may be attached to first layer 102a while the second or bottom core may be attached to second layer 102b. In some embodiments, the two or more cores 104 may include slits or opens so that each core may be bonded to respective first or second layers 102a, 102b directly or via the slits or openings.

Figure 1M:
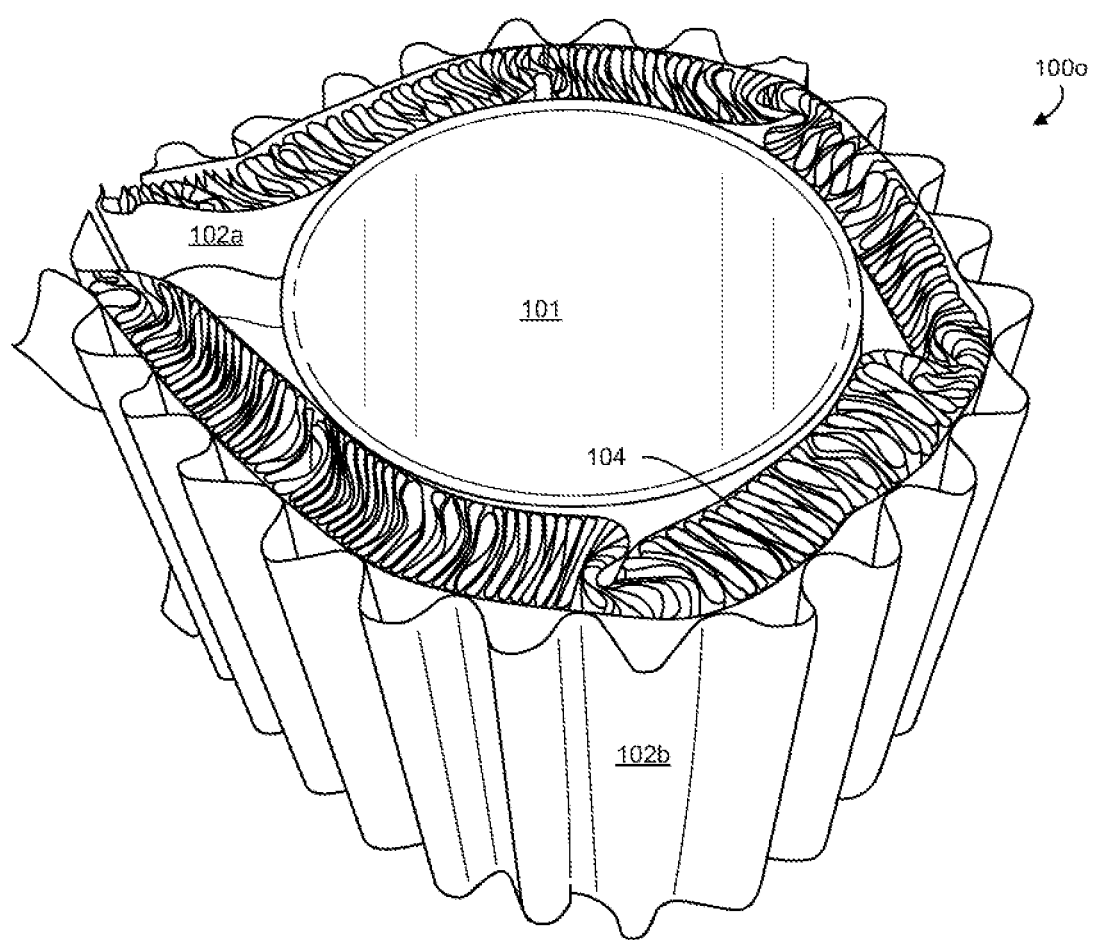
FIG. 1M is a perspective view of an insulation product with different outer layers, according to an exemplary embodiment.

FIG. 1M is a perspective view of an insulation product 100o with different outer layers, according to an exemplary embodiment. As shown, the first layer 102a may be a first material such as kraft paper and the second layer 102b may be a second material such as jumbo single faced flexible corrugate with a core 104 placed between and attached to the first layer 102a and the second layer 102b. The jumbo faced flexible corrugate may provide extra impact protection for delicate items such as coffee mug 101 or glass frames.

Figure 1N:
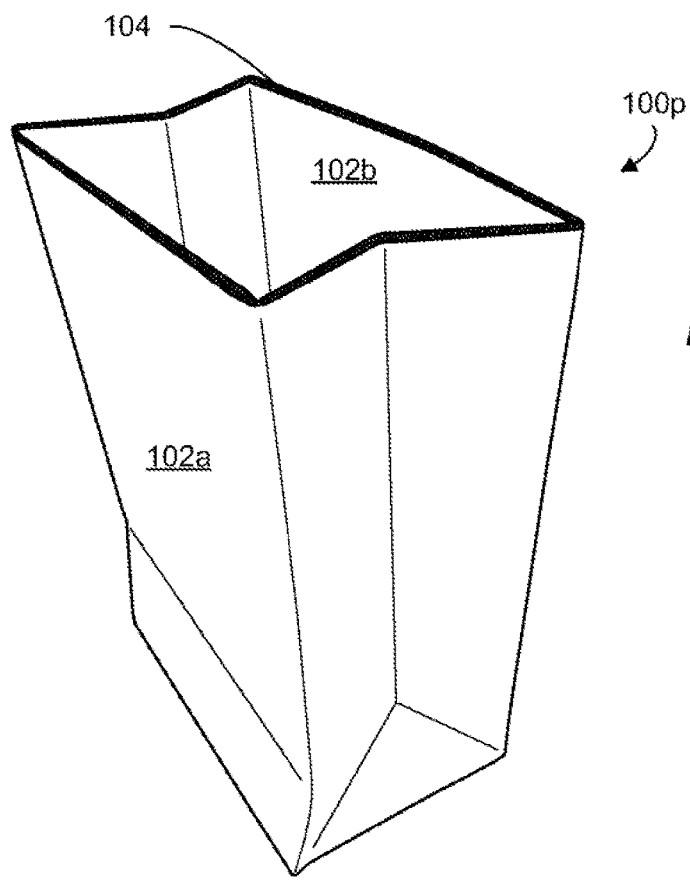
FIG. 1N is an upper perspective view of one or more insulation products assembled into a grocery bag, according to an exemplary embodiment.
Figure 1O:
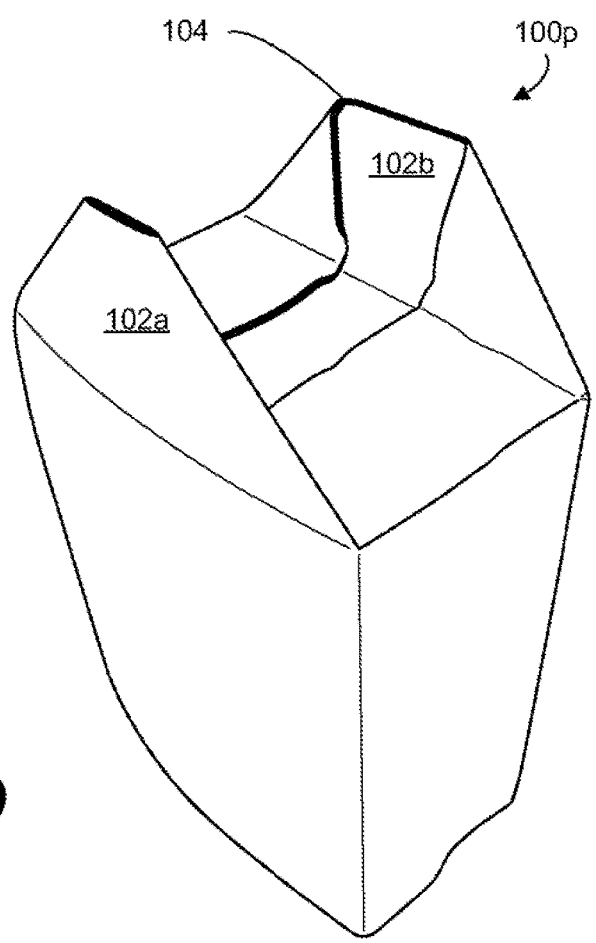
FIG. 1O is a lower perspective view of the one or more insulation products of FIG. 1N.

FIGS. 1N and 1O are upper and lower perspective views of one or more insulation products 100a assembled into insulation product 100p (e.g., a grocery bag), according to an exemplary embodiment. As shown, one or more insulation products 100a may include a core 104, a first layer 102a, and a second layer 102b, that may be folded and attached to itself using adhesive, heat bonding of polymer backed paper, or some other connection means such as a mechanical connection. Insulation product 100p may also be creased to promote folds and bends in specific areas. Insulation product 100p becomes an insulating one-piece tote once assembled. By simply taking one or more insulation products (e.g., insulation product 100a) (or portions thereof) produced by one or more of the machines described herein and adding a creasing and gluing operations, insulation product 100p may be easily assembled.

Figure 1P:
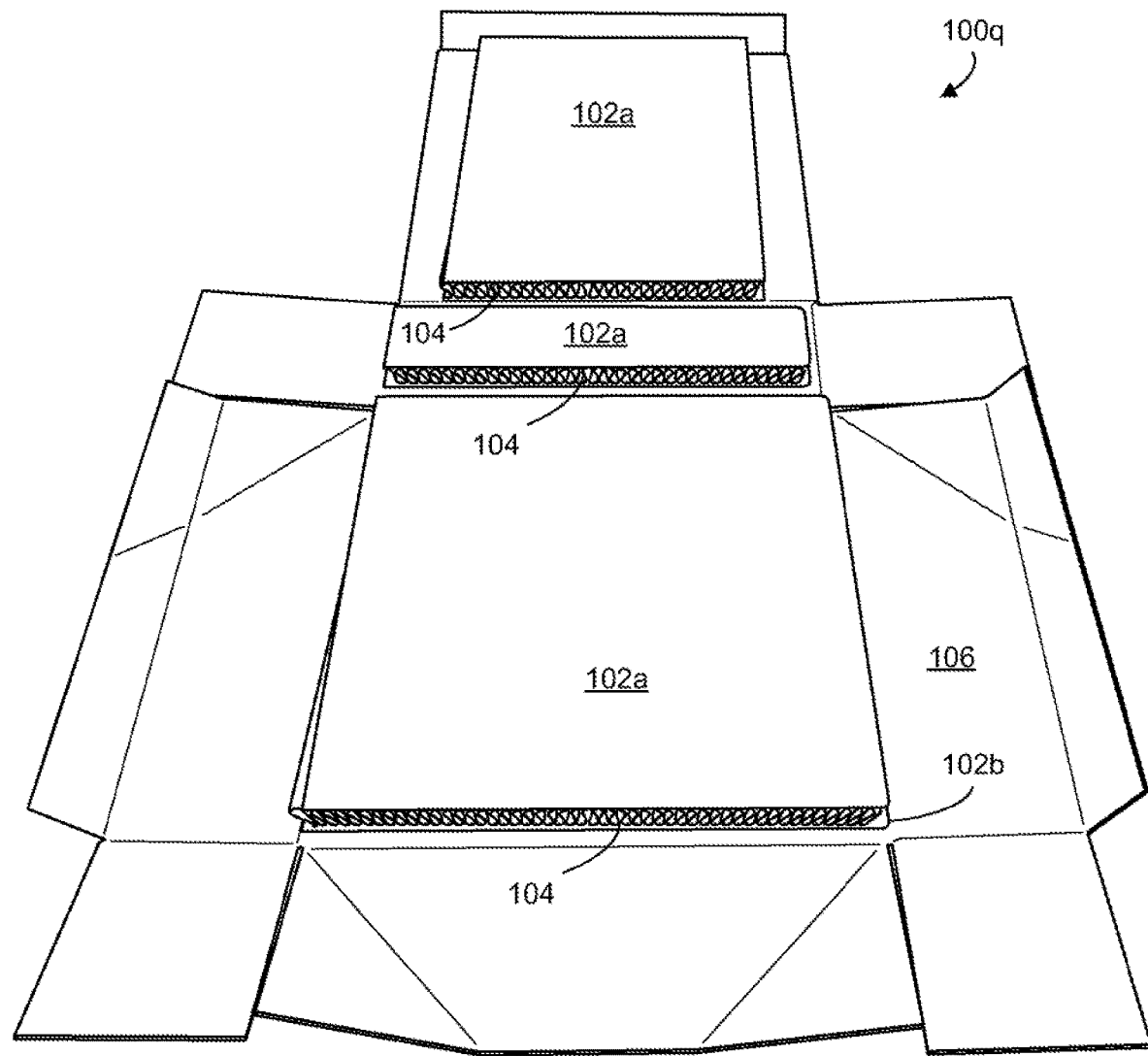
FIG. 1P is a perspective view of one or more insulation products (or portions thereof) attached to inner portions of a flattened box, according to an exemplary embodiment.

FIG. 1P is a perspective view of one or more insulation products 100q attached to inner portions of a flattened box 106, according to an exemplary embodiment.

Figure 1Q:
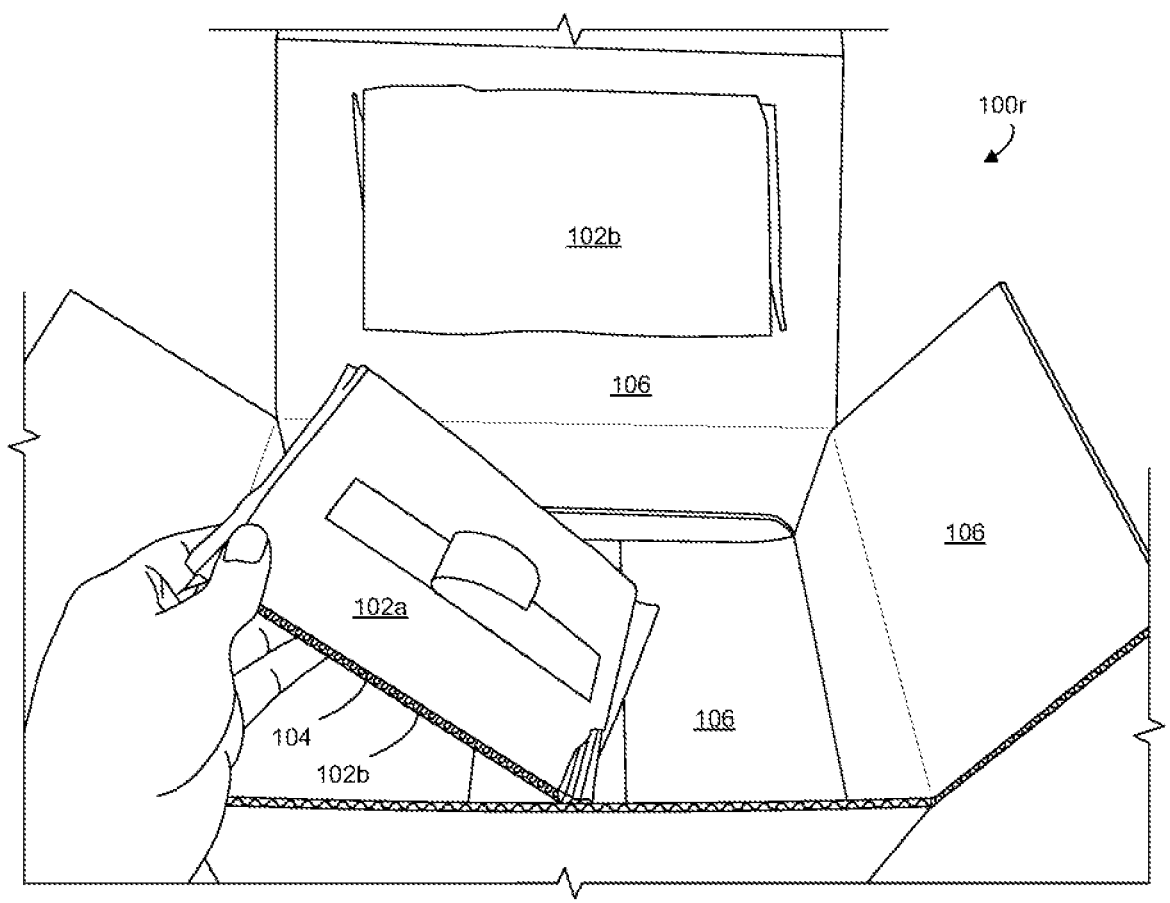
FIG. 1Q is a perspective view of one or more insulation products (or portions thereof) being attached to inner portions of a formed box, according to an exemplary embodiment.

FIG. 1Q is a perspective view of one or more insulation products 100r being attached to inner portions of a formed box 106, according to an exemplary embodiment.

Figure 2A:
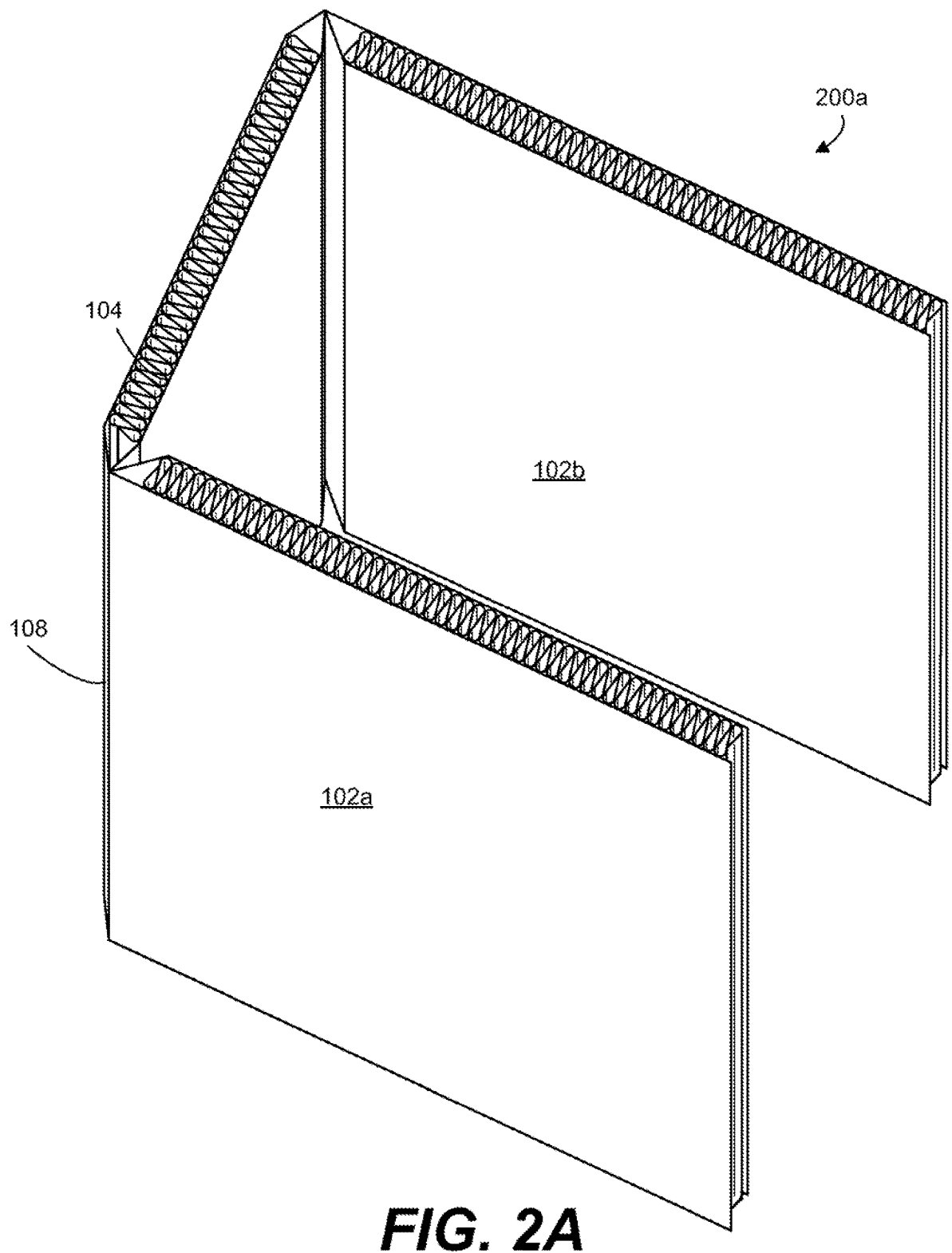
FIG. 2A is a perspective view of a folded insulation product for inserting into a shipping container.

FIG. 2A is a perspective view of a folded insulation product for inserting into a shipping container. As shown in FIG. 2A, insulation products described above may be made long enough so that they may be folded at exemplary folds 108 into a C-shaped configuration 200 and placed in a shipping container such as a box. In other embodiments, insulation products described above, may not be folded but rather wrapped around the inner sides of a grocery paper bag to insulated groceries placed in the paper bag. An additional unwrapped rectangular insulation product (e.g., insulation product 100a, 100b, 100c, or 100d) may be placed at the bottom of the grocery paper and another one may be placed on top of groceries placed on the rectangular insulation product.

Figure 2B:
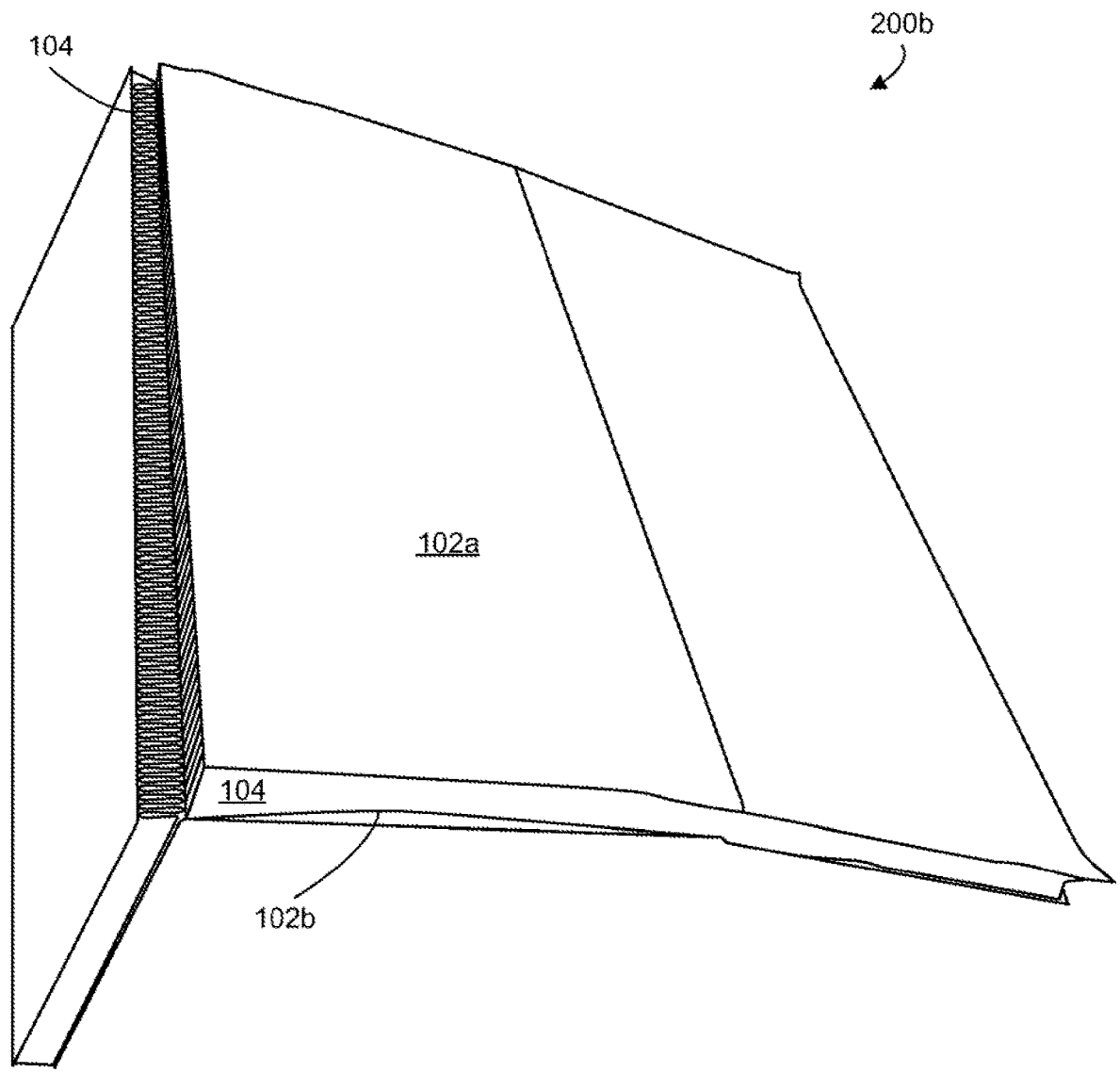
FIG. 2B is a perspective view of an insulation product having one or more partially cut portions, according to an exemplary embodiment.

FIG. 2B is a perspective view of an insulation product 200b having one or more partially cut portions in the machine direction, according to an exemplary embodiment. Insulation product 200b may include a core 104, a first layer 102a, and a second layer 102b as previously described.

FIG. 3A is side view of an insulation product of FIG. 1A-1 according to an exemplary embodiment. As shown in FIG. 3A, insulation product 300a may include a core 304 of continuous paper sheet disposed between a first layer 302a and a second layer 302b. The core 304 may include a plurality of upper loops 306a and a plurality of lower loops 306b where the upper loops 306a contact the first layer 302a and the lower loops 306b contact the second layer 302b. Additionally, each upper loop 306a may contact the sides of adjacent upper loops 306a. Similarly, each lower loop 306b may contact the sides of adjacent upper loops. In some embodiments, at least some upper loops 306 contact adjacent upper loops and at least some lower loops contact adjacent lower loops.

In general, core 304 is formed linearly in a first direction (i.e., left to right) or machine direction (along an x-axis 320) from a first end 330 to a second end 340 of insulation product 300a. However, one or more loops (e.g., upper loops 306a and/or lower loops 306b) may include portions (e.g., first and second straight portions 355a, 355b and part of first lower curve 352 and second upper curve 360 described below) that extend in a second direction that is opposite the first direction (along the x-axis 320). Put another way, the continuous paper sheet may have a negative slope at certain points. For example, at center line 322a on x axis 320 a portion lower loop 306b overlaps with a portion of previously adjacent upper loop 306a with respect the first direction. As a similar example, a portion of upper loop 306a may overlap with a portion of previously adjacent lower loop 306b with respect to the first direction. In some embodiments, a center line (e.g., center line 322a) at a point on the x axis may contact may bisect four or more layers. Here, center line 322a is shown to bisect one or more layers of insulation product 300a five times (e.g., the first layer 302a, the core 304 three times, and then the second layer 302b). Put more simply, center line 322a vertically bisects the core 303 three times. This is much different from a corrugated structure in which a similar center line would only bisect a maximum of three layers of a product at any given point along an x axis.

One or more lower loops 306b may include a first lower curve 352 that is convex in relation to the machine direction (X-direction) and a second lower curve 366 that is concave in relation to machine direction. One or more upper loops 306a may include a first upper curve 358 that is concave in relation to the machine direction and a second upper curve 360 that is convex in relation to the machine direction. The first lower curve 352 may be connected to the first upper curve 358 via a first straight portion 355a that may extend partially opposite the machine direction toward the first end 330. Similarly, the second upper curve 360 may be connected to the second lower curve 366 via a second straight portion 355b that may extend partially opposite the machine direction toward the first end 330.

Figure 3B:
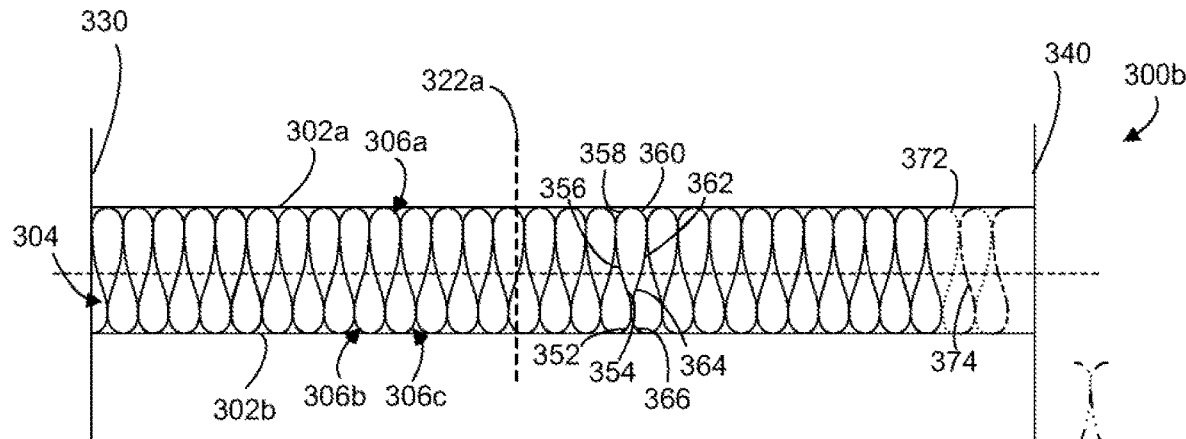
FIG. 3B is a schematic diagram of the insulation product of FIG. 1C-3 according to an exemplary embodiment.

FIG. 3B is a schematic diagram of insulation product of FIG. 1C-3 according to an exemplary embodiment. Insulation product 300b of FIG. 3B is similar to insulation product 300a of FIG. 3A, except that insulation product 300b includes core 304 with a plurality of connected s-curves or reverse curves 372, 374. As an example, each reverse curve 372, 374 or s-curve may include a curve facing the machine direction (X-direction) followed with a curve in the opposition direction. Put another way, insulation product 300b includes additional curved portions 354, 356, 362, 364, that directly connect without or with minimal straight portions 355a, 355b. For example, one or more lower loops 306b may include a third lower curve 354 proximate and directly connected to the first lower curve 352. The third lower curve 354 may traverse in a direction that is opposite the machine direction. The third lower curve 354 may be directly connected to a third upper curve 356 of an upper loop 306a without or with a minimal straight portion therebetween and be a convex curve in relation to the machine direction. The third upper curve 356 may be a concave curve in relation to the machine direction and may traverse opposite the machine direction. The third upper curve 356 may be proximate and directly connected to the first upper curve 358, which may be proximate and directly connected to the second upper curve 360. The second upper curve 360 may be directly connected to and proximate a fourth upper curve 362. The fourth upper curve 364 may be convex with respect to the machine direction and may traverse away from the machine direction. The fourth upper curve 364 may be directly connected to and proximate a fourth lower curve 364 of the lower loop 306b without or with a minimal straight portion therebetween. The fourth lower curve 364 may be proximate and directly connected to the second lower curve 366.

Figure 3C:
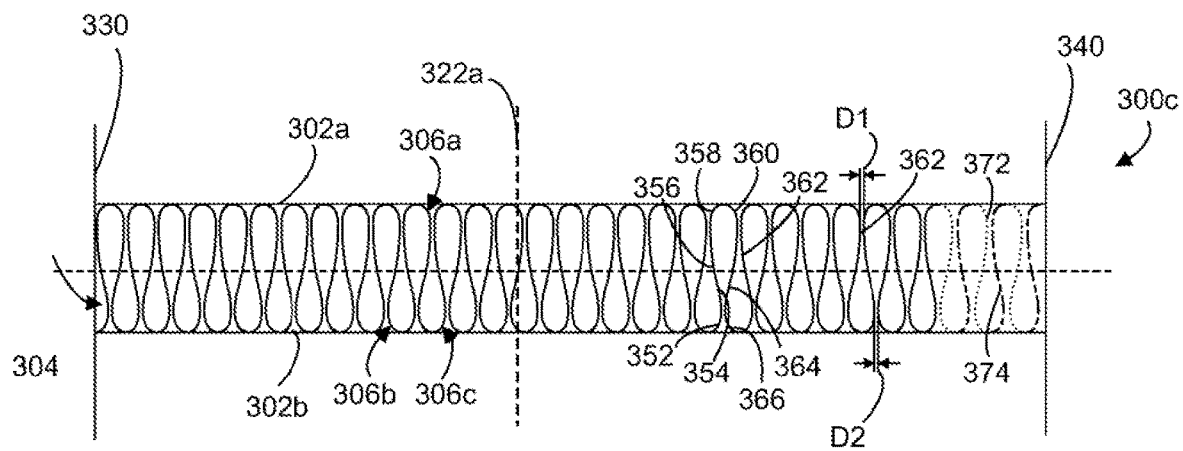
FIG. 3C is a schematic diagram of the insulation product of FIG. 1C-4 according to an exemplary embodiment.
Figure 4A:
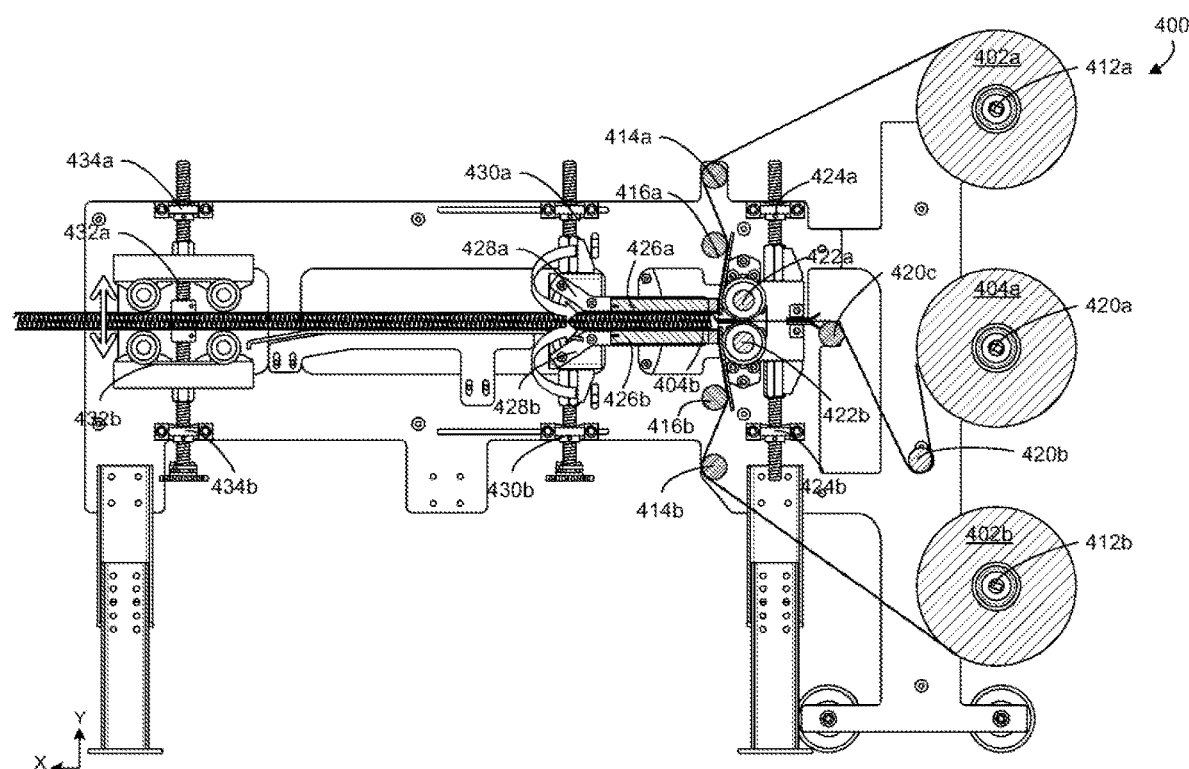
FIG. 4A is a side view of a machine for making one or more insulation products according to an exemplary embodiment.
Figure 4B:
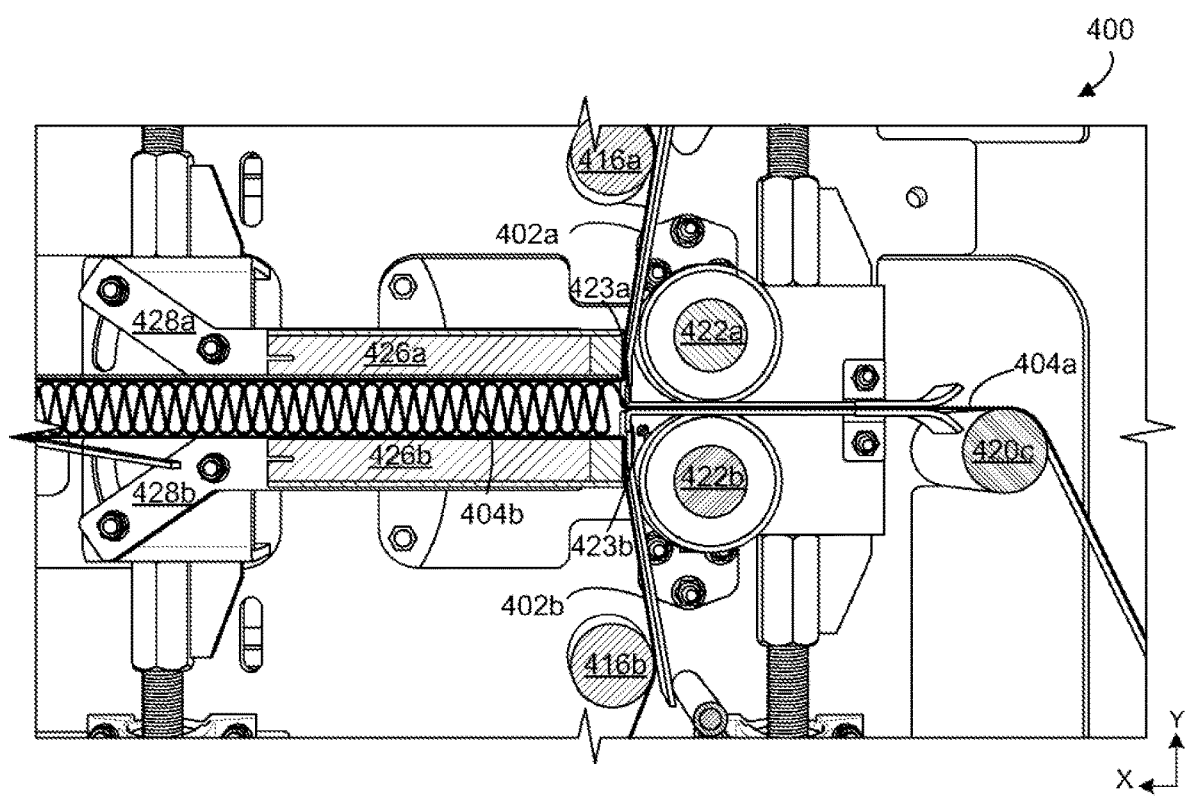
FIG. 4B is an enlarged view of a portion of FIG. 4A.

FIG. 3C is a schematic diagram of insulation product of FIG. 1C-4 according to an exemplary embodiment. Insulation product 300c of FIG. 3B is similar to insulation product 300b of FIG. 3B, except that one or more upper and/or lower loops 306a, 306b are not contacting each other. Instead, at least two upper loops 306a are spaced apart a distance D1 and/or at least two lower loops 306b are space apart a distance D2. FIG. 4A is a side view of a machine 400 for making one or more insulation products according to an exemplary embodiment. FIG. 4B is an enlarged view of FIG. 4A. As shown in FIG. 4A, machine 400 may include an initial core roller 420a configured to accept initial core 404a as a sheet of paper or other material. Initial core roller 420a may rotate so that the initial core 404a may be unrolled. In some embodiments, initial core roller 420a may be powered and in other embodiments a set of powered rollers or rotary members 422a, 422b may pull initial core 404a to unwind it from initial core roller 420a.

As briefly mentioned, machine 400 may also include a set of powered rollers or rotary members 422a, 422b configured to propel (e.g., at 0-500 ft./min., preferably 200-400 ft./min.) in the initial core 404a away from the initial core roller 420a to form a wave pattern including upper and lower flexible loops (described above) between two restraints 426a, 426b (described below). The wave pattern of formed core 404b may include a plurality of flexible loops each (or at least some) contacting at least one side of one or more adjacent flexible loops within the first space in some embodiments or spaced apart from one another in other embodiments. In some embodiments, formed core 404b may be able to self-correct to form the wave pattern. For example, initial core 404a may not form a perfect loop immediately when placed between two restraints 426a, 426b. However due to the nature of the paper, nearby formed flexible loops, the distance between two restraints 426a, 426b, and the rate the set of rotary members 422a, 422b (also referred to as feed rollers or powered rollers) are set to, formed core 404b self-corrects to form upper and lower loops in line with the rest of the formed core 404b. For a given material (e.g., kraft paper), at a given thickness, and a given core density, one pattern represents the most uniform distribution of spring tension for the material. The core 404b tends to "self-organize" as it is formed due to the upwards and downwards oscillations of the web prior to being bonded. The oscillations are a result of the paper bending towards a direction (either up or down) that minimizes internal compression forces (and represents the path of least resistance). The core 404b is forced to bend and fill a thickness void because (i) the force of the rotary members 422a, 422b is greater than the compression resistance of the web in the machine direction and (ii) the bonding surfaces are moving slower than the core speed. In some embodiments, rotary members 422a, 422b may be aligned in a Y-direction and may not overlap in Z-direction (transverse direction)— i.e., perpendicular to the Z-direction and an X-direction). In some embodiment, machine 400 may also include guide plates 423a, 423b. A first guide plate 423a may have a first opening configured to receive first rotary member 422a so that first rotary member 422a may contact and propel initial core 404a in the machine direction. Similarly, second guide plate 423b may have a second opening configured to receive second rotary member 422b so that second rotary 422b may contact and propel the initial core 404a in the machine direction in tandem with first rotary member 422a.

Guide plates 423a, 423b may serve to optimally position the initial core 404a for the set of rotary members 422a,422b to create the wave pattern. Additionally, guide plates 423a, 423b may have first ends positioned directly adjacent to two restraints 426a, 426b (described below) that the space between guide plates 423a, 423b and two restraints 426a, 426b is minimal or zero in the machine direction. In other words, in some embodiments, there is no space between two restraints 426a, 426b and guide plates 423a, 423b in the machine direction. In other embodiments (see e.g., FIG. 8), guide plates 423a, 423b may extend into a space form by two restraints 426a, 426b so that two restraints 426a, 426b overlap guide plates 423a, 423b in a Y-direction. In some embodiments, machine 400 may include one or more conveyors belts as restraints 426a, 426b.

Although machine 400 illustrates rotary members 422a, 422b, machine 400 may omit the rotary members and may transport the initial core 404a with air pressure. (See e.g., FIG. 20).

Machine 400 may also include initial first layer roller 412a and initial second layer roller 412b. Initial first layer roller 412a may be configured to accept a roll of first layer 402a. Initial second layer roller 412b may be configured to accept a roll of second layer 402b. Initial first layer roller 412a and initial second layer roller 412b may rotate so that first layer 402a and second layer 402b are unrolled, respectively. In some embodiments, initial first layer roller 412a and initial second layer roller 412b may be powered. In some embodiments, initial first layer roller 412a and initial second layer roller 412b may include unwind brakes to control the tension for first layer 402a and second layer 402b.

Machine 400 may also include one or more idler rolls 414a, 416a, 414b, 416b, 420b, 420c configured to guide and provide tension for the initial core 404a, first layer 402a, or second layer 402b. In some embodiments, one or more of the idler rolls 414a, 416a, 414b, 416b, 420b, 420c are powered and help pull the initial core 404a, first layer 402a, or second layer 402b from their respective initial rollers.

As mentioned above, machine 400 may include two restraints 426a, 426b spaced apart a predetermined distance in the Y-direction. These two restraints 426a, 426b may include or be heaters configured to heat first layer 402a and second layer 402b, which may include previously applied adhesive to surfaces facing the formed core 404b. When the heaters of restraints 426a, 426b heat first layer 402a and second layer 402b adjacent to formed core 404b, machine 400 attaches first layer 402a and second layer 402b to formed core 404b. The formed core has upper and lower loops as described above which may have contact surfaces that adhere to the first layer 402a and the second layer 402b, respectively.

Two restraints 426a, 426b may include adjustable extensions 428a, 428b that are configured to pivot the respective restraints 426a, 426b so that two restraints 426a, 426b define a space with an entry opening that is greater than the exit opening. Put another way, adjustable extensions 428a, 428b are configured to adjust the two restraints 426a, 426b to have an entry opening that is from 0 to 35 degrees (e.g., 0 to 15 degrees). When angled, two restraints 426a, 426b may pinch or catch formed core 404b and compress it as it exits the space between the two restraints 426a, 426b. By using angled restraints, it allows the wave pattern of formed core 404b to expand and make better contact with first layer 402a and second layer 402b.

Machine 400 may also include a pair of conveyor belts 432a, 432b or nip rollers. The pair of conveyor belts 432a, 432b pulls formed core 404b through two restraints 426a, 426b with first and second layers 402a, 402b attached to formed core 404b as they move through two restraints 426a, 426b to form a precut product (i.e., a product before it is cut). The pair of conveyor belts 432a, 432b also transports the precut insulation product to a guillotine (not shown) other cutting mechanism to cut the precut insulation product into predetermined lengths for insulation product.

Machine 400 may also include a plurality of height adjusters 434a, 434b, 430a, 430b, 424a, 424b configured to adjust the spacing between respective pairs of conveyor belts 432a, 432b, two restraints 426a, 426b, and guides 423a, 423b so that the machine can product insulation products with different thicknesses. The spacing between the rotary members should not be adjusted by the plurality of height adjusters 434a, 434b, 430a, 430b, 424a, 424b.

Figure 5A:
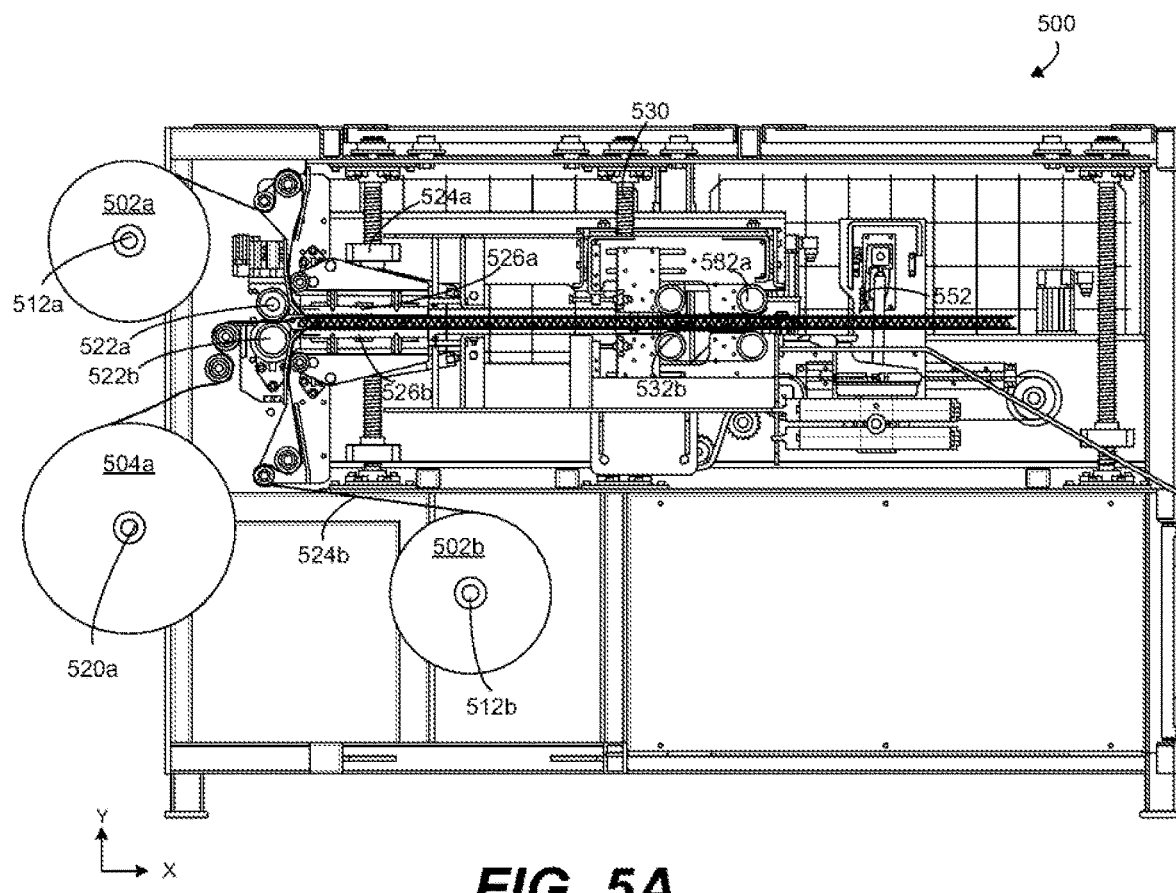
FIG. 5A is a side view of a machine for making one or more insulation products, according to an exemplary embodiment.
Figure 5B:
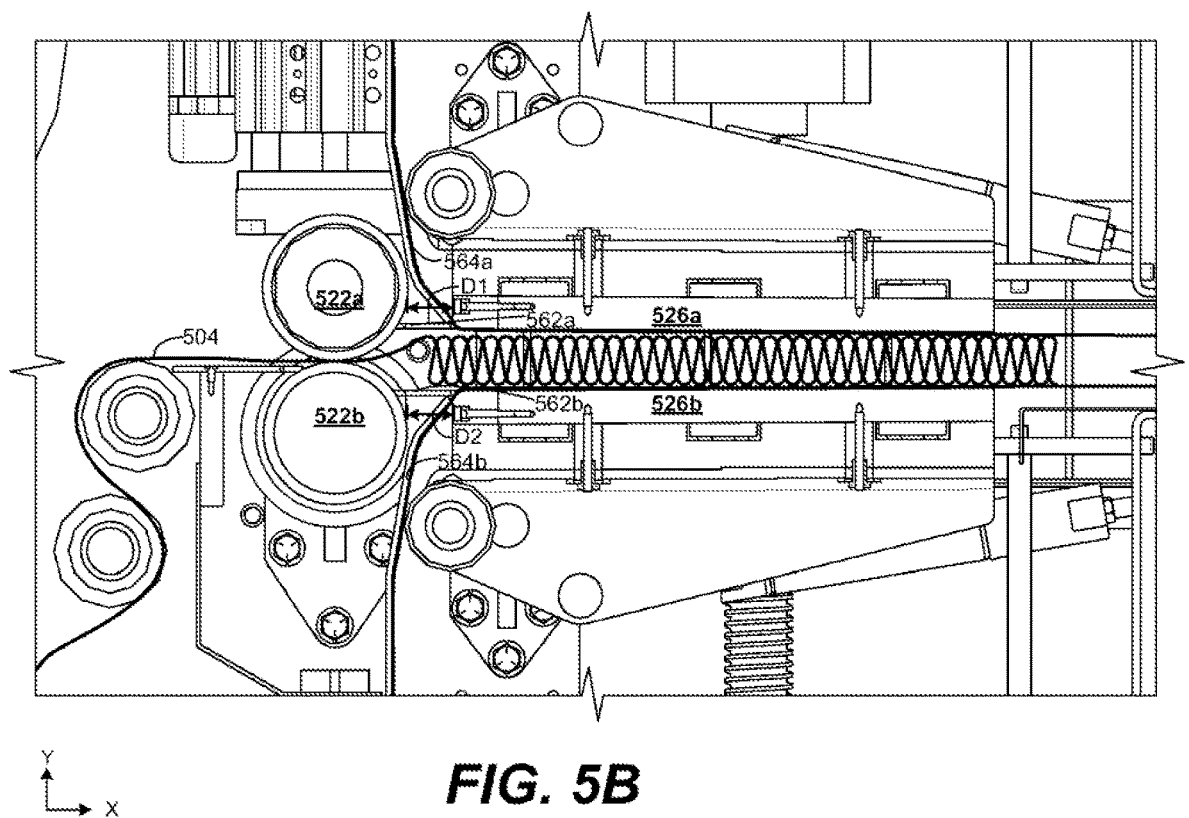
FIG. 5B is an enlarged view of a portion of FIG. 5A.

FIG. 5A is a side view of a machine 500 for making one or more insulation products. FIG. 5B is an enlarged view of a portion of FIG. 5A. As shown in FIGS. 5A and 5B, machine 500 is similar to machine 400 as it may include an initial core roller 520a configured to accept and unroll an initial core 504a in the form of a roll, an initial first layer roller 512a configured to accept and unroll a first layer 502a in roll form, an initial second layer roller 512b configured to accept and unroll a second layer 502b in roll form, a set of rotary members 522a, 522b configured to propel the initial core into a formed core within the space between two restraints 526a, 526b, two restraints 526a, 526b configured to define a space for forming the formed core and heat the first and second layers 502a, 502b to attach them to the formed core, a pair of conveyor belts 532a, 532b configured to transport the precut product and help pull the various layers through the machine, and a plurality of height adjusters 524a, 530. While not labeled, machine 500 also include idler rolls similar to the one or more idler rolls 414a, 416a, 414b, 416b, 420b, 420c of machine 400. However, machine 500 also includes a guillotine 552 downstream from the pair of conveyor belts 532a, 532b and the set of rotary members 522a, 522b. Guillotine 522 is configured to cut the precut insulation product to form an insulation product.

Additionally, as shown in FIG. 5B, machine 500 may include a pair of feed guides 562a, 562b that are configured to guide the initial core 504a along any gap D1, D2 between the set of rotary members 522a, 522b and the two restraints 526a, 526b. Machine 500 may also include layer guides 564a, 564b, that respectively guide the first layer and the second layer into the space between the two restraints 526a, 526b. Layer guides 564a, 564b may be curved or sloped.

Figure 5C:
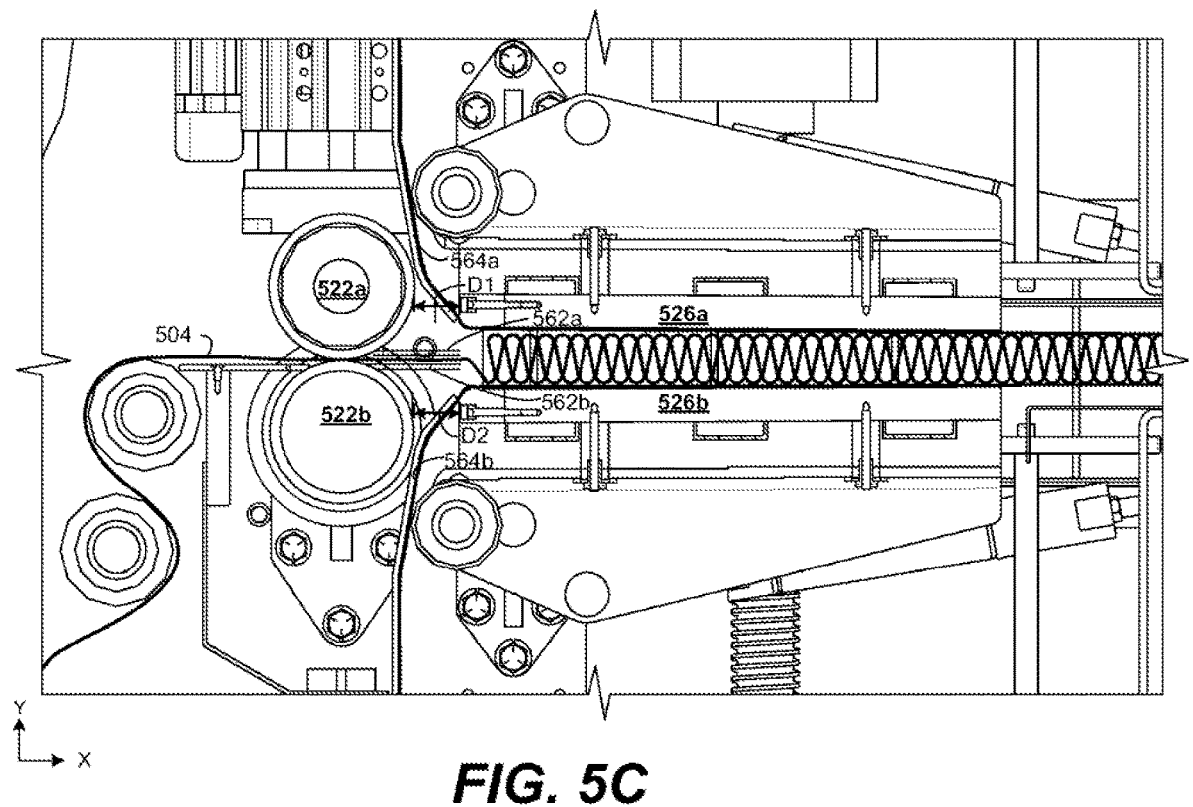
FIG. 5C is a side view of a machine for making one or more insulation products, according to an exemplary embodiment.

FIG. 5C is similar to FIG. 5B except that FIG. 5C illustrates that feed guides 562a, 562b are spaced close together to prevent the formation of waves until the core 504 enters the space defined by two restraints 526a, 526b, which may include heaters.

Figure 5D:
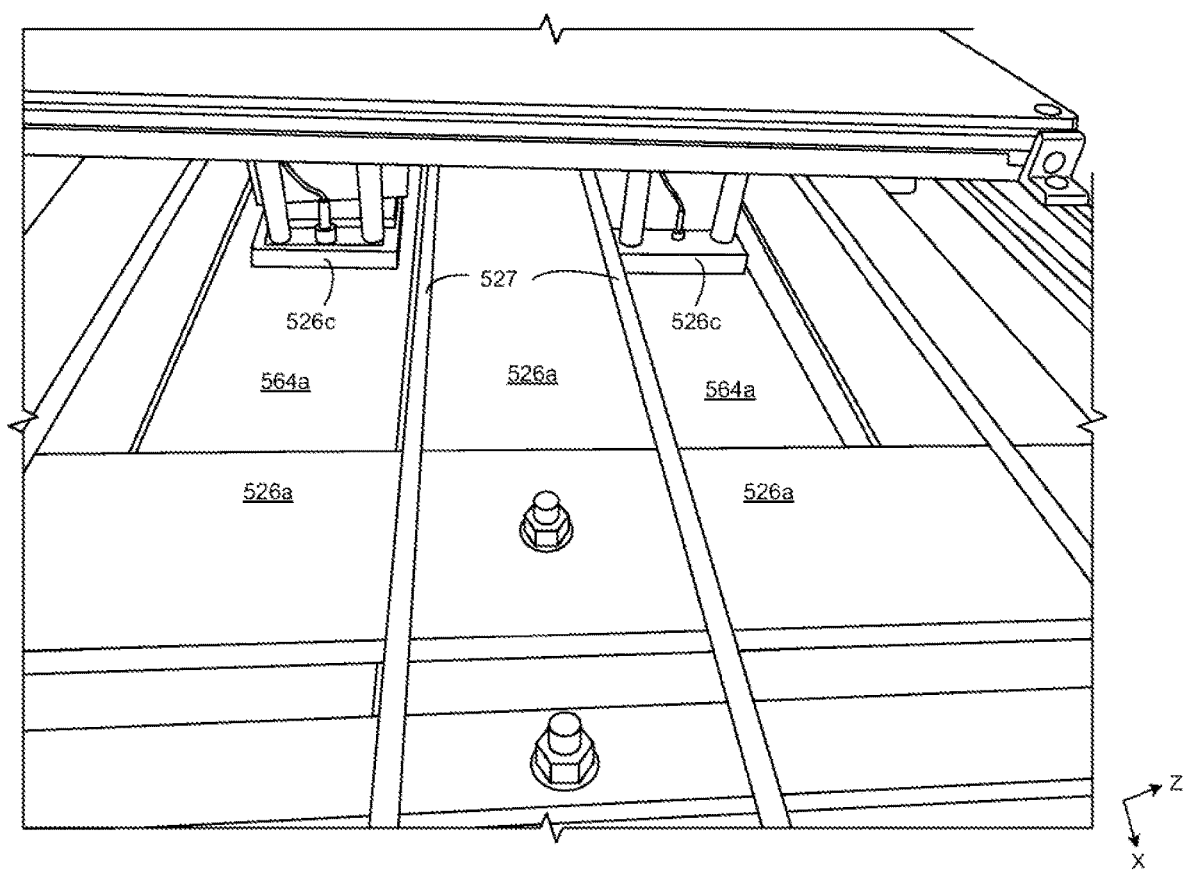
FIG. 5D is a perspective view of a heater for use in the machines of FIGS. 5A-5C, according to an exemplary embodiment.

FIG. 5D illustrates a perspective view of an alternate embodiment of the heaters 526c placed within the two restraints 526a, 526b (only 526a shown with horizontal cross bar) of FIGS. 5A-5C. Also shown, are conveyor belts 527 that may be used to carry the product through two restraints 526a, 526b. Also shown, the heaters 526c may extend only partially in the transverse direction between gaps in the upper restraint 526a. For example, upper restraint 526a may have two or more heaters 526c spaced apart in the transverse direction (Z-direction). The heaters 526c may heat portions of the first layer 564a (which may include an adhesive) so that it can attach to the core (not shown) as strips. By heating only portions of the first layer 564a rather than the entire first layer 564a, the modified machine may use substantially less energy.

Figure 6:
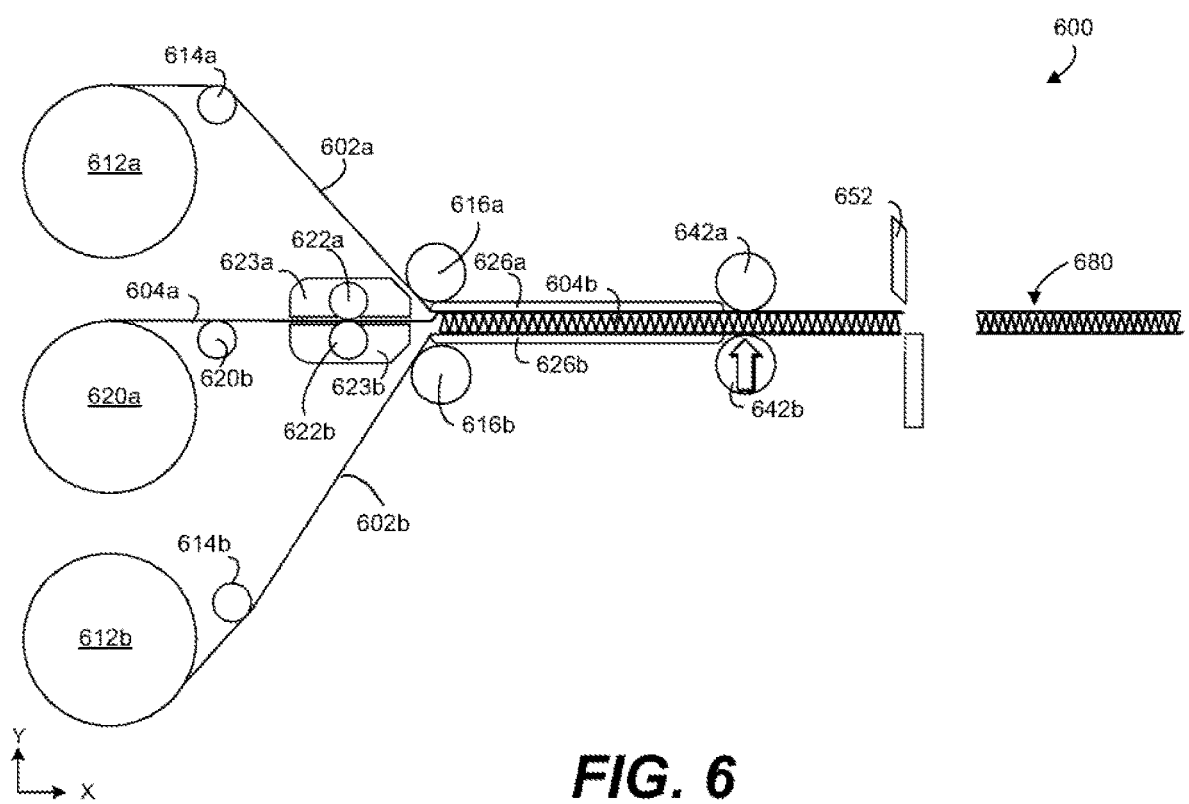
FIG. 6 is a schematic diagram of a machine for making one or more insulation products according to an exemplary embodiment.

FIG. 6 is a schematic diagram of a machine 600 for making one or more insulation products according to an exemplary embodiment. Machine 600 is similar to machine 400 with like components labeled with similar numbers. For example, machine 600 includes initial first layer roller 612a, initial second layer roller 612b, initial core roller 620a, idler rolls 614a, 620b, 614b, a set of rotary members 622a, 622b, guide plates 623a, 623b, and two restraints 626a, 626b. However, machine 600 also includes guillotine 652 configured to cut the precut product containing the formed core 604b adhered to first and second layers 602a, 602b to a predetermined length to create an insulation product 680. Also, instead of a pair of conveyor belts 432a, 432b, machine 600 includes a pair of nip rollers 642a, 642b that drive the precut product to the guillotine 652. Also the guide plates 623a, 623b are configured to guide initial core 604a to the set of rotary members 622a, 622b and from the set of rotary members 622a, 622b toward the space defined by two restraints 626a, 626b. However, guide plates 623a, 623b may be spaced apart from the two restraints 626a, 626b but extend from the set of rotary members 622a, 622b in the machine direction.

Figure 7:
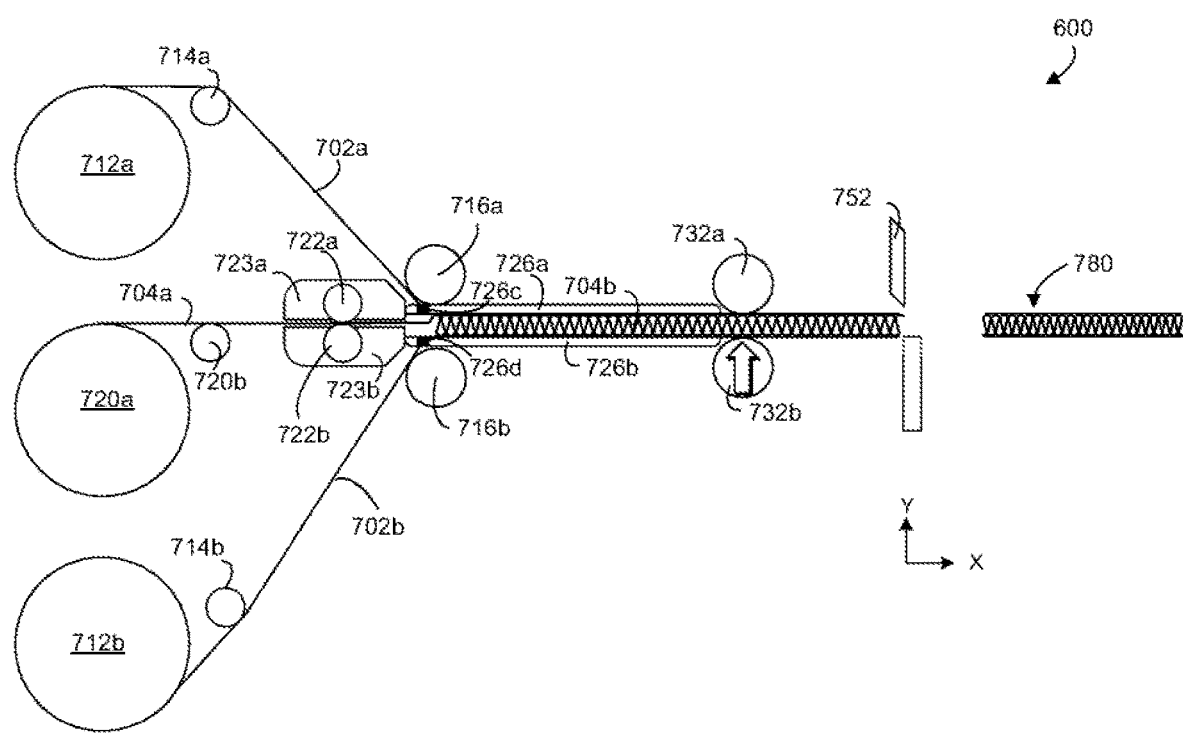
FIG. 7 is a schematic diagram of a machine for making one or more insulation products according to an exemplary embodiment.

FIG. 7 is a schematic diagram of a machine 700 for making one or more insulation products according to an exemplary embodiment. Machine 700 is similar to machine 600 with like components labeled with similar numbers. For example, machine 700 includes initial first layer roller 712a, initial second layer roller 712b, initial core roller 720a, idler rolls 714a, 720b, 714b, a set of rotary members 722a, 722b, guide plates 723a, 723b, two restraints 726a, 726b, guillotine 752, and pair of nip rollers 742a, 742b. However, the two restraints 726a, 726b of machine 700 are positioned to be directly adjacent (or contacting) the guide plates 723a, 723b. Additionally, the two restraints 726a, 726b each have openings 726c, 726d to respectively receive the first layer 702a and the second layer 702b. In this case, the initial core 704a starts to form the wave pattern entirely within the space defined by the two restraints 726a, 726b aiding in the creation of a uniform wave pattern with upper and lower loops described above.

Figure 8:
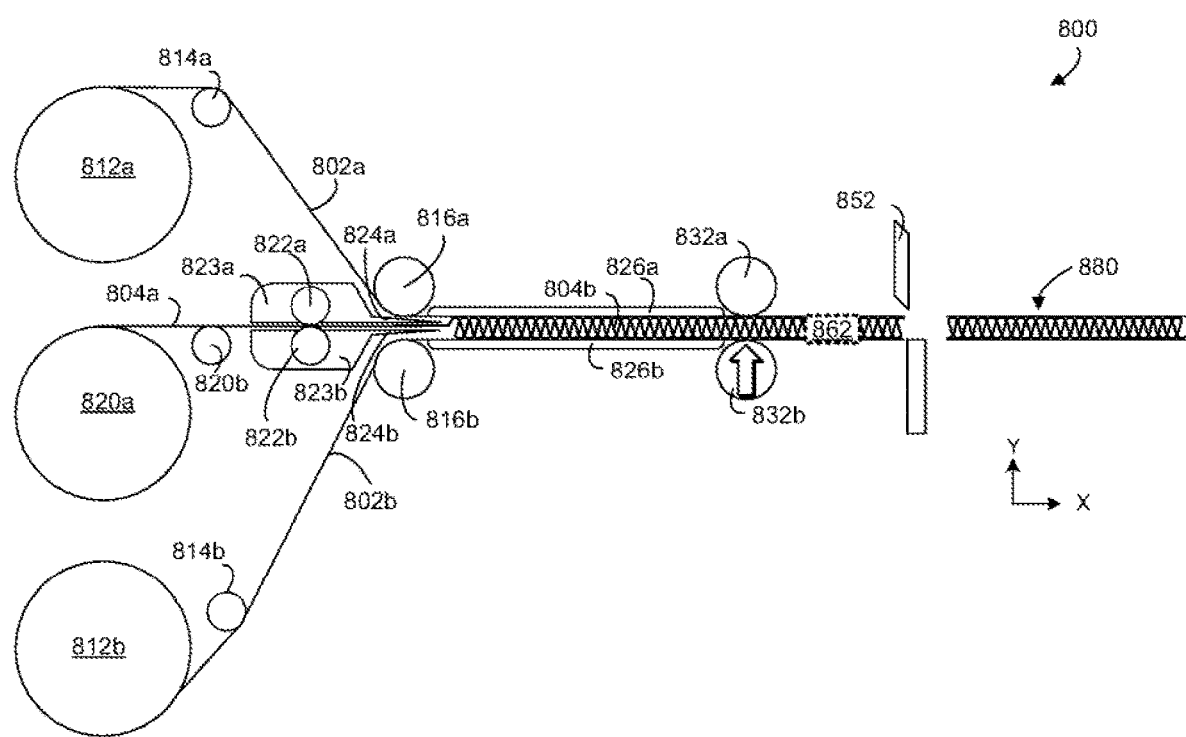
FIG. 8 is schematic diagram of a machine for making one or more insulation products according to an exemplary embodiment.

FIG. 8 is a schematic diagram of machine 800 for making one or more insulation products according to an exemplary embodiment. Machine 800 is similar to machine 600 with like components labeled with similar numbers. For example, machine 700 includes initial first layer roller 812a, initial second layer roller 812b, initial core roller 820a, idler rolls 814a, 820b, 814b, a set of rotary members 822a, 822b, guide plates 823a, 823b, two restraints 826a, 826b, guillotine 852, and a pair of nip rollers 842a, 842b. However, two guide plates 823a, 823b of machine 800 also include respective extension portions 824a, 824b the extend within a space defined by the two restraints 826a, 826b. Put another way, two restraints 826a, 826b are positioned to overlap the at least a portion of the extension portions 824a, 824b in the machine direction. By having portions of guide plates 823a, 823b overlap with two restraints 826a, 826b, initial core 704a can be placed within the space defined by two restraints 826a, 826b thereby controlling the formation of the wave pattern for the formed core 804b. In some embodiments, machine 800 may include optional side crush rollers 862, plates, or both that crush the side of the core 804b and/or the first and second layers 802a, 802b. By crushing the edge of core 804b, the compression resistance and insulation performance of insulation product is improved compared to products without crushed edges. Additionally, the crushed edge increases the amount of surface on the edge that is available for bonding. For example, the one or more insulation products with crushed edges was at least twice as strong (e.g., has twice the compression resistance) as similar insulation products without crushed edge when subjected to 251b of weight of compression in the Z-direction.

Figure 9:
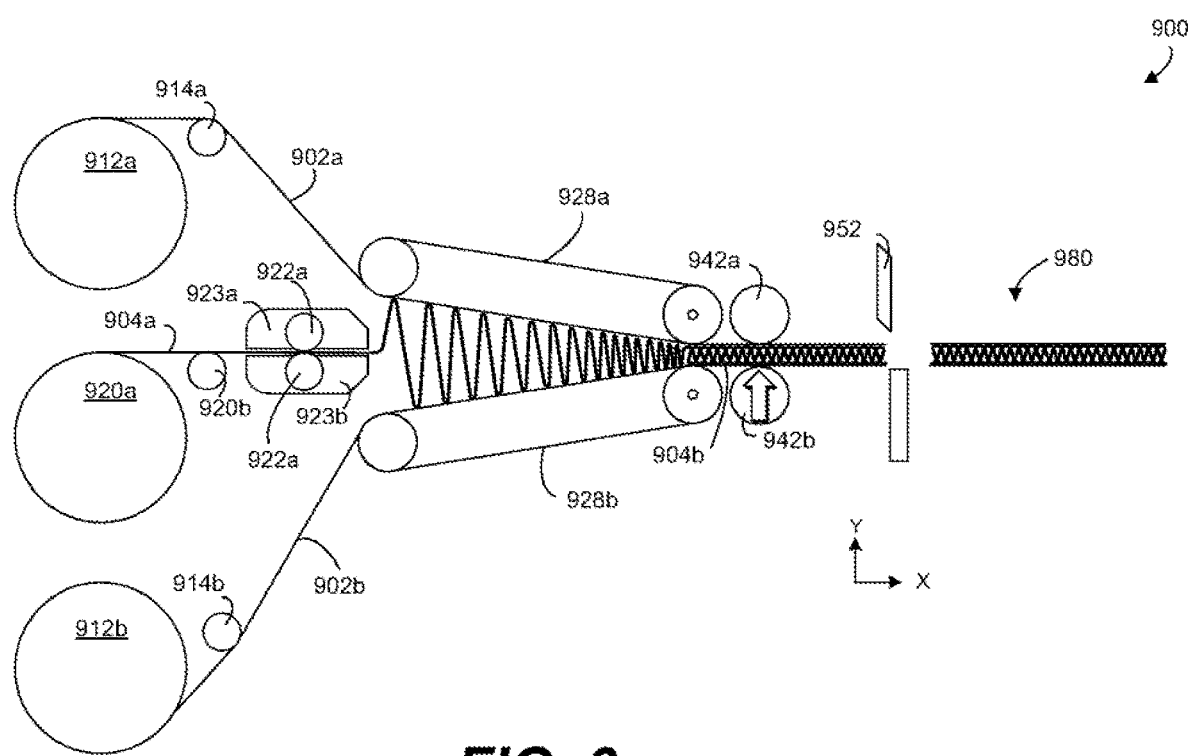
FIG. 9 is schematic diagram of a machine for making one or more insulation products according to an exemplary embodiment.

FIG. 9 is a schematic diagram of a machine 900 for making one or more insulation products according to an exemplary embodiment. Machine 900 is similar to machine 600 with like components labeled with similar numbers. For example, machine 900 includes initial first layer roller 912a, initial second layer roller 912b, initial core roller 920a, idler rolls 914a, 920b, 914b, a set of rotary members 922a, 922b, guide plates 923a, 923b, two restraints 926a, 926b, guillotine 952, and a pair of nip rollers 942a, 942b. However, two restraints 926a, 926b of machine 900 may be a set of conveyor belts. The set of conveyor belts may have an angled opening that is from 0 to 35 degrees (e.g., 0 to 15 degrees) as shown and configured to receive and compress initial core 404a to a desired height or thickness as well as transport the initial core 404a in the machine direction. Alternatively, the set of conveyor belts may not have an angled opening and instead have a predetermined distance of separation defining a space between them. In some embodiments, the set of conveyor belts may not include a heater and instead nip rollers 942a, 942b may include heater configured to heat first layer 902a and second layer 902b so that the adhesive on these layers adheres to the formed core 904b so that the formed core 904b flexible retains its shape. In other embodiments, the set of conveyor belts may have integrated heaters.

Machines 400, 500, 600, 700, 800, and 900 may be configured to produce any number of different variations of insulation products described herein. Machines 400, 500, 600, 700, 800, and 900 may be configured to be altered to be orientated vertically so that the core and one or more outer layers travel from top to bottom. Such vertically orientated machines would use gravity to assist in the thread up of the core and one or more outer layers, assist in insulation product discharge, and aid in the wave formation and transportation of the core through the machines. Such vertically orientated machines would have a reduced machine footprint compared to horizontally orientated machines. Additionally, vertically orientated machines would have a symmetrical force for on the two outer layers in the unwinding and heater zones. Finally, vertically orientated machines would have improved ergonomics for operators with increased access and reduced reach needed for operating.

Figure 10:
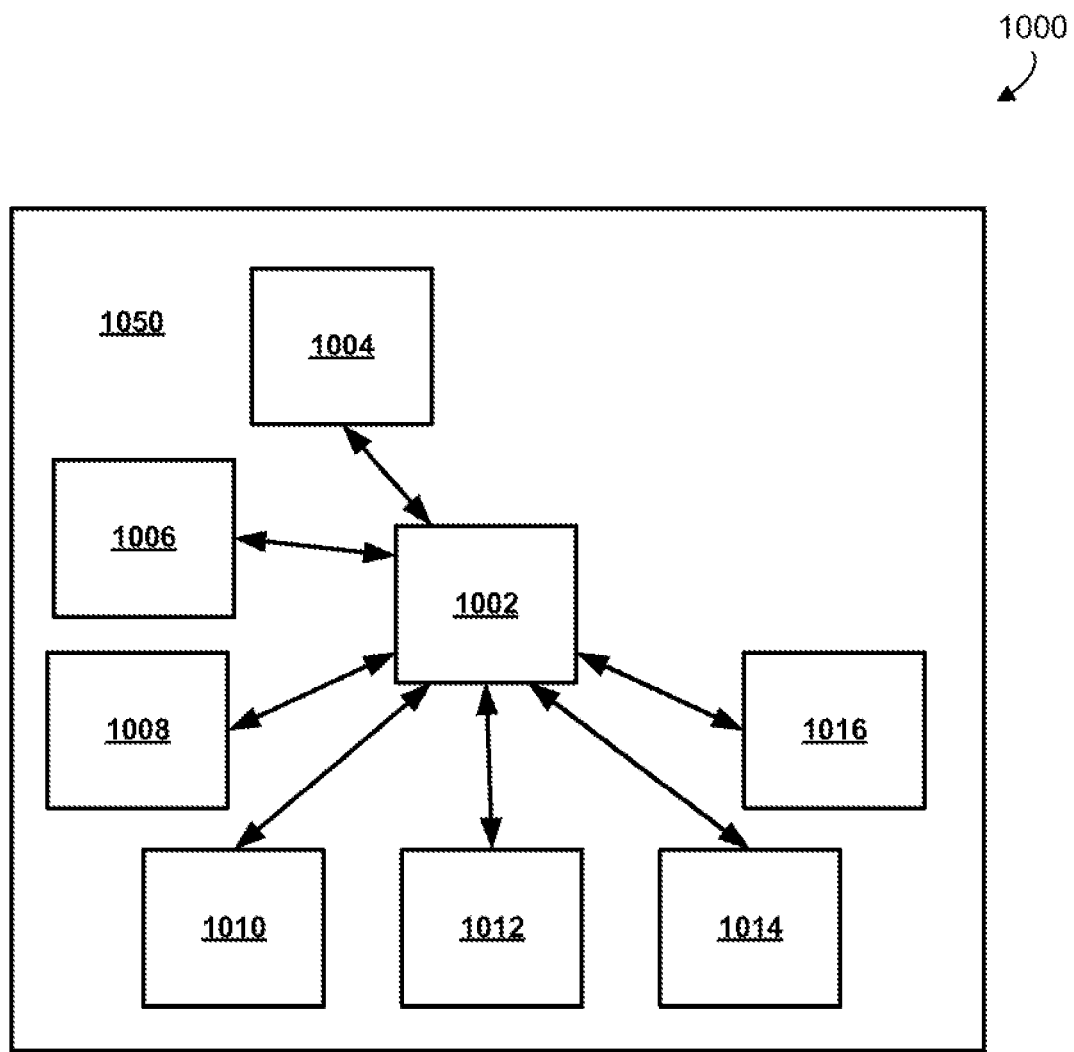
FIG. 10 is a diagram showing an exemplary embodiment of a controller according to an exemplary embodiment.

FIG. 10 shows an exemplary embodiment of a controller 1000 according to exemplary embodiments. Controller 1000 may be part of manufacturing system 1050 of one or more machines 400, 500, 600, 700, 800, and 900. Put another way, each machine 400, 500, 600, 700, 800, and 900 (or variation thereof) may include manufacturing system 1050, a controller 1002, and various subsystems. Controller 1002 may be a variety of electronic devices programmable to control the various functions of the manufacturing system 1050, such one or more of outer layer roller 1004, rotary member system 1006, cutting system 1008, heater system 1010, nip roller system 1012, conveyor belt system 1014, and height or thickness adjusting system 1016. Controller 1002 can be a programmable logic controller. For example, controller can be a microcontroller that is, for example, programmable or pre-programmed (e.g., application specific integrated circuits (ASICs)). Alternatively, controller 1002 can be a PC, server, mainframe, or other computer programmed device that controls aspects of manufacturing system 1050. Controller 1002 may include an application (or, "app") on a smartphone or tablet. Controller 1002 may be connected to the system using, for example, a direct wired connection, an Ethernet connection (e.g., Ethernet PLC communication for plant data interface), a local area network (LAN), a wireless local area network (WLAN), an internet connection, a wireless connection, Bluetooth, near-field communication (NFC), or a cellular or radio connection. Controller 1002 may also be networked via a similar connection to enable remote operation and control.

Controller 1002 may control various aspects of manufacturing system 1050 to achieve an efficient and orderly production of an insulation product (e.g., 100a or 100a-3) by adjusting various aspects so that the process flow is balanced and avoids bottlenecks and other such issues. For example, with respect to outer layer roller system 1004, rotary member system 1006, nip roller system 1012, and conveyor belt system 1014 can control the rate at which the rollers or conveyor belts associated with these systems rotate thereby changing the linear speed that the initial core (e.g., initial core 404a), first layer (e.g., first layer 402a), or second layer (e.g., second layer 402b) is able to travel in the machine direction. In some embodiments, controller 1002 may be in communication with one or more sensors (not shown) that are configured to detect the linear speed at which the core (e.g., initial core 404a), the first layer (e.g., first layer 402a), and/or the second layer (e.g., second layer 402b) is being transported. When controller 1002 determines that the linear speed of the core (e.g., initial core 404a), the first layer (e.g., first layer 402a), and/or the second layer (e.g., second layer 402b) exceeds a predetermined threshold (e.g., above or below a target rate), controller 1002 may direct the rotation speed of one or more of rollers (e.g., one or more of rollers 420a, 412a, 412b, 422a, 422b and similar rollers on machines 500, 600, 700, 800, and 900) to increase or decrease to adjust the speed of the core formation within the threshold range of the target rate or conveyor belts (e.g., conveyor belt 432a, 432b, 928a, 928b) or nip rollers (e.g., nip rollers 642a, 642b) to adjust the speed of movement of the completed precut insulation product in the machine direction.

In some embodiments, controller 1002 may be configured to start and stop the forward movement of the core to provide gaps in the precut insulation product by starting and stopping the rotary members (e.g., rotary members 522a, 522b via a rotary member system 1006). In some embodiments, controller 1002 may also be configured to cut the core to form the gap. The precut insulation product is more easily cut at the gaps since the one or more cutting blades will only cut through the first layer (e.g. first layer 1302a of FIG. 13) and the second layer (e.g., 1302b of FIG. 13) than through the first layer 1302a, second layer 1302b, and the formed core 1304. In other embodiments, the controller 1002 may be configured to reduce the speed of the rotary members (e.g., rotary members 522a, 522b via a rotary member system 1006) to reduce the wave frequency or eliminate waves altogether. For example, controller 1002 may be configured to reduce the speed of rotary members to force the core to travel at or near the same speed as first and second layers to eliminate wave formation all together. This would cause one of the above-described machines to create a core with non-waved or reduced-wave sections (1305 of FIG. 13) that could be cut more easily than the thicker waved sections.

Figure 13:
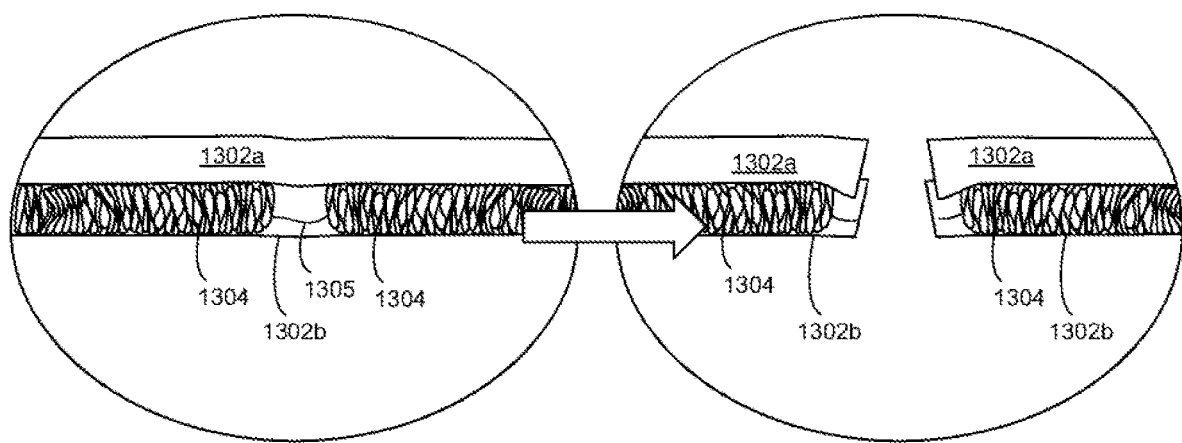
FIG. 13 is two perspective views of an insulation product including a portion of the core without a formed wave pattern, according to exemplary embodiments.

With respect to cutting system 1008, controller 1002 may be configured to control the activation, movement, and speed of one or more guillotines (e.g., guillotine 552). For example, controller may cause the one or more guillotines to cut the precut insulation product at gaps 1305 in or non-waved portions of the precut insulation product as shown in FIG. 13. However, in some embodiments, the machines described above may not have an automated shear or guillotine to cut insulation product to length. Instead or as a back-up option, the machines described above may include a serrated tear-away blade that could be used. For example, the blade could include one stationary blade that insulation product is pulled down against. As another example, the blade could include a stationary blade with a manually actuated second blade to promote separation.

With respect to heater system 1010, controller 1002 may control the activation, temperature, or energy level output of one or more heaters found in, e.g., restraints 426a, 426b or in, e.g., nip rollers 632a, 632b. With respect to height adjusting system 1016, controller 1002 may in response to receiving user input on a particular height or a directional command (e.g., up or down) move one or more height adjusters (e.g., height adjusters 434a, 434b, 430a, 430b, 424a, 424b) so that the spacing between respective pairs of conveyor belts (e.g., conveyor belts 432a, 432b), two restraints (e.g., two restraints 426a, 426b), set of rotary members (e.g., set of rotary members 422a, 422b) and/or nip rollers (e.g., nip rollers 632a, 632b) so that the corresponding machine can produce insulation products with different thicknesses.

In various embodiments, controller 1002 as well as the outer layer roller system 1004, a power roller system 1006, a nip roller system 1012, and a conveyor belt system 1014 may control like components in machines 400, 500, 600, 700, 800, and 900 and variations thereof.

Figure 11:
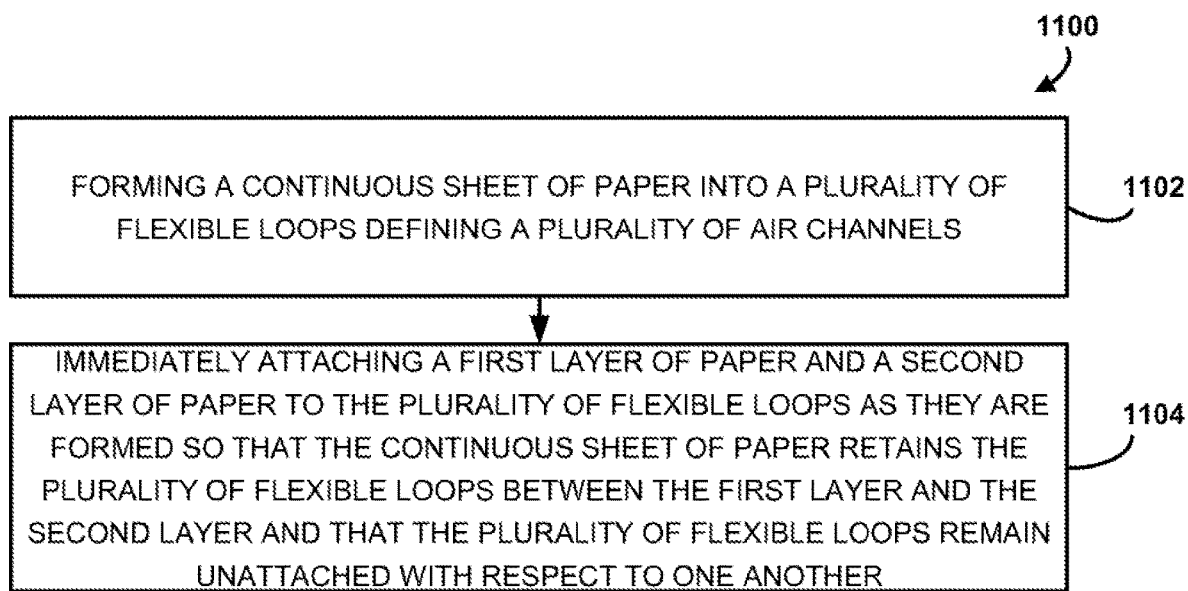
FIG. 11 is a flowchart of a method for making an insulation product according to an exemplary embodiment.

FIG. 11 is a flowchart of a method for making an insulation product according to an exemplary embodiment. In particular, FIG. 11 illustrates exemplary method 1100.

In block 1102, method 1100 may include forming a continuous sheet of paper (e.g., a core) into a plurality of flexible loops defining a plurality of air channels. In some embodiments, each flexible loop contacts at least one adjacent flexible loop. In some embodiments, one or more flexible loops may not contact the side of an adjacent flexible loop. The plurality of air channels may have lengths that are approximately parallel.

The plurality of flexible loops may be formed by feeding the continuous sheet of paper at a first rate, via a set of rotary members (e.g., the set of rotary members 422a, 422b described above) into a defined space between the first layer of paper and the second layer of paper that are fed at a second rate that is slower than the first rate. More specifically, the flexible loops may be formed by controlling the rate at which the continuous sheet of paper is fed, the first and second layers of paper are fed, and fixing the space at which the continuous sheet of paper is fed into. The defined space may be set in the vertical direction by at least two restraints (e.g., two restraints 426a, 426b described above) with height or thickness adjusters (e.g., thickness adjusters 430a, 430b) that control the spacing between the at least restraints and the first and second layer of paper that is adjacent to the two restraints.

The first and second layers may be attached to the continuous sheet of paper by heating the first layer and the second layer to activate an adhesive coated on surfaces of the first layer and the second layer facing the continuous sheet of paper. Once activated, the adhesive adheres the first and second paper to the continuous sheet of paper at uniform or nearly uniformly spaced contacting surfaces.

In block 1104, method 1100 may include immediately attaching a first layer of paper and a second layer of paper to the plurality of flexible loops as they are formed (of the continuous sheet of paper (e.g., the core)) so that the continuous sheet of paper retains the plurality of flexible loops between the first layer and the second layer. In some embodiments, at least one axis (e.g., Y-direction), perpendicular to the machine direction and the lengths of the plurality of air channels, passes through the continuous sheet of paper at least three times after the first layer and the second layer are attached to the continuous sheet of paper.

Additionally, method 1100 may include cutting, via a guillotine (e.g., guillotine 552 described above) continuous sheet of paper attached to the first layer of paper and the second layer of paper to a predetermined length based on a customer's needs.

The method steps above may be controlled and implemented by controller 1002.

Figure 12A:
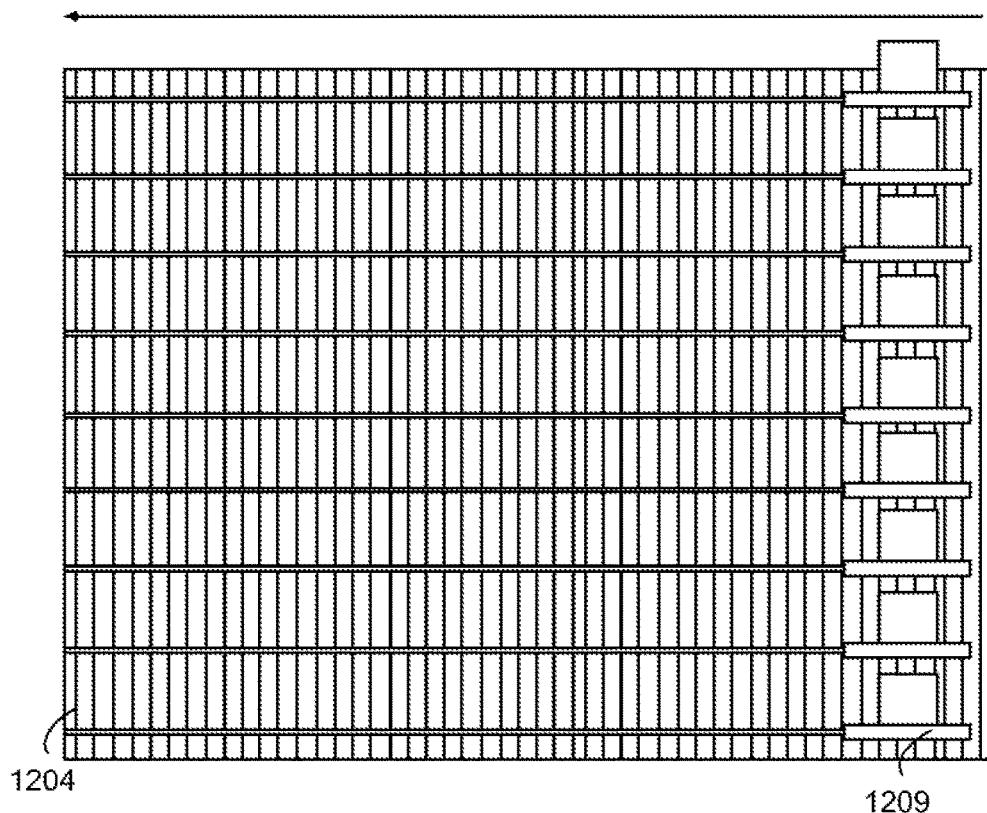
FIG. 12A is top view of a cutting process according to an exemplary embodiment.
Figure 12B:
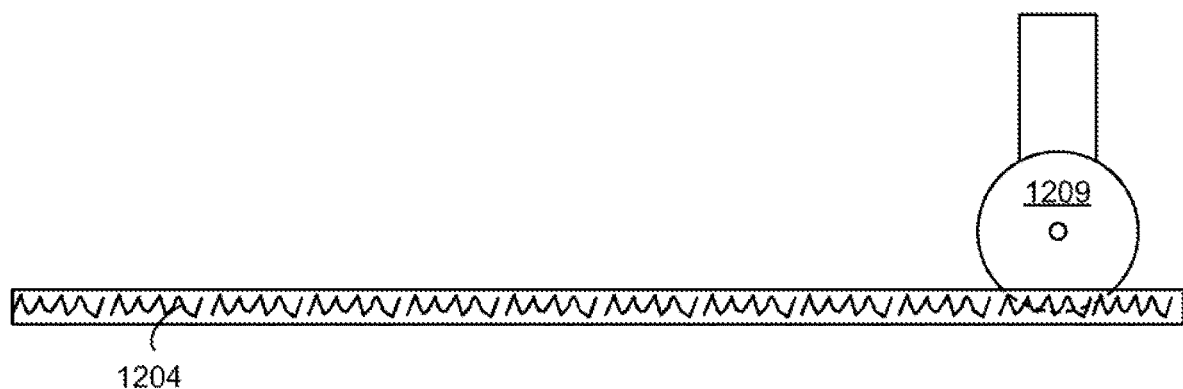
FIG. 12B is a side view of a cutting process according to an exemplary embodiment.
Figure 12C:
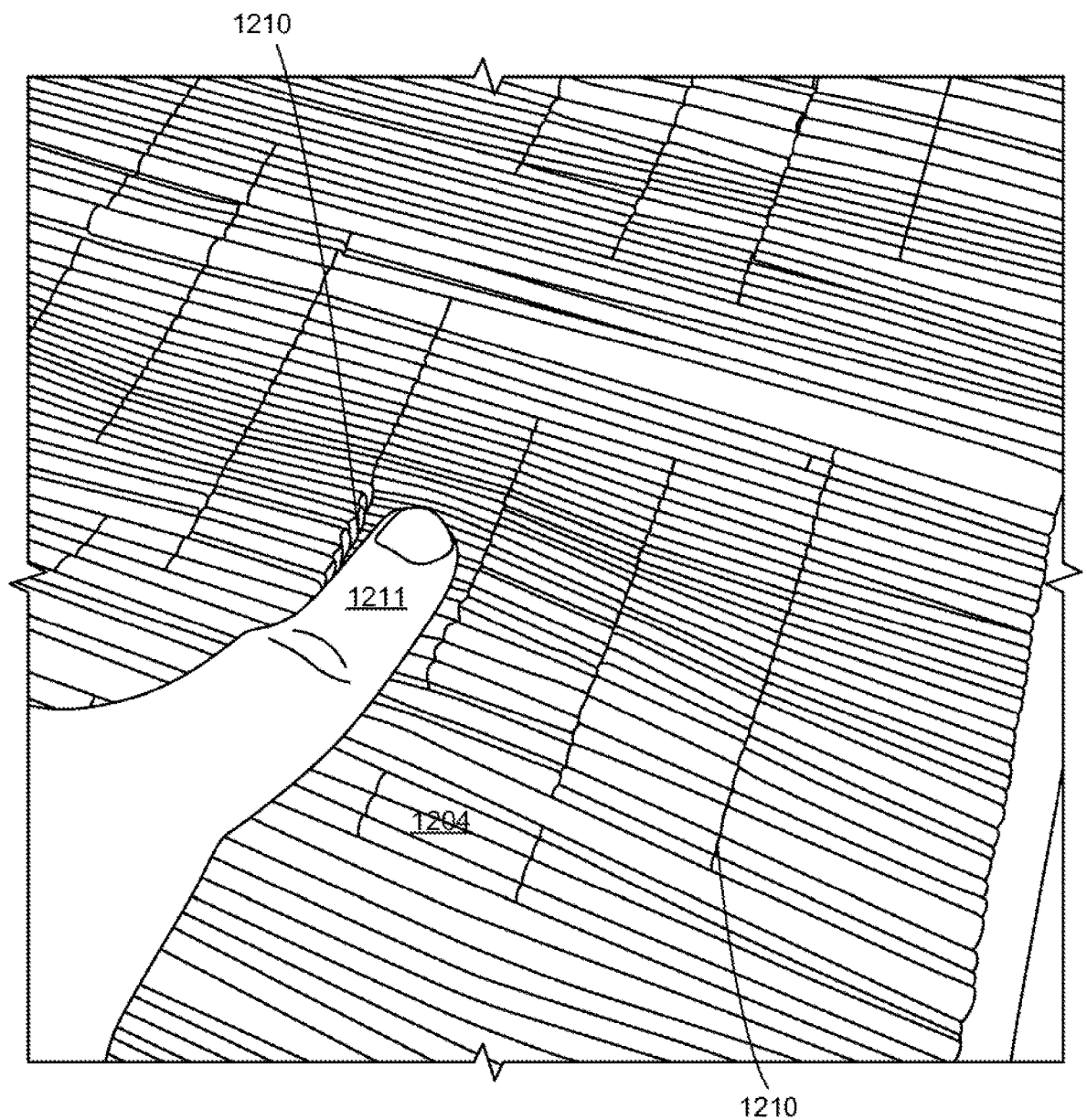
FIG. 12C is an illustration of an exemplary insulation product cut according with the process of FIGS. 12A and 12B.

FIG. 12A is top view of a cutting process according to an exemplary embodiment. As shown, the cutting process may include one or more circular blades 1209 configured to at least partially cut wave formed core 1204 in the machine direction and/or fully cut through the wave formed core 1204 in the machine direction. One or more circular blades 1209 may cut as formed core 1204 is pulled through by rollers (e.g., 432a, 432b) described above. FIG. 12B is a side view of a cutting process according to an exemplary embodiment showing that one or more circular blades 1209 may stop short of cutting through all of the core 1204 in the Z-direction. FIG. 12C is an illustration of an exemplary insulation product cut according with the process of FIGS. 12A and 12B. As shown, partial incisions 1210 (formed by one or more circular blades 1209) in core 1204 (sometimes in specific patterns) facilitate localized compression of core 1204 without propagating across entire core 1204 when a force is applied. For example, object 1211 (e.g., a finger) may compress just one region of core 1204 between two partial incisions 1210 when pressed or placed on core 1204.

FIG. 13 is two perspective views of an insulation product including a portion of the core without a formed wave pattern, according to exemplary embodiments. By adding in controls to rotary members rollers (e.g., 422a, 422b, 522a, 522b), one or more of the machines discussed above may start, stop, or reduce the speed of the feeding of core 1304, the machines may create intentional non-waved sections 1305 (e.g., a generally flat sheet of core 1304a such as initial core 604a, 704a, 804a, 904a) in core 1304. In some embodiments, the above-mentioned machines with feed roller controllers may create core 1304 with gaps (not shown) made by cutting core 1304 and stopping the feed rollers for a predetermined time period. Regardless of whether core 1304 has gaps or non-waved sections 1305 or both, insulation product may be cut more easily at the gaps or non-waved sections 1305 rather than the waved sections because the one or more cutting blades do not have to travel through thick waved core 1304. In some embodiments, controller 1002 of FIG. 10 may activate one or more guillotines to cut the precut insulation product at the gaps or non-waved sections 1305. In some embodiments, controller 1002 of FIG. 10 may not activate the one or more guillotines to cut the precut insulation product at gaps or non-waved sections 1305. Instead, gaps or non-waved sections 1305 may remain in the final product to act as hinges or flexible bend potions for conforming to a container (e.g., a box) or an item to cushion and/or insulate.

Figure 14:
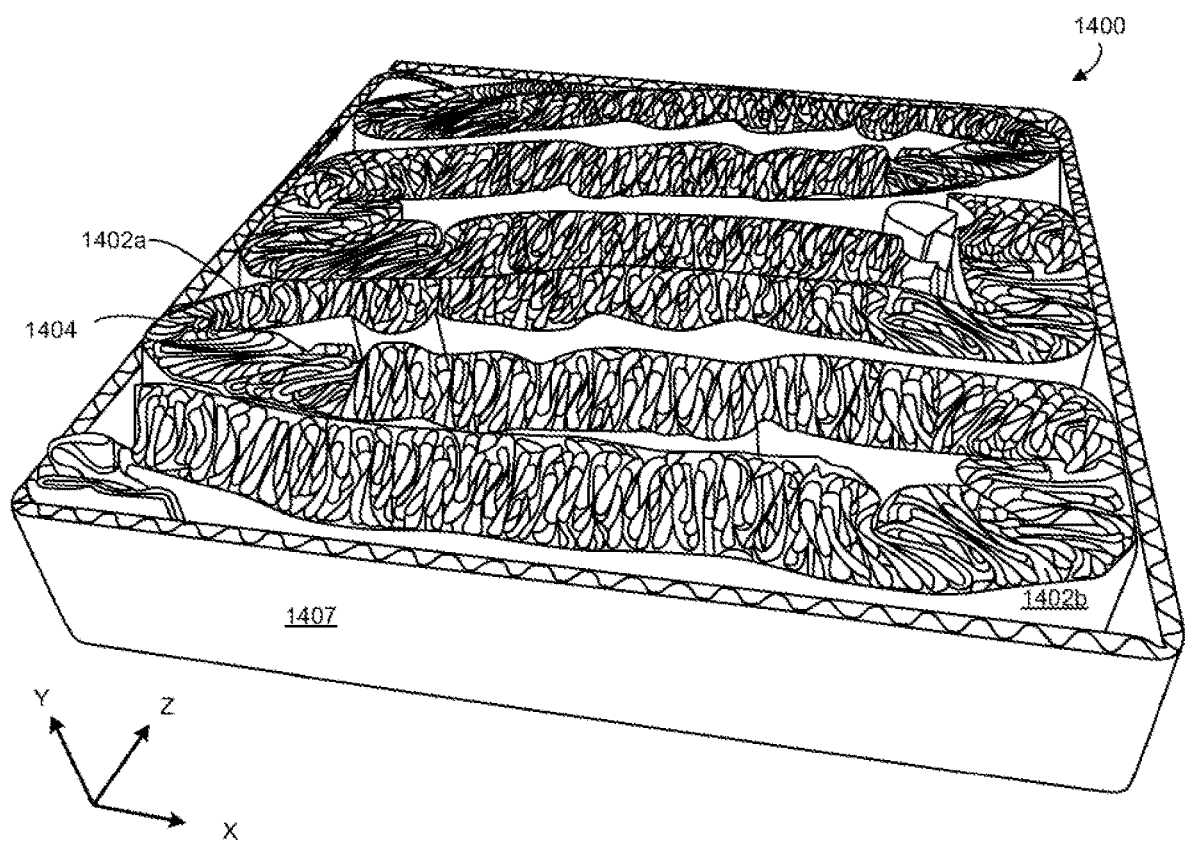
FIG. 14 is a perspective view of an insulation product, according to an exemplary embodiment.

FIG. 14 is a perspective view of insulation product 1400, according to an exemplary embodiment. As shown, insulation product 1400 may include a first layer 1402a, a second layer 1402b, and a core 1404. Insulation product 1400 may be turned on its side when compared to insulation product 100a in FIG. 1A-1 or insulation product 100a-3 in FIG. 1A-2 so that one side of the core 1404 is facing up. Insulation product 1400 may be surrounded or contained by a container 1407 (e.g., cardboard) to keep insulation product 1400 within a defined space. The various insulation products described in this application have significant compression resistant in the Y direction of FIG. 14 as opposed to the Z direction. Thus, by placing insulation product 1400 on its side as shown, it can hold over 75 lbs. with minimal compression in the Y direction. In general, this results in a product that has very similar material attributes to honeycomb board, which is a popular choice for packaging heavy items.

Figure 15A:
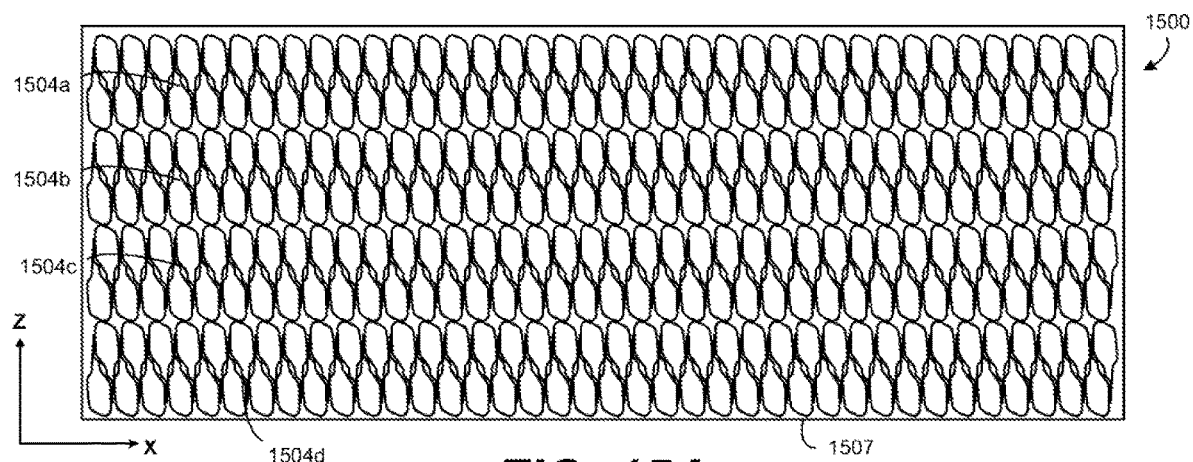
FIG. 15A is a top view of an insulation product, according to an exemplary embodiment.
Figure 15B:
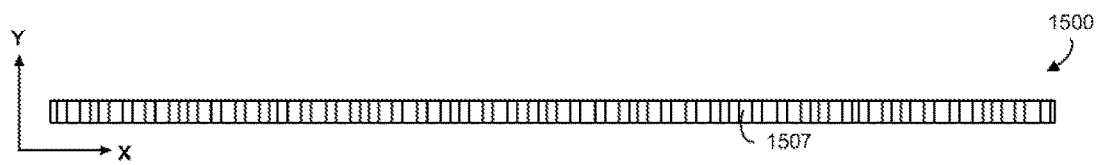
FIG. 15B is a side view of FIG. 15A.

FIGS. 15A and 15B are a top and side views of an insulation product 1500, according to an exemplary embodiment. As shown, insulation product 1500 may include one or more columns of cores 1504a, 1504b, 1504c, 1504d. These columns of cores 1504a, 1504b, 1504c, 1504d may be attached to first and second layers as previously described or the first and second layers may be omitted. Similar to FIG. 14, one or more columns of cores 1504a, 1504b, 1504c, 1504d, may be contained or distributed within a container 1507.

Figure 16:
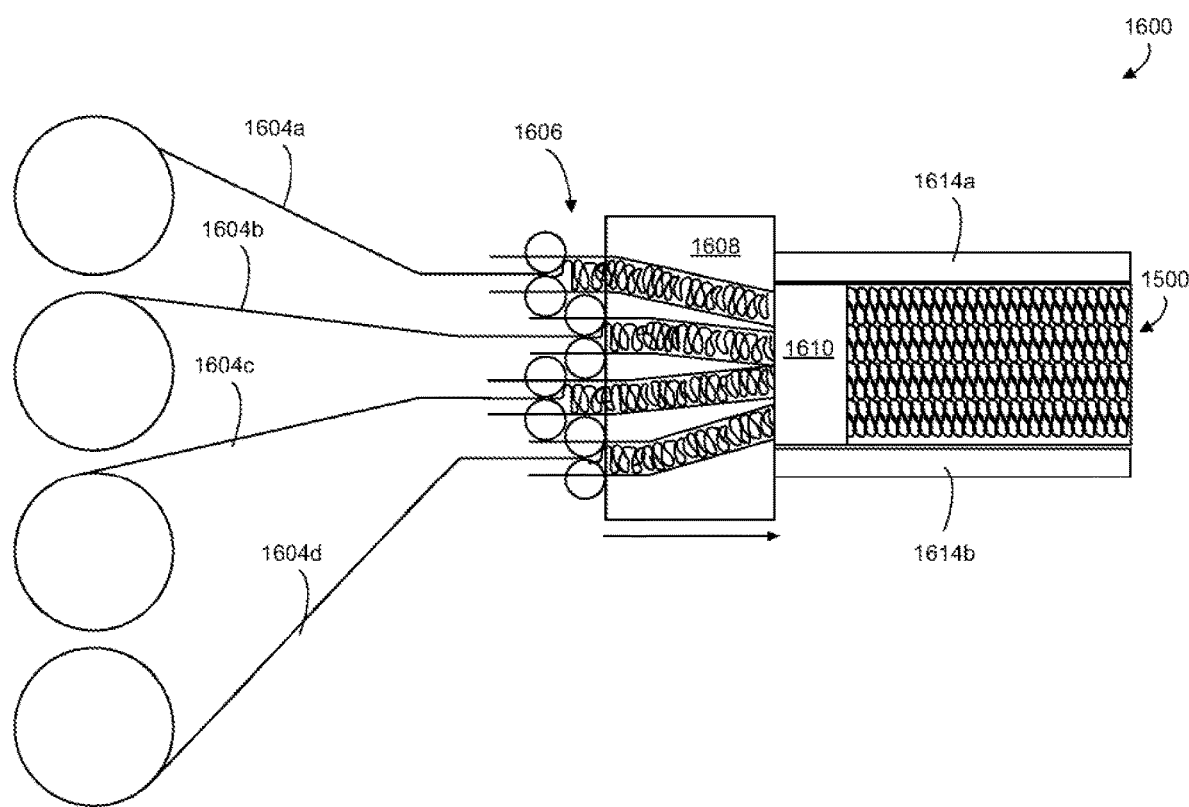
FIG. 16 is a schematic diagram of a machine for making the insulation product of FIGS. 15A and 15B.

FIG. 16 is a schematic diagram of machine 1600 for making insulation product 1500 of FIGS. 15A and 15B. As shown, machine 1600 may form two or more (e.g., four) waved cores 1604a, 1604b, 1604c, 1604d with rotary members or forming nips 1606. Once machine 1600 forms the waves from cores 1604a, 1604b, 1604c, 1604d, core conveyor 1608 may transport formed cores 1604a, 1604b, 1604c, 1604d to be placed between first and second layers (now shown) as they are unwound from the first- and second-layer rollers 1610, which are then bonded to cores 1604*a*, 1604*b*, 1604*c*, 1604*d* with heat, adhesive, or other means. Machine 1600 may also have side guides or conveyors 1614*a*, 1614*b*. If 1614*a*, 1614*b* are conveyors, they may be used to move or pull the formed core 1604*a*, 1604*b*, 1604*c*, 1604*d* and first and second layers as they are formed into insulation product 1500.

Figure 17:
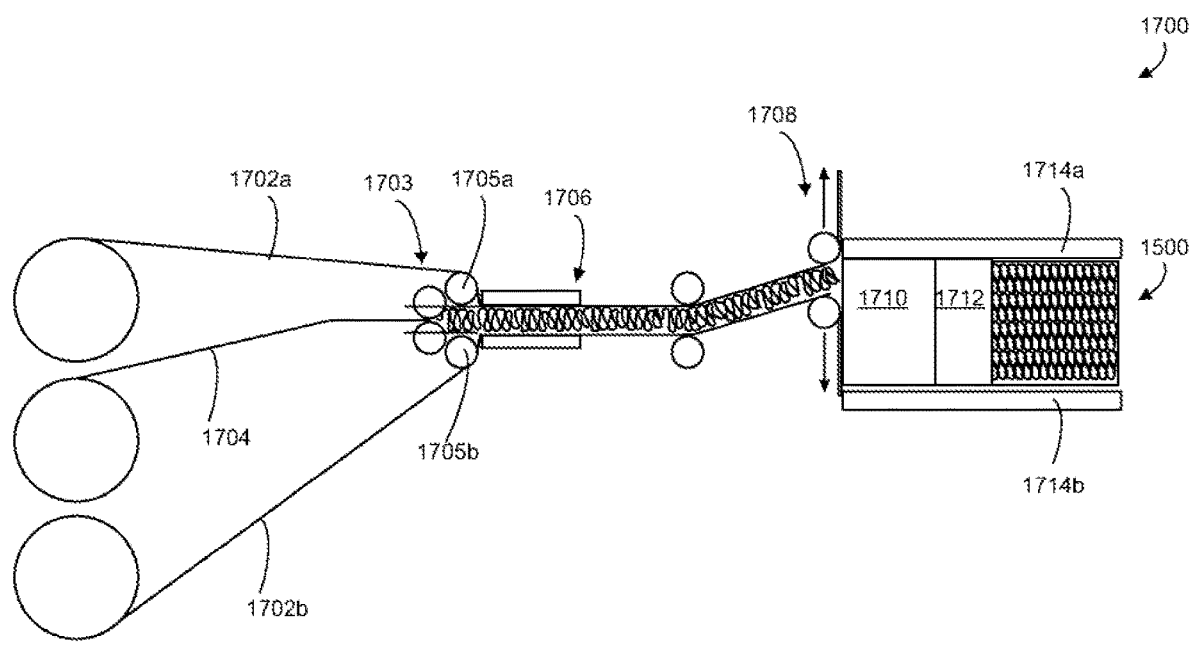
FIG. 17 is a schematic diagram of a machine for making the insulation product of FIGS. 15A and 15B.

FIG. 17 is a schematic diagram of a machine 1700 for making insulation product 1500 of FIGS. 15A and 15B. As shown, a pair of power roller 1703 form a wave core 1704 between first layer 1702*a* and second layer 1702*b* which may be guided by guide roller 1705*a*, 1705*b*, respectively. Machine 1700 may include heater 1706 to heat adhesive (e.g., a polymeric film) on first and second layers 1702*a*, 1702*b* or core 1704 so that first and second layers 1702*a*, 1702*b* attach to core 1704. Instead of forming two or more different cores and arranging the cores next to each other, machine 1700 forms only one core 1704 between first and second layers 1702*a*, 1702*b* and then utilizes a pair of oscillating rotating members 1708 which move or change position to place or fill the laminated core ribbon (core 1704 and the first and second layers 1702*a*, 1702*b*) into a desired wave pattern for insulation product 1500. In some embodiments, machine 1700 may include conveyor 1710 to move the laminated core ribbon and cover layer rollers 1712 that unwind the cover layers to seal the upper and lower surfaces of insulation product 1500. Finally, machine 1700 may include guides or conveyors 1714*a*, 1714*b* that are used to move or pull formed core 1704 and the first and second layers 1702*a*, 1702*b* as they are formed into insulation product 1500.

Figure 18A:
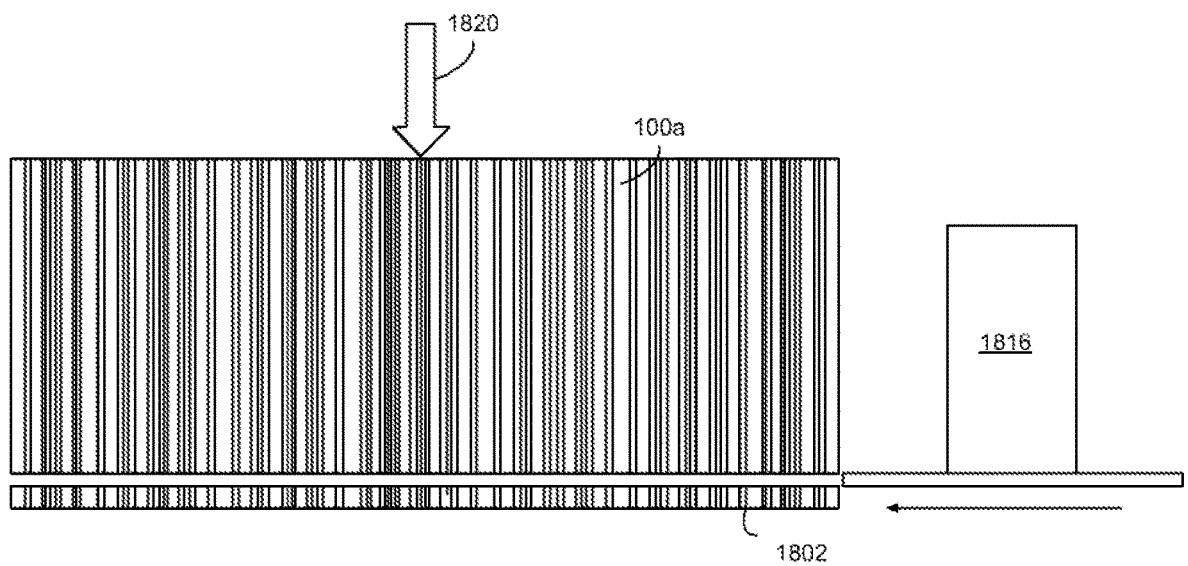
FIG. 18A is a schematic top view of a machine for making the insulation product of FIGS. 15A and 15B.

FIG. 18A is a schematic top view of a machine for making insulation product of FIGS. 15A and 15B. As shown, cutting device 1816 (e.g., cutting wheel) may cut a standard insulation product (e.g., insulation product 100*a*) into strips (e.g., 1802), which may be stacked (see FIG. 18B) and then laminated. The machine may include moving insulation product in feed direction 1820 to be arranged for cutting by the cutting device 1816.

Figure 18B:
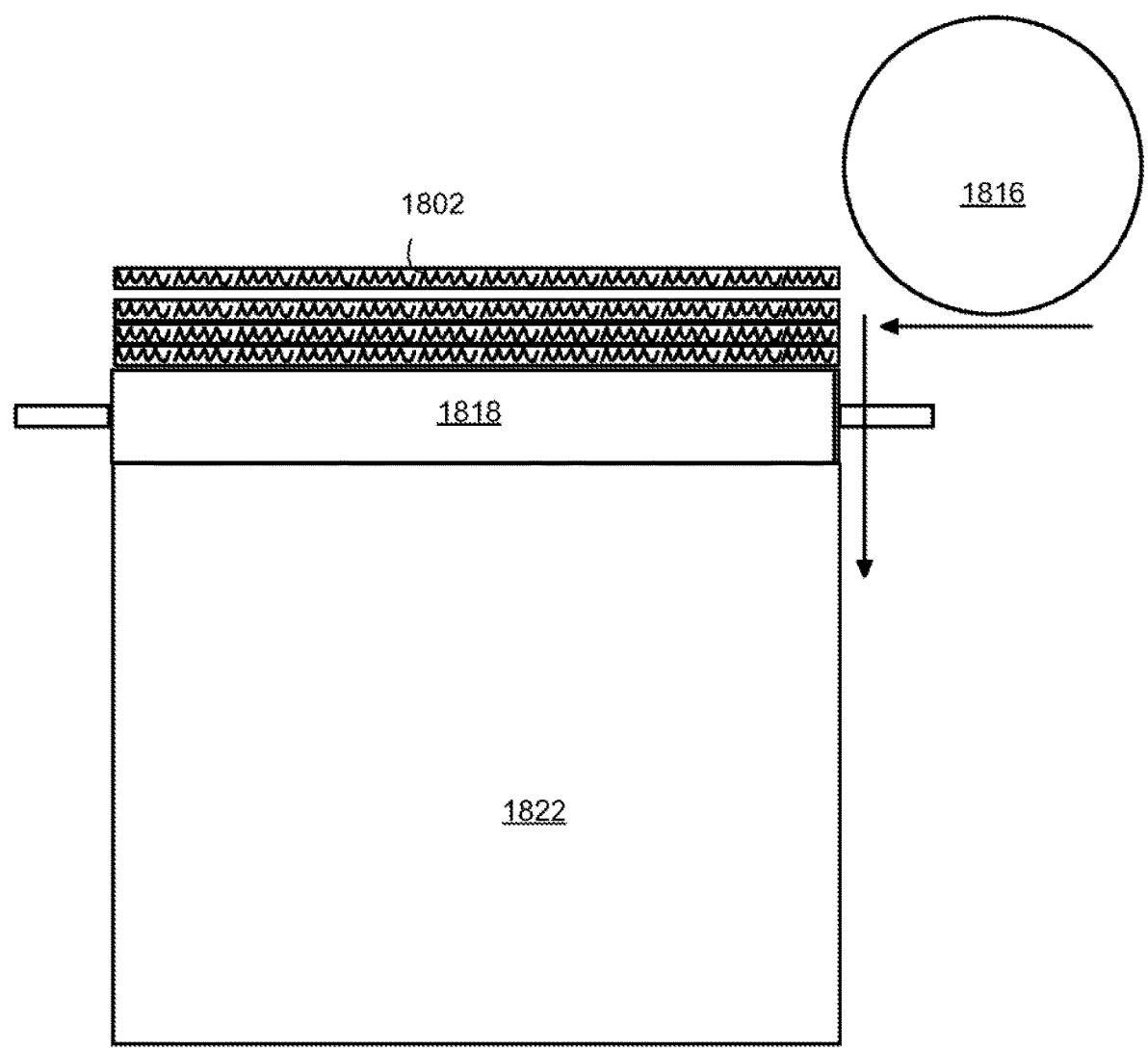
FIG. 18B is a schematic side view of a machine for making the insulation product of FIGS. 15A and 15B.

FIG. 18B is a schematic side view of a machine for making insulation product of FIGS. 15A and 15B. As shown, the machine may down stack strips 1802 cut from cutting device 1816. The machine may unroll and attach or laminate cover layers 1822 from cover rollers 1818 over the down stacked strips 1802.

Figure 19A:
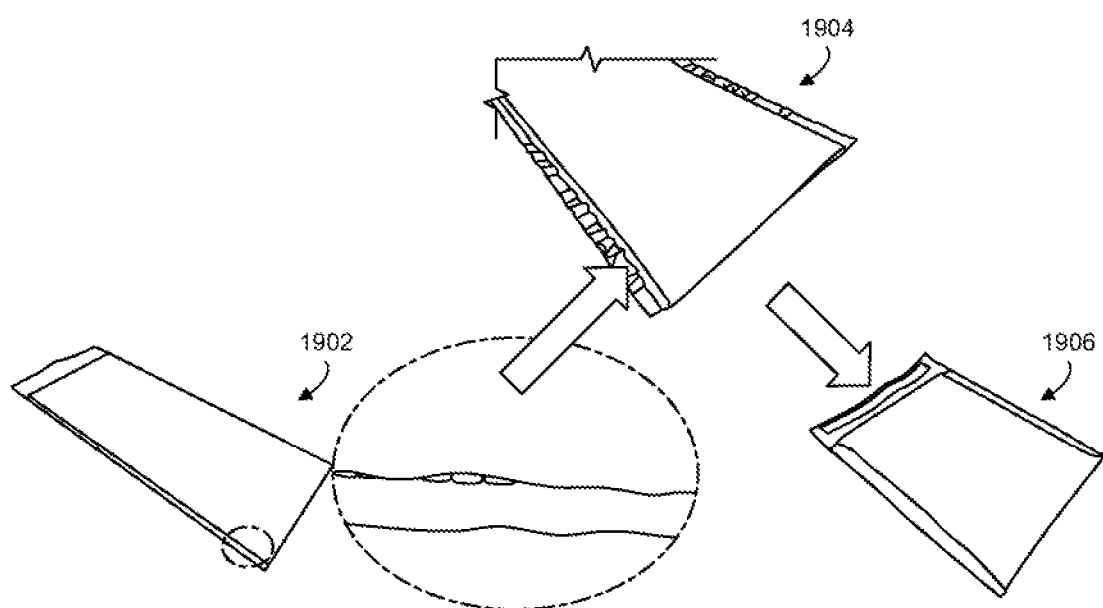
FIG. 19A shows perspective views of a folding method for a pouch made from one or more insulation products, according to an exemplary embodiment.

FIG. 19A shows perspective views of a folding method for a pouch made from one or more insulation products, according to an exemplary embodiment. As shown, step 1902 may include forming an insulation product (e.g., insulation product 100*a*, 100*a*-3) as described herein. However, insulation product (of step 1902 may include first and second layers (e.g., first layer 102*a* and second layer 102*b*) that extend beyond the core allowing the core to be sealed on the sides to create a water barrier in step 1904 and then folded in half and sealed together to create a pouch in step 1906.

Figure 19B:
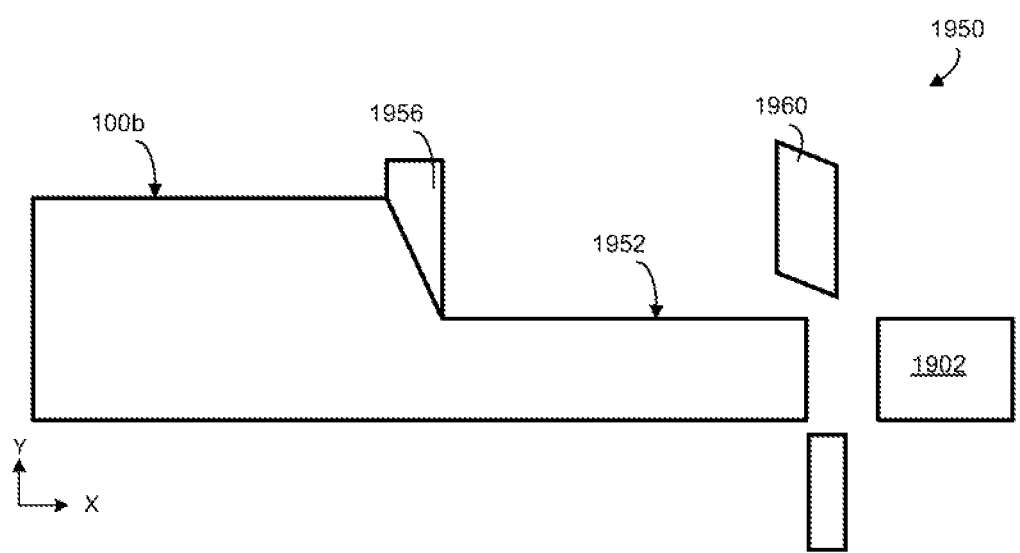
FIG. 19B is a diagram showing a machine assisted folding method for making a pouch from one or more insulation products, according to an exemplary embodiment.

FIG. 19B is a diagram showing a machine assisted folding method for making a pouch from one or more insulation products, according to an exemplary embodiment. As shown, insulation product 100*b* (see FIG. 1D) may be folded so that it can form a pouch using rollers or a conveyer as shown in earlier embodiments, insulation product 100*b* may be moved in the machine direction (X-direction) against a barrier 1956 that blocks approximately half of insulation product 100*b* in a direction approximately perpendicular to the machine direction so that insulation product is forced to fold over the barrier and itself to travel past barrier 1956 to form folded insulation product 1952. Machine 1950 cuts the folded insulation product 1952 with cutting device 1960 (e.g., a guillotine) to form a cut and folded insulation product 1902 that may form a pouch or envelope by sealing the side edges of the folded insulation product 1952.

Figure 19C:
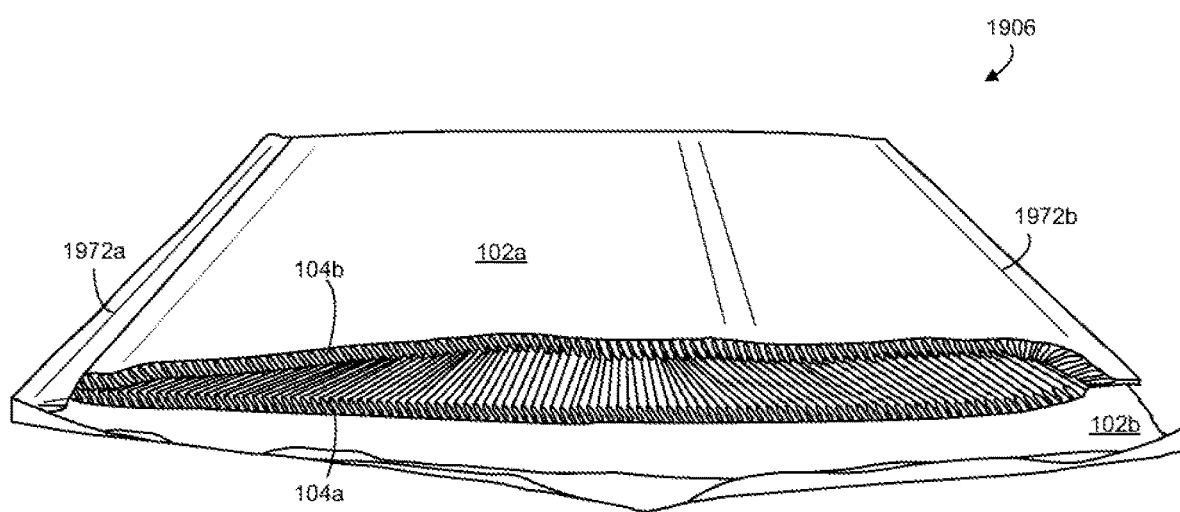
FIG. 19C is a front perspective view of a pouch, according to an exemplary embodiment.
Figure 19D:
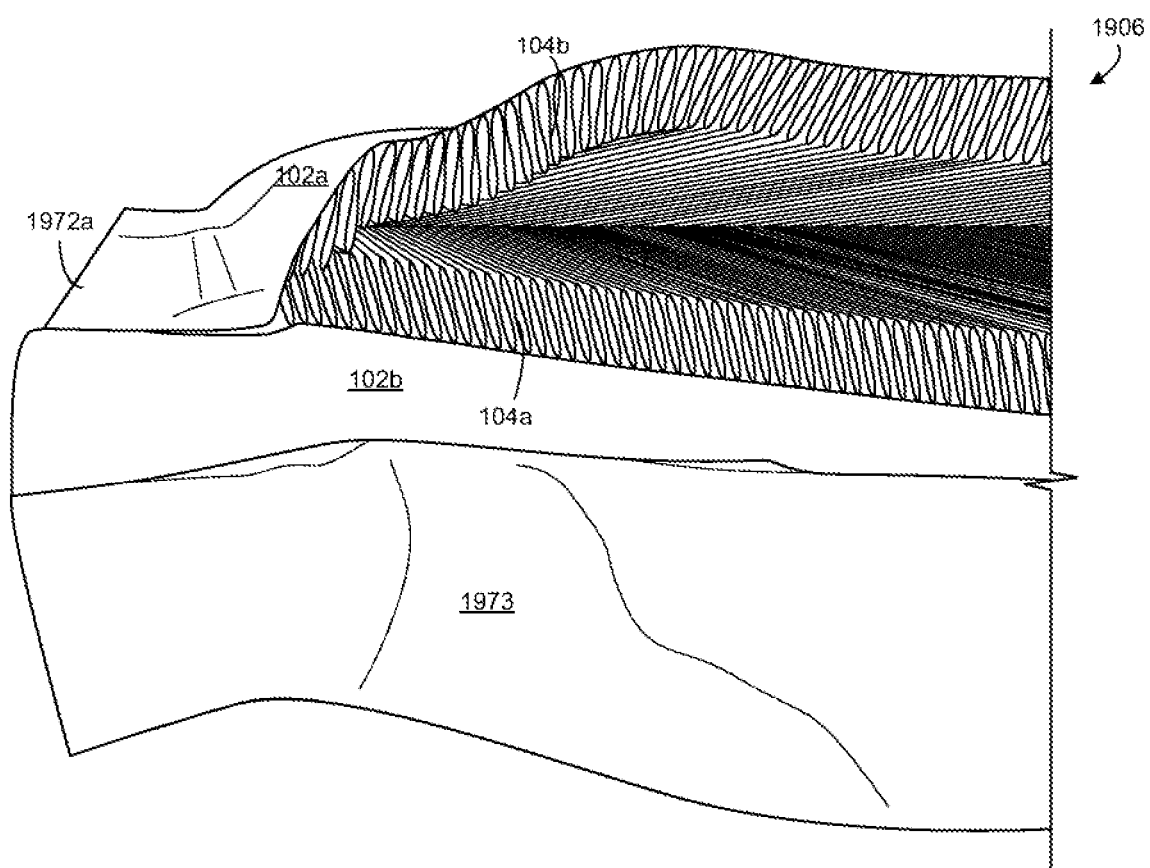
FIG. 19D is an enlarged front perspective view of a pouch, according to an exemplary embodiment.
Figure 19E:
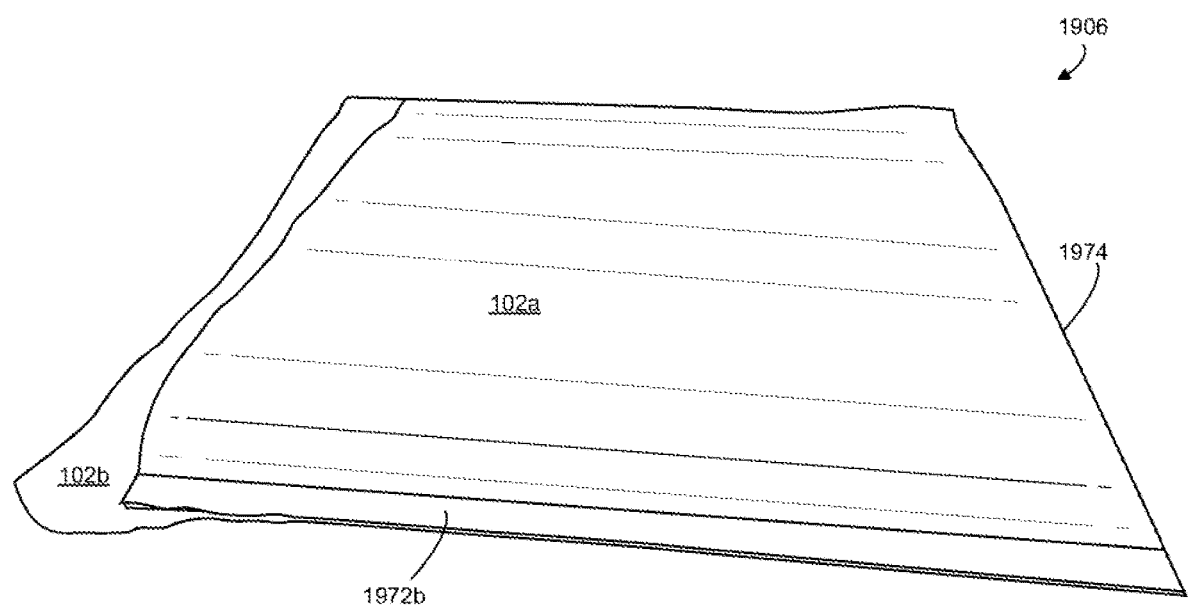
FIG. 19E is a side perspective view of a pouch, according to an exemplary embodiment.

FIG. 19C is a front perspective view of a pouch 1906, according to an exemplary embodiment. FIG. 19D is an enlarged front perspective view of a pouch, according to an exemplary embodiment. FIG. 19E is a side perspective view of a pouch according to an exemplary embodiment. Much like FIG. 1F-2, pouch or envelope 1906 may include first layer 102*a*, second layer 102*b* and two core layers 104*a*, 104*b*. Additionally, pouch 1906 may include first sealed side 1972*a* and second sealed side 1972*b*. Each sealed side 1972*a*, 1972*b* may include only first layer 102*a* and second layer 102*b* sealed together or may include one or both core layers 104*a*, 104*b* placed in between. An item for shipping may be placed inside the pouch cushioned between the core layers 104*a*, 104*b*. Second layer 102*b* (or first layer 102*a*) may extend away from folded end 1974 beyond first and second core layers 104*a* and 104*b* so that it may be folded over the opening of the pouch to seal the item within pouch 1906 using adhesive or other means. Although not directly shown, pouch 1906 may include an additional layer (e.g., paper) attached to the underside of core layer 104*b* and another additional layer (e.g., paper) attached to the upper side of core layer 104*a* so that when an item is place within the pouch it contacts the additional layers rather than the core layer 104*a*, 104*b*.

Figure 20:
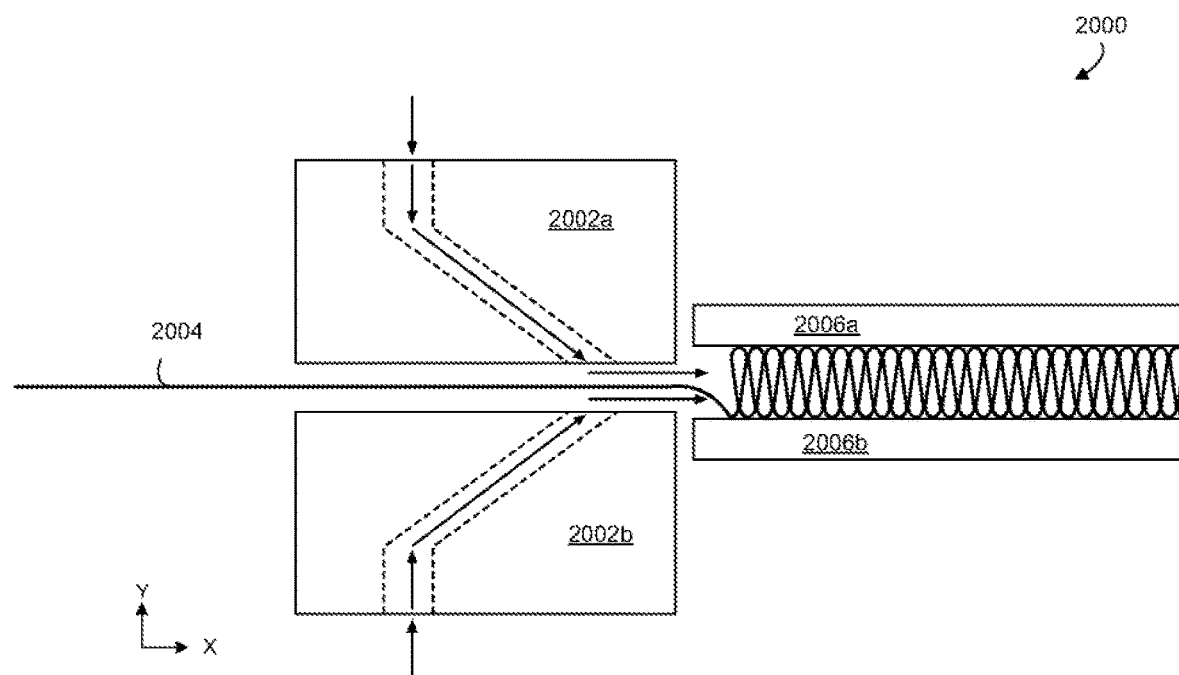
FIG. 20 is a schematic diagram of a machine for making a waved core, according to an exemplary embodiment.

FIG. 20 is a schematic diagram of a machine 2000 for making a waved core, according to an exemplary embodiment. Machine 2000 or more specifically air supplies 2002*a*, 2002*b* may be swapped in for the rotary members (e.g., rotary members 422*a*, 422*b*) of any of the machines described herein. As shown, air supplies 2002*a*, 2002*b* may supply air with an integrated blower, compressed air, or an upstream blower (not shown) that forces core 2004 to travel between two restraints 2006*a*, 2006*b* to form a wave pattern. Put another way, air may be supplied to a manifold with top and bottom feed plates and then directed through nozzles to drive the core 2004 through an aperture to form a wave pattern. Although the first and second layer are not shown in FIG. 20, core 2004 may form a wave pattern directly between a first layer and a second layer and the two restraints 2006*a* 2006*b* may include heaters to activate adhesives on the first and second layers so that they attach to core 2004 similar to other embodiments disclosed herein. Alternatively, core 2004 may form a wave pattern between guides that are outside of the first and second layers, which are added to the top and bottom of the core 2004 further down the machine direction (X-direction). By eliminating the rotary members, the machine is less likely to suffer from a jam caused by the core and the rotary members.

Figure 21:
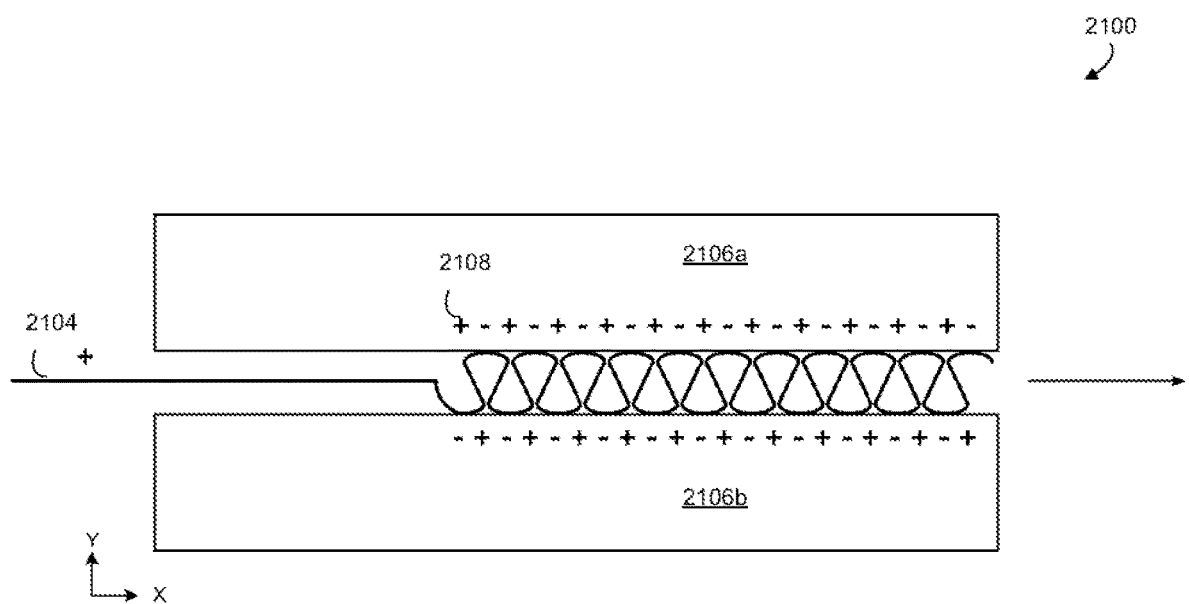
FIG. 21 is a schematic diagram of a machine for making a waved core, according to an exemplary embodiment.

FIG. 21 is a schematic diagram of a machine 2100 for making a waved core, according to an exemplary embodiment. Machine 2100 may include a first charged plate 2106*a* and a second charged plate 2106*b* that can change (from positive to negative or vice versa) the static charge of different areas 2108 of charged plates 2106*a*, 2106*b*. Each time the plates change the charge of one or more areas 2108, the positively or negatively charged core 2104 will move to the next corresponding charged area forming a wave pattern and traversing in the machine direction through the charged plates. Using machine 2100 may eliminate or reduce jams in the machine such as paper jams commonly occurring with the rotary members and the core.

Figure 22:
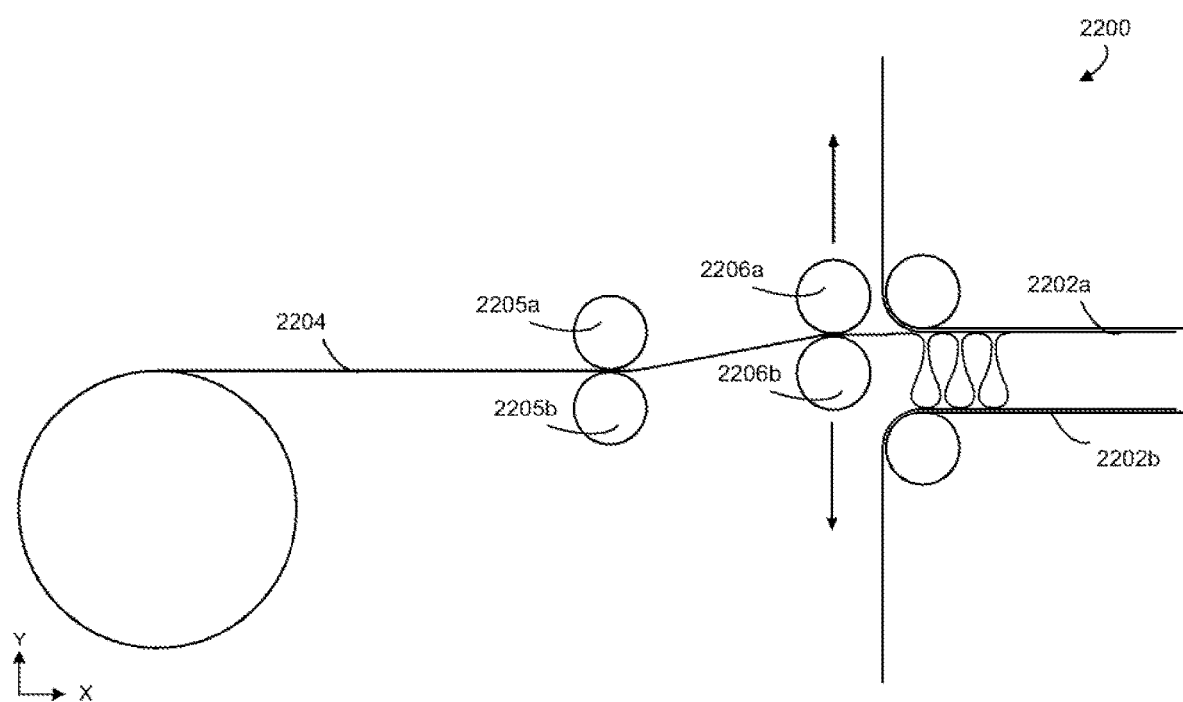
FIG. 22 is a schematic view of a machine for forming a waved core, according to an exemplary embodiment.

FIG. 22 is a schematic view of a machine 2200 for forming a waved core, according to an exemplary embodiment. Machine 2200 is a modified portion of machines such as 400, 500 previously described. As shown, core 2204 may travel through guide or tension rollers 2205a, 2205b to the rotary members 2206a, 2206b which force core 2204 into a confined space between first and second layers 2202a, 2202b to form a wave pattern as previously described. However, to create more control over the wave pattern, rotary members 2206a, 2206b may oscillate or move up and down in the Y-axis (or other directions) to guide core 2204 up and down (or other directions) to create control and regular waves. In some embodiments, the oscillating rotating members 2206a, 2206b may help create stable tall waves for thicker insulation products. In some embodiments, a pivot point (not shown) could be used to create the oscillating motion. In other embodiments, linear guides (not shown) may be used to oscillate rotating members 2206a, 2206b.

Figure 23:
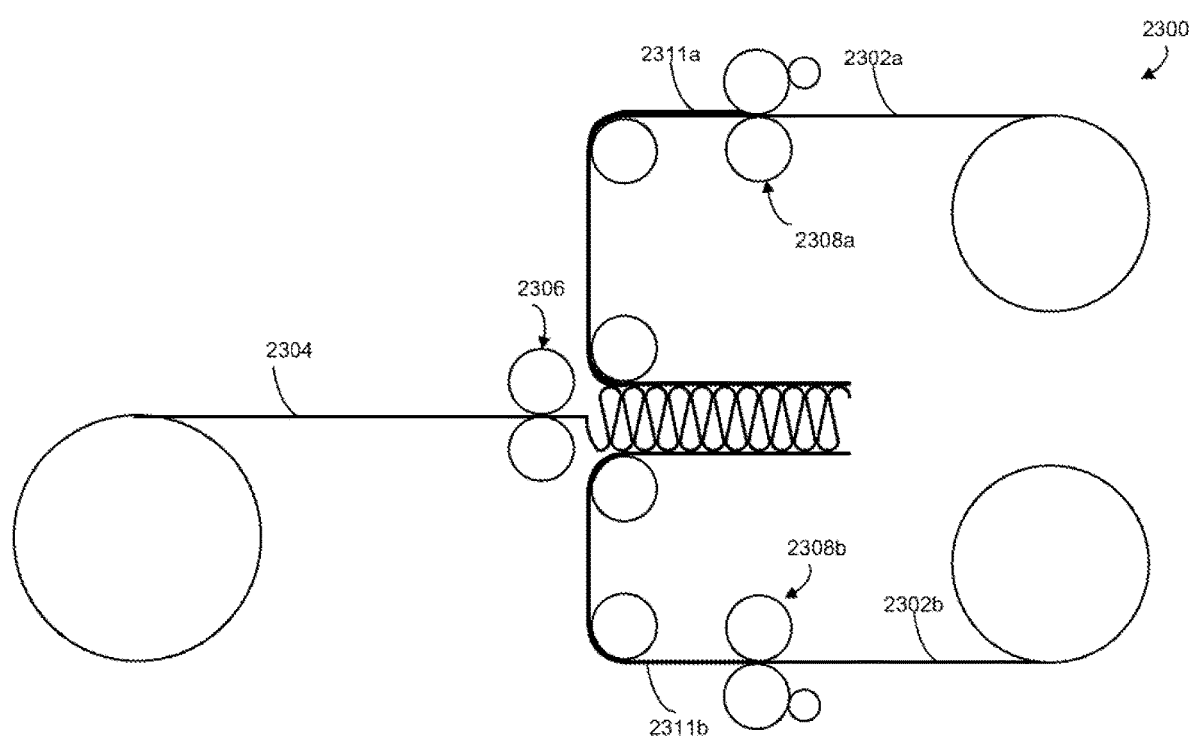
FIG. 23 is a schematic view of a machine for attaching a waved core to one or more outer layers, according to an exemplary embodiment.

FIG. 23 is a schematic view of machine 2300 for attaching a waved core to one or more outer layers, according to an exemplary embodiment. As shown, machine 2300 may include first glue coater 2308a and second glue coater 2308b that are configured to apply glue 2311a, 2311b to first and second layers 2302a, 2302b so that machine 2300 may form a waved core 2304 with rotating members 2306 and may attach the waved core 2304 to first and second layers 2302a, 2302b using glue 2311a, 2311b. Machine 2300 may apply the glue continuously or intermittently. Glue could be applied in the machine direction or in a transverse direction. The glue may include starch and water. In other embodiments, glue is not used. Instead, the first and second layers may be poly-backed paper and may bonded to the core 2304 using heat to melt the poly layer already attached to the paper layer and pressure to create a contact bond with core 2304.

Figure 24:
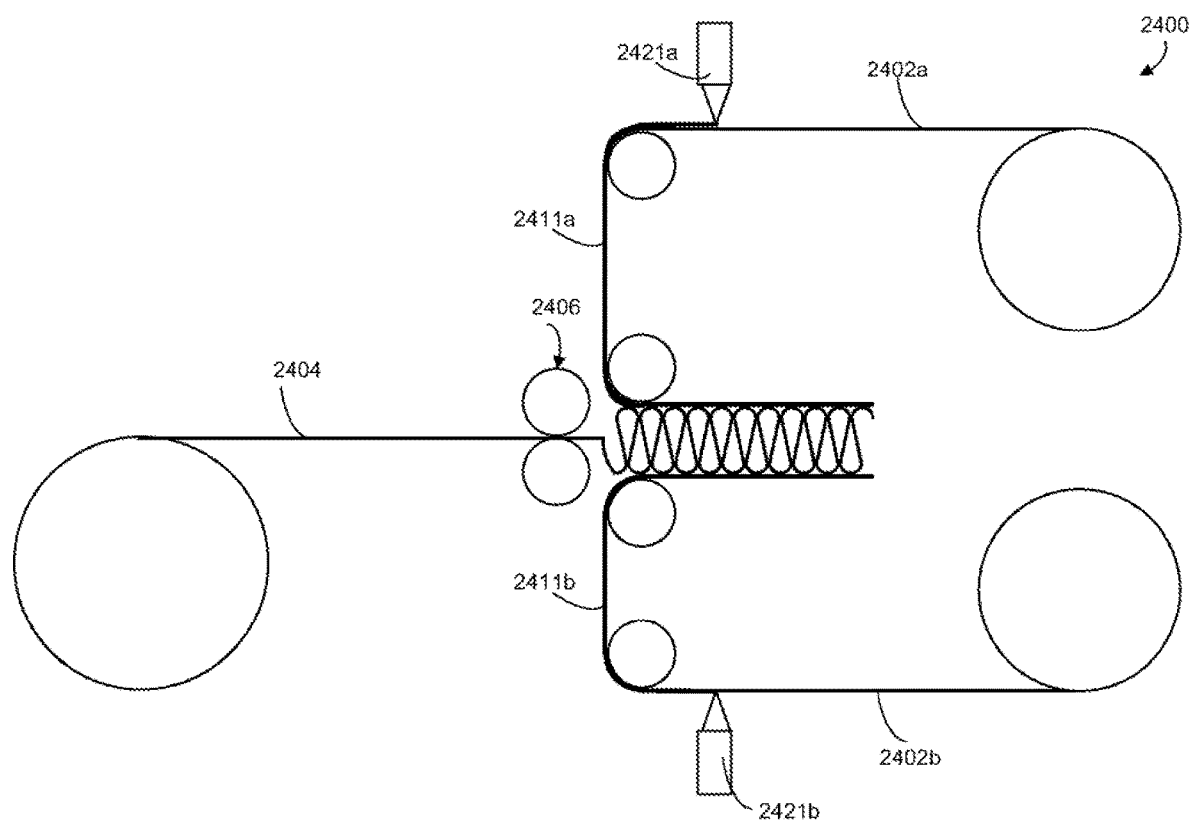
FIG. 24 is a schematic view of a machine for attaching a waved core to one or more outer layers, according to an exemplary embodiment.

FIG. 24 is a schematic view of machine 2400 for attaching a waved core to one or more outer layers, according to an exemplary embodiment. Machine 2400 is similar to machine 2300, except that adhesive 2411a, 2411b is applied with adhesive dispensers 2421a, 2421b rather than glue coaters 2308a, 2308b. Adhesive may be water based, solvent based, temperature activated or high tack (non-hardening). For example, the adhesive may include starch and water. Machine 2400 may apply adhesive continuously or intermittently in a machine direction or in a transverse direction.

Figure 25:
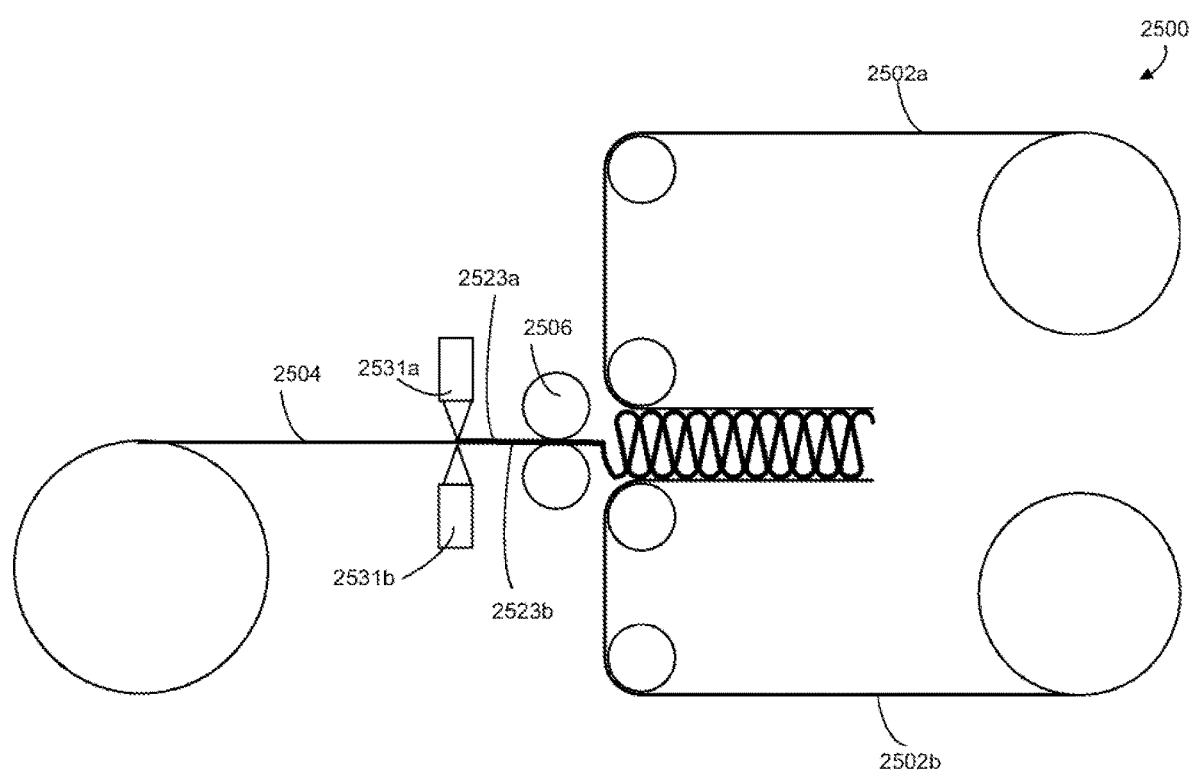
FIG. 25 is a schematic view of a machine for attaching a waved core to one or more outer layers, according to an exemplary embodiment.

FIG. 25 is a schematic view of a machine 2500 for attaching a waved core to one or more outer layers, according to an exemplary embodiment. Machine 2500 is similar to machine 2400 except that the adhesive is applied to both the upper and lower surface of core 2504 with adhesive dispensers 2531a, 2531b so that the core will attach to the first layer 2502a and second layer 2502b. In some embodiments, core 2504 will attach to itself when forming the wave pattern to help increase the strength and crush resistance. The adhesive applied to core 2504 may be the same as or different (e.g., less expensive) from the adhesive or glue described above with respect to first and second layers 2302a, 2302b.

Figure 26:
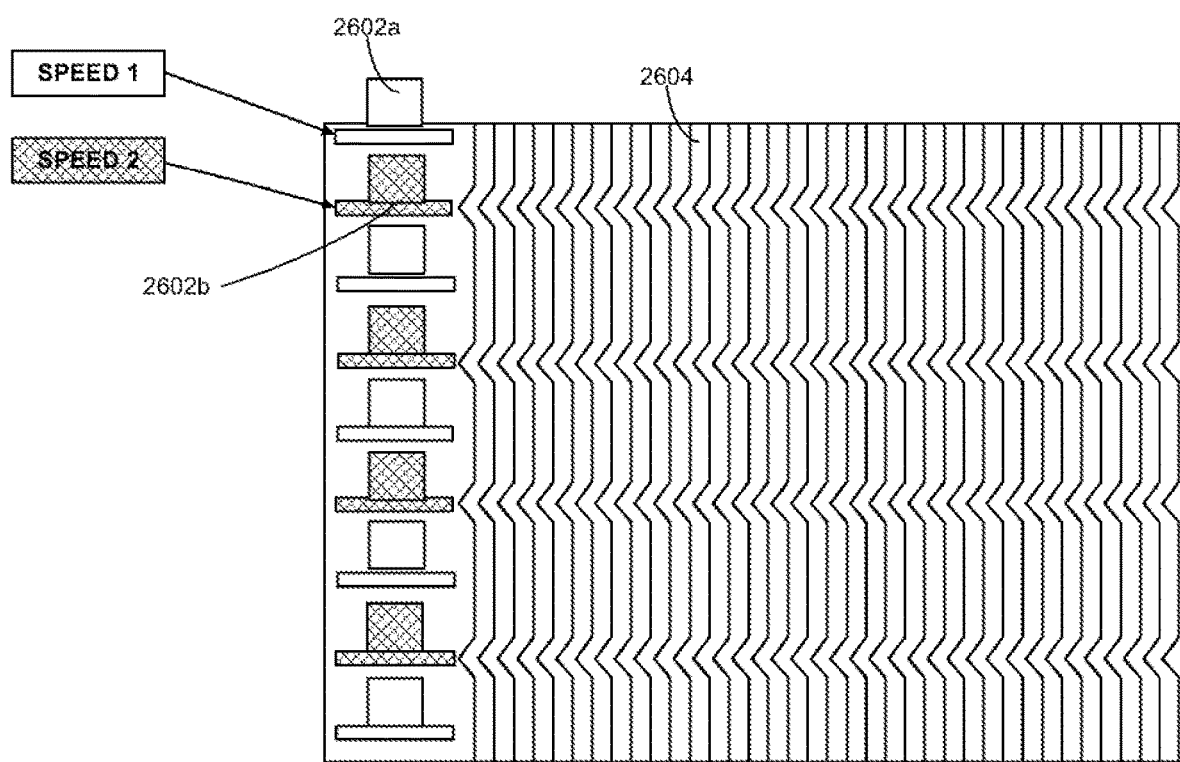
FIG. 26 is a schematic top view of a plurality of feed rollers for forming a varied waved core, according to an exemplary embodiment.

FIG. 26 is a schematic top view of a plurality of power rollers for forming a varied waved core, according to an exemplary embodiment. As shown the rotary members or feed rollers for the core in any of the machines described herein may have at least two types—first pair of rotary members 2602a and a second pair of rotary members 2602b that may operate at different speeds to provide shear in the core which could increase the compression strength by adding regularly spaced dislocations to the wave pattern of core 2604 that prevent collapse in the thickness direction. As shown, speed 1 is greater than speed 2. With such a setup, the final width of the core 2604 will be less than the initial width.

Figure 27:
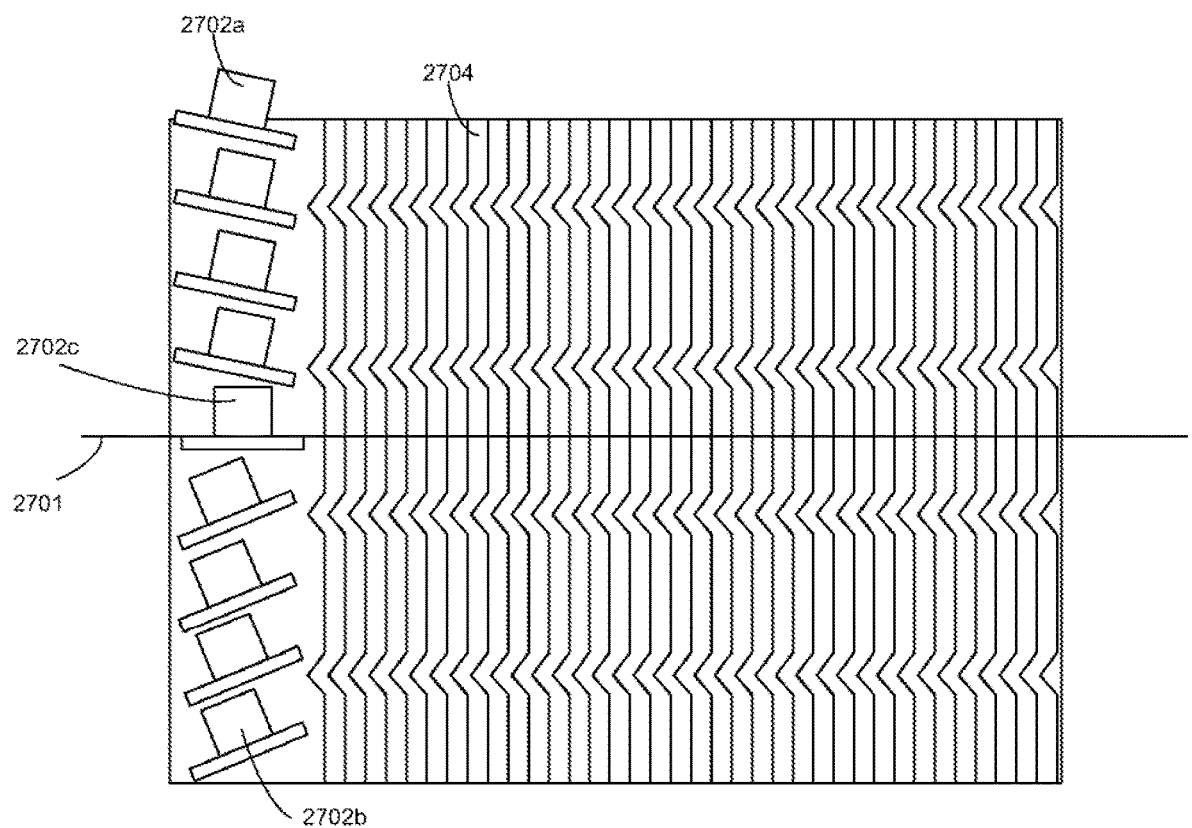
FIG. 27 is a schematic top view of a plurality of feed rollers for forming a varied waved core, according to an exemplary embodiment.

FIG. 27 is a schematic top view of a plurality of power rollers for forming a varied waved core, according to an exemplary embodiment. Instead of rotary member operating at different speeds, one of the machines described herein may include multiple rotary members that are angled differently to impart dislocation and shear in the core. The rotary members may be angled such that the paper is driven toward a centerline 2701 such that core 2704 width reduces towards the centerline as well. If the rotary members are not all pointed at the same centerline 2701, tearing may occur in core 2704. Core 2704 can absorb compression, but not tension.

In some examples, disclosed insulation products, machines, and methods may involve one or more of the following clauses:

Clause 1: An insulation product, comprising: a first layer; and a first continuous paper sheet formed into a first plurality of flexible loops disposed on and attached to the first layer and defining a first plurality of air channels that extend in a direction that is substantially perpendicular with a machine direction of the insulation product, wherein a take up factor of the first continuous paper sheet to the first layer is greater than 1:1.

Clause 2: The insulation product of clause 1, wherein the take up factor is 1.1:1 to 7.5:1.

Clause 3: The insulation product of clause 1, wherein the insulation product has a first indentation force deflection of 0.75 to 205 pounds per square inch at 25% thickness reduction.

Clause 4: The insulation product of clause 3, wherein the insulation product has a second indentation force deflection of 1.5 to 180 pounds per square inch at 50% thickness reduction.

Clause 5: The insulation product of clause 4, wherein the insulation product has an indentation yield deflection force of 0.5 to 30 pounds per square inch at 25% thickness reduction.

Clause 6: The insulation product of clause 5, wherein the insulation product has an R-value of 0.9 to 2.2.

Clause 7: The insulation product of clause 5, wherein the insulation product has an R-value of 1.3 to 1.7.

Clause 8: The insulation product of clause 3, wherein the first indentation force deflection is 12 to 85 pounds per square inch at 25% thickness reduction.

Clause 9: The insulation product of clause 1, wherein the plurality of flexible loops are not attached to one another.

Clause 10: The insulation product of clause 2, insulation product, wherein at least one first axis, perpendicular to lengths of the first plurality of air channels and parallel to a thickness of the insulation product, passes through the first continuous paper sheet at least three times.

Clause 11: The insulation product of clause 2, further comprising a second layer disposed on and attached to the first continuous paper sheet.

Clause 12: The insulation product of clause 11, further comprising: a second continuous paper sheet formed into a first plurality of flexible loops defining a second plurality of air channels and disposed on and attached to the second layer; and a third layer disposed on and attached to the second continuous paper sheet, wherein at least one second axis, perpendicular to lengths of the second plurality of air channels and parallel to a thickness of the insulation product, passes through the second continuous paper sheet at least three times.

Clause 13: An insulation product, comprising: a first layer and a second layer; and a paper core formed into a plurality of flexible loops comprising a first flexible loop, a second flexible loop, and a third flexible loop with the first and third flexible loops contacting each other proximate the first layer and the second flexible loop disposed between the first and third flexible loops proximate the second layer, and wherein the paper core is disposed between and attached to the first layer and the second layer.

Clause 14: The insulation product of clause 13, wherein the plurality of flexible loops defines a plurality of air channels with lengths that run approximately parallel to one another and extend in a direction that is substantially perpendicular with a machine direction of the insulation product.

Clause 15: The insulation product of clause 14, wherein at least one axis, perpendicular to the lengths of the plurality of air channels and parallel to a thickness of the insulation product, passes through the paper core at least three times.

Clause 16: The insulation product of clause 13, wherein: the first flexible loop has a first convex surface facing and attached to the first layer, the second flexible loop has a second convex surface facing and attached to the second layer, and the third flexible loop has a third convex surface facing and attached to the first layer.

Clause 17: The insulation product of clause 13, wherein the paper core comprises and an alternating upper curved surface and a lower smooth surface.

Clause 18: The insulation product of clause 13, wherein the paper core is attached to the first and second layers with an adhesive.

Clause 19: The insulation product of clause 13, wherein the paper core consists of a continuous single sheet of paper.

Clause 20: An insulation product, comprising: a first layer; and a first continuous paper sheet formed into a first plurality of flexible loops disposed on and attached to the first layer and defining a first plurality of air channels that extend in a direction that is substantially perpendicular with a machine direction of the insulation product, wherein the insulation product has an indentation force deflection of 1.5 to 180 pounds per square inch at 50% thickness reduction, and wherein the insulation product has an R-value of 1.3 to 1.7.

Clause 21: A machine for making insulation, comprising: two or more rotatory members configured to pull a precut insulation product at a first rate, wherein the precut insulation product comprises a first paper layer, a second paper layer, and a continuous paper core sheet; a first restraint and a second restraint spaced apart a predetermined distance to create a first space therebetween; and two or more second rotary members configured to feed a continuous paper sheet at a second rate into the first space such that the continuous paper sheet forms a plurality of flexible loops defining a plurality of air channels that extend in a direction that is substantially perpendicular with a machine direction, wherein the first rate is slower than the second rate.

Clause 22: The machine of clause 21, wherein the restraint comprises a first heater and the second restraint comprises a second heater, and wherein the first and second heaters are configured to respectively apply heat to the first and second paper layers when the continuous paper sheet is within the first space to attach the first and second paper layers to the continuous paper sheet and flexibly lock the plurality of flexible loops to the first and second paper layers without attaching the plurality of flexible loops to each other to form the precut insulation product.

Clause 23: The machine of clause 22, wherein the first and second heaters are configured to indirectly heat respective surfaces of the first and second paper layers facing the continuous paper core sheet comprising adhesive by directly heating respective surfaces facing away from the continuous paper core sheet.

Clause 24: The machine of clause 21, further comprising a guillotine or rotary knife configured to cut the precut insulation product to a predetermined length to form an insulation product.

Clause 25: The machine of clause 21, wherein a ratio of the second rate to the first rate is greater than 1.2:1.

Clause 26: The machine of clause 21, wherein a ratio of second rate to the first rate is less than 7.5:1.

Clause 27: The machine of clause 21, wherein a ratio of the second rate to the first rate is 1.2:1 to 7.5:1.

Clause 28: The machine of clause 21, wherein a ratio of the second rate to the first rate is 1.5:1 to 6.5:1.

Clause 29: The machine of clause 21, wherein the predetermined distance between the first restraint and the second restraint is adjustable.

Clause 30: A machine for making insulation, comprising a first conveyor belt and a second conveyor belt configured to pull a precut insulation product at a first rate, wherein the precut insulation product comprises a first paper layer, a second paper layer, and a continuous paper core sheet, and wherein the first and second conveyor belts are spaced apart a predetermined distance to create a first space therebetween; and two or more rotary members configured to feed a continuous paper sheet at a second rate into the first space such that the continuous paper sheet forms a plurality of flexible loops defining a plurality of air channels that extend in a direction that is substantially perpendicular with a machine direction, and wherein the first rate is slower than the second rate.

Clause 31: The machine of clause 30, wherein the first and second conveyor belts each comprise a rotating mechanism configured to provide the first and second conveyor belts with an opening angle that is variable from 0 to 15 degrees.

Clause 32: The machine of clause 30, further comprising a guillotine or rotary knife configured to cut the precut insulation product to a predetermined length to form an insulation product.

Clause 33: The machine of clause 30, wherein a ratio of the second rate to the first rate is greater than 1.2:1.

Clause 34: The machine of clause 30, wherein a ratio of second rate to the first rate is less than 7.5:1.

Clause 35: The machine of clause 30, wherein a ratio of the second rate to the first rate is 1.2:1 to 7.5:1.

Clause 36: The machine of clause 30, wherein a ratio of the second rate to the first rate is 1.5:1 to 6.5:1.

Clause 37: The machine of clause 30, further comprising: a pair of nip rollers configured to drive the precut insulation product toward exiting the machine, wherein the pair of nip rollers each comprise a heater configured to heat the precut insulation product to attach the first paper layer and the second paper layer to the continuous paper sheet without attaching the plurality of flexible loops to each other to create a precut insulation product so that the continuous paper sheet retains its plurality of flexible loops.

Clause 38: The machine of clause 30, wherein the predetermined distance between the first conveyor belt and the second conveyor belt is adjustable.

Clause 39: A machine for making insulation, comprising: two or more first rotary members configured to pull a precut insulation product at a first rate, wherein the precut insulation product comprises a first paper layer, a second paper layer, and a continuous paper core sheet; a first restraint and a second restraint spaced apart a predetermined distance to create a first space therebetween and each comprising two or more heaters; and two or more second rotary members configured to feed a continuous paper sheet at a second rate into the first space such that the continuous paper sheet forms a plurality of flexible loops disposed defining a plurality of air channels extending in a direction that is substantially perpendicular with a machine direction, and wherein the first rate is slower than the second rate.

Clause 40: The machine of clause 39, wherein: the first restraint and the second restraint comprise two or more gaps spaced running in a machine direction, and the two or more heaters are disposed within the two or more gaps and configures to heat strips of the first paper layer and the second paper layer. Clause 41: A method of forming an insulation product, comprising: forming a continuous sheet of paper into a plurality of flexible loops defining a plurality of air channels extending in a direction that is substantially perpendicular with a machine direction of the continuous sheet of paper; and immediately attaching a first layer of paper and a second layer of paper to the plurality of flexible loops as they are formed so that the continuous sheet of paper retains the plurality of flexible loops between the first layer and the second layer and that the plurality of flexible loops remain unattached with respect to one another.

Clause 42: The method of clause 41, wherein: forming the continuous sheet of paper into a plurality of flexible loops comprises feeding the continuous sheet of paper at a first rate into a defined space between the first layer of paper and the second layer of paper that are fed at a second rate that is slower than the first rate, and immediately attaching the first layer and the second layer to the continuous sheet of paper comprises heating the first layer and the second layer to activate an adhesive coated on surfaces of the first layer and the second layer facing the continuous sheet of paper without attaching the plurality of flexible loops to one another.

Clause 43: The method of clause 41, wherein the plurality of air channels have lengths that are approximately parallel.

Clause 44: The method of clause 43, wherein at least one axis, perpendicular to a feed direction and the lengths of the plurality of air channels, passes through the continuous sheet of paper at least three times after the first layer and the second layer are attached to the continuous sheet of paper.

Clause 45: The method of clause 42, wherein a ratio of the first rate to the second rate is greater than 1.2:1.

Clause 46: The method of clause 42, wherein a ratio of the first rate to the second rate is less than 7.5:1.

Clause 47: The method of clause 42, wherein a ratio of the first rate to the second rate is 1.2:1 to 7.5:1.

Clause 48: The method of clause 42, wherein a ratio of the first rate to the second rate is 1.5:1 to 6.5:1.

Clause 49: The method of clause 42, further comprising changing the defined space using a pair of adjustable restraints.

Clause 50: A method of forming an insulation product, comprising: forming a continuous sheet of paper into a plurality of flexible loops defining a plurality of air channels extending in a direction that is substantially perpendicular with a machine direction of the continuous sheet of paper; and attaching a first layer of paper and a second layer of paper to the plurality of flexible loops as they are formed so that the continuous sheet of paper retains the plurality of flexible loops between the first layer and the second layer.

Clause 51: The method of clause 50, wherein: forming the continuous sheet of paper into a plurality of flexible loops comprises feeding the continuous sheet of paper at a first rate into a defined space between the first layer of paper and the second layer of paper that are fed at a second rate that is slower than the first rate, and attaching the first layer and the second layer to the continuous sheet of paper comprises heating the first layer and the second layer to activate an adhesive coated on surfaces of the first layer and the second layer facing the continuous sheet of paper.

Clause 52: The method of clause 51, wherein a ratio of the first rate to the second rate is greater than 1.1:1.

Clause 53: The method of clause 51, wherein a ratio of the first rate to the second rate is less than 7.5:1.

Clause 54: The method of clause 51, wherein a ratio of the first rate to the second rate is 1.1:1 to 7.5:1.

Clause 55: The method of clause 51, wherein a ratio of the first rate to the second rate is 1.5:1 to 6.5:1.

Clause 56: A method of forming an insulation product, comprising: forming a continuous sheet of paper into a plurality of flexible loops defining a plurality of air channels extending in a direction that is substantially perpendicular with a machine direction of the continuous sheet of paper; and attaching a first layer of paper to the plurality of flexible loops as they are formed so that the continuous sheet of paper retains the plurality of flexible loops on the first layer and that the plurality of flexible loops remain unattached with respect to one another.

Clause 57: The method of clause 56, wherein: forming the continuous sheet of paper into a plurality of flexible loops comprises feeding the continuous sheet of paper at a first rate into a defined space adjacent to a first layer of paper that is fed at a second rate that is slower than the first rate, and attaching the first layer to the continuous sheet of paper comprises heating the first layer to activate an adhesive coated on a surface of the first layer facing the continuous sheet of paper.

Clause 58: The method of clause 57, wherein a ratio of the first rate to the second rate is less than 7.5:1.

Clause 59: The method of clause 57, wherein a ratio of the first rate to the second rate is 1.1:1 to 7.5:1.

Clause 60: The method of clause 57, wherein a ratio of the first rate to the second rate is 1.5:1 to 6.5:1. The various insulation products described herein may be recyclable or curbside recyclable in many communities.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. This disclosure is intended to cover various modifications and equivalent arrangements included within the scope of the appended claims. Although specific terms are employed herein, they are used in a generic and descriptive sense only and not for purposes of limitation.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical range and sub-range is explicitly recited. For example, a range of approximately 1 to 99.99 should be interpreted to include not only the explicitly recited limits of approximately 1 and approximately 99.99, but also individual amounts such as 2, 3, 4, 5.01, 5.02, 26, 67.1, 99.98, etc., and sub ranges such as 5 to 80 and 30.21 to 83.24, etc. Similarly, it should be understood that when numerical ranges are provided, such ranges are to be construed as providing literal support for claim limitations that only recite the lower value of the range as well as claim limitations that only recite the upper value of the range. For example, a disclosed numerical range of 5 to 15 provides literal support for a claim reciting "greater than 5" (with no upper bounds) and a claim reciting "less than 15" (with no lower bounds).

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming an insulation product, comprising:
    forming a continuous sheet of paper into a plurality of flexible loops defining a plurality of air channels extending in a direction that is substantially perpendicular with a machine direction of the continuous sheet of paper; and
    immediately attaching a first layer of paper and a second layer of paper to the plurality of flexible loops as they are formed so that the continuous sheet of paper retains the plurality of flexible loops between the first layer and the second layer and that the plurality of flexible loops remain unattached with respect to one another.

2. The method of claim 1, wherein:
    forming the continuous sheet of paper into a plurality of flexible loops comprises feeding the continuous sheet of paper at a first rate into a defined space between the first layer of paper and the second layer of paper that are fed at a second rate that is slower than the first rate, and
    immediately attaching the first layer and the second layer to the continuous sheet of paper comprises heating the first layer and the second layer to activate an adhesive coated on surfaces of the first layer and the second layer facing the continuous sheet of paper without attaching the plurality of flexible loops to one another.

3. The method of claim 1, wherein the plurality of air channels have lengths that are approximately parallel.

4. The method of claim 3, wherein at least one axis, perpendicular to a feed direction and the lengths of the plurality of air channels, passes through the continuous sheet of paper at least three times after the first layer and the second layer are attached to the continuous sheet of paper.

5. The method of claim 2, wherein a ratio of the first rate to the second rate is greater than 1.2:1.

6. The method of claim 2, wherein a ratio of the first rate to the second rate is less than 7.5:1.

7. The method of claim 2, wherein a ratio of the first rate to the second rate is 1.2:1 to 7.5:1.

8. The method of claim 2, wherein a ratio of the first rate to the second rate is 1.5:1 to 6.5:1.

9. The method of claim 2, further comprising changing the defined space using a pair of adjustable restraints.

10. A method of forming an insulation product, comprising:
    forming a continuous sheet of paper into a plurality of flexible loops defining a plurality of air channels extending in a direction that is substantially perpendicular with a machine direction of the continuous sheet of paper; and
    attaching a first layer of paper and a second layer of paper to the plurality of flexible loops as they are formed so that the continuous sheet of paper retains the plurality of flexible loops between the first layer and the second layer.

11. The method of claim 10, wherein:
    forming the continuous sheet of paper into a plurality of flexible loops comprises feeding the continuous sheet of paper at a first rate into a defined space between the first layer of paper and the second layer of paper that are fed at a second rate that is slower than the first rate, and
    attaching the first layer and the second layer to the continuous sheet of paper comprises heating the first layer and the second layer to activate an adhesive coated on surfaces of the first layer and the second layer facing the continuous sheet of paper.

12. The method of claim 11, wherein a ratio of the first rate to the second rate is greater than 1.1:1.

13. The method of claim 11, wherein a ratio of the first rate to the second rate is less than 7.5:1.

14. The method of claim 11, wherein a ratio of the first rate to the second rate is 1.1:1 to 7.5:1.

15. The method of claim 11, wherein a ratio of the first rate to the second rate is 1.5:1 to 6.5:1.

16. A method of forming an insulation product, comprising:
    forming a continuous sheet of paper into a plurality of flexible loops defining a plurality of air channels extending in a direction that is substantially perpendicular with a machine direction of the continuous sheet of paper; and attaching a first layer of paper to the plurality of flexible loops as they are formed so that the continuous sheet of paper retains the plurality of flexible loops on the first layer and that the plurality of flexible loops remain unattached with respect to one another.

17. The method of claim 16, wherein:

forming the continuous sheet of paper into a plurality of flexible loops comprises feeding the continuous sheet of paper at a first rate into a defined space adjacent to a first layer of paper that is fed at a second rate that is slower than the first rate, and attaching the first layer to the continuous sheet of paper comprises heating the first layer to activate an adhesive coated on a surface of the first layer facing the continuous sheet of paper.

18. The method of claim 17, wherein a ratio of the first rate to the second rate is less than 7.5:1.

19. The method of claim 17, wherein a ratio of the first rate to the second rate is 1.1:1 to 7.5:1.

20. The method of claim 17, wherein a ratio of the first rate to the second rate is 1.5:1 to 6.5:1.

* * * * *